United States Patent [19]

Kitahara et al.

[11] 4,244,006
[45] * Jan. 6, 1981

[54] CONTROL DEVICE FOR TELEVISION CAMERA

[75] Inventors: Sigeyosi Kitahara; Isamu Okada; Shigeru Jumonji, all of Tokyo; Takayuki Nemoto, Kunitachi; Shigeru Yoshimura, Yokohama; Tsunenori Soma; Nobuhiko Shinoda, both of Tokyo, all of Japan

[73] Assignees: Nippon Hoso Kyokai; Canon Kabushiki Kaisha, both of Tokyo, Japan

[*] Notice: The portion of the term of this patent subsequent to Oct. 31, 1995, has been disclaimed.

[21] Appl. No.: 936,583

[22] Filed: Aug. 23, 1978

Related U.S. Application Data

[63] Continuation of Ser. No. 706,486, Jul. 19, 1976, Pat. No. 4,123,782.

[30] Foreign Application Priority Data

Jul. 18, 1975 [JP] Japan .................................. 50-88116
Jul. 18, 1975 [JP] Japan .................................. 50-88117
Jul. 18, 1975 [JP] Japan .................................. 50-88118
Jul. 18, 1975 [JP] Japan .................................. 50-88119
Jul. 18, 1975 [JP] Japan .................................. 50-88120
Jul. 18, 1975 [JP] Japan .................................. 50-88121

[51] Int. Cl.³ .................... H04N 5/30; H04N 5/22; H04N 5/24
[52] U.S. Cl. .................................. 358/210; 358/182; 358/183; 358/185
[58] Field of Search ............... 358/210, 185, 108, 106, 358/104, 93, 183; 340/147 P; 352/87, 179

[56] References Cited

U.S. PATENT DOCUMENTS 3,747,087 7/1973 Harrison et al. .................... 358/93 X

OTHER PUBLICATIONS

Color Television Camera Control by a Microcomputer, Wakui et al., NHK Lab. Notes, No. 181, pp. 1-7, Sep. 1974.
A Colour Camera with Digital Control, Cosgrove, Royal Television Society Journal, vol. 15, No. 8, pp. 275-276, 279-283, Mar./Apr. 1975.
Automatic Program Control System for Television Broadcasting, Motohashi, NEC Research and Developm. (Japan) No. 17, Apr. 1970, pp. 35-45.

*Primary Examiner*—Bernard Konick
*Assistant Examiner*—Aristotelis M. Psitos
*Attorney, Agent, or Firm*—Fitzpatrick, Cella, Harper & Scinto

[57] ABSTRACT

A device for controlling a television camera of a type, wherein a control quantity of the television camera is converted to an electrical signal and stored in a memory circuit, and, at the time of reproduction, the television camera is controlled to a desired mode on the basis of the electrical quantity stored in the memory circuit.

10 Claims, 27 Drawing Figures

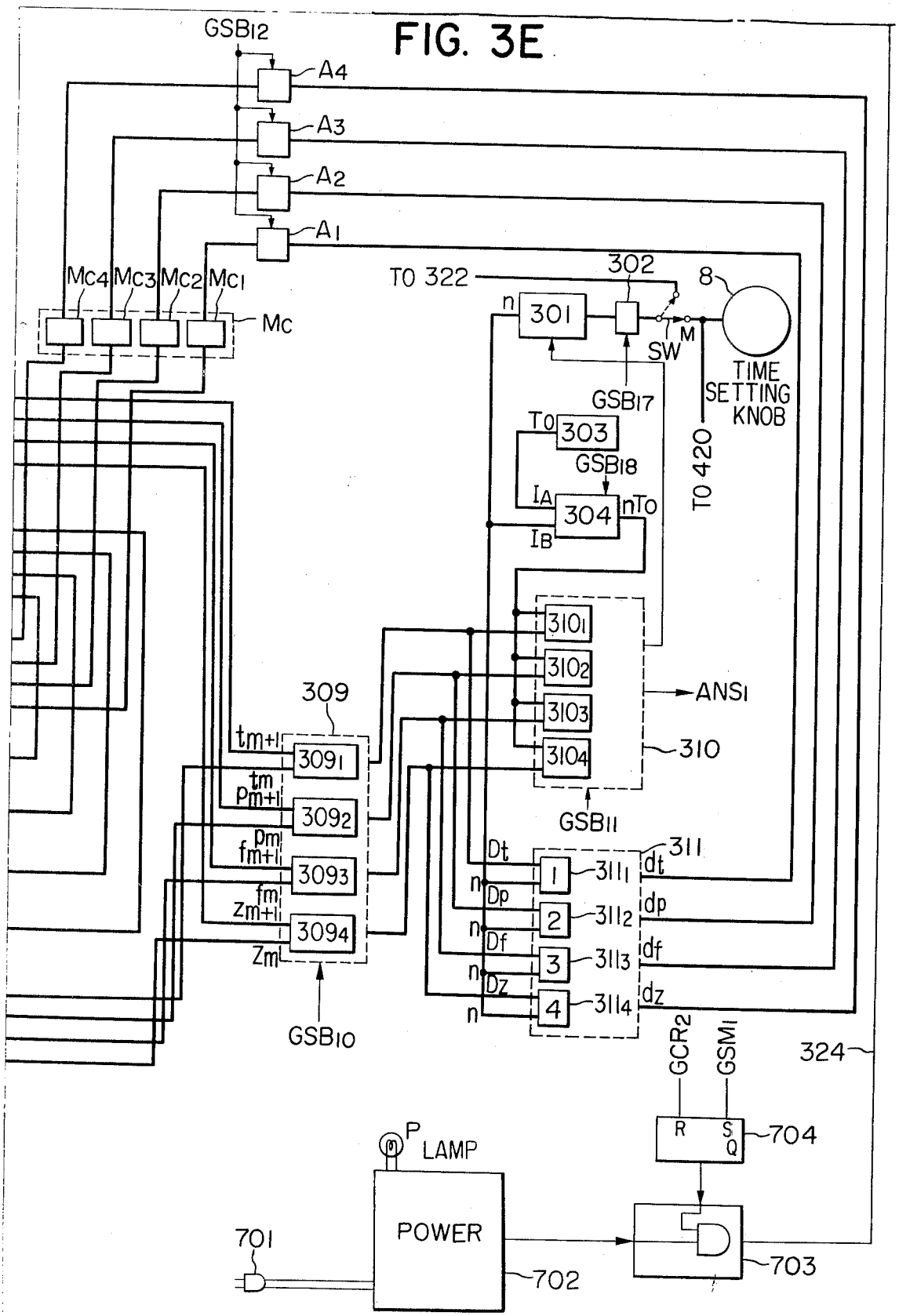

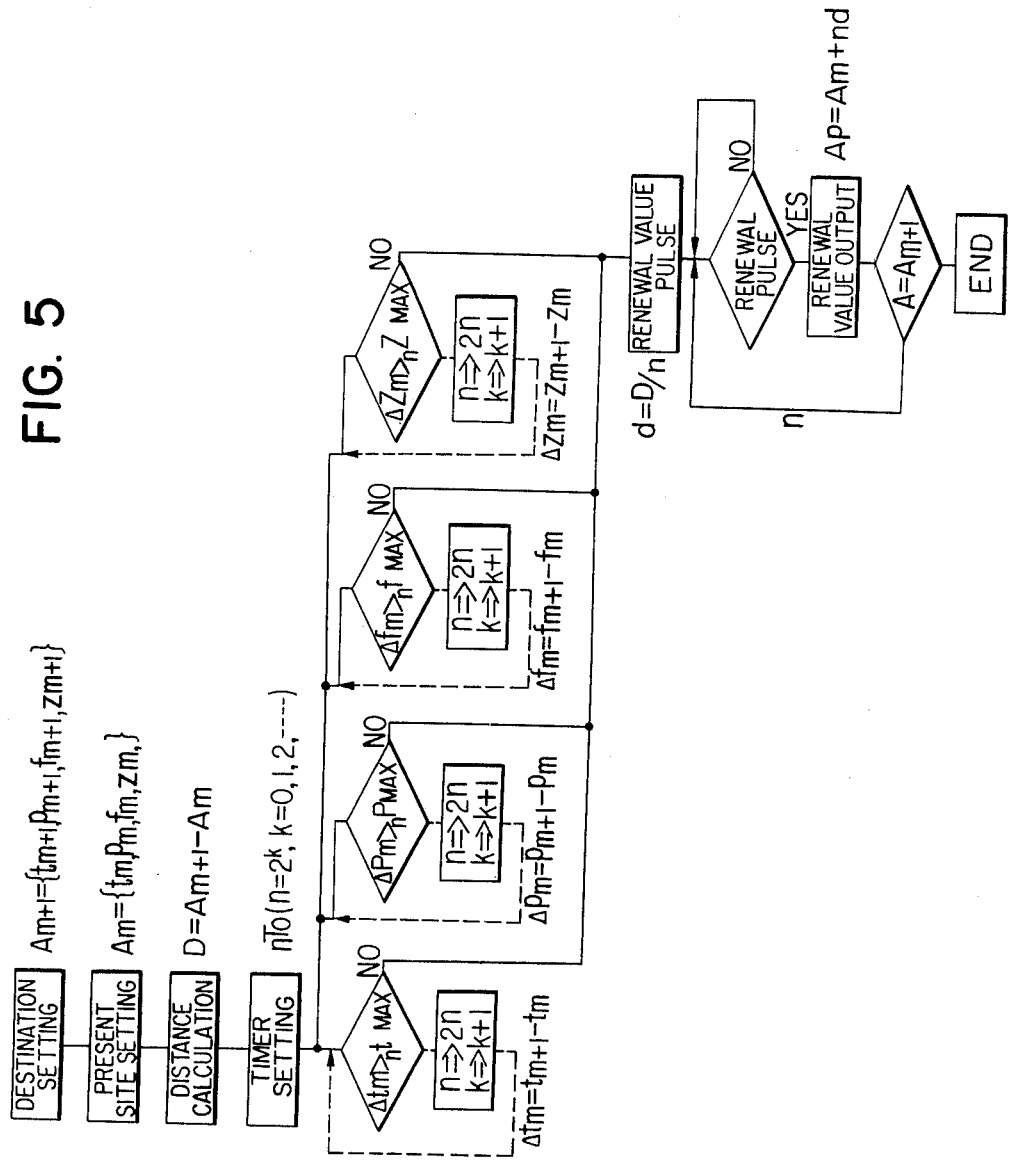

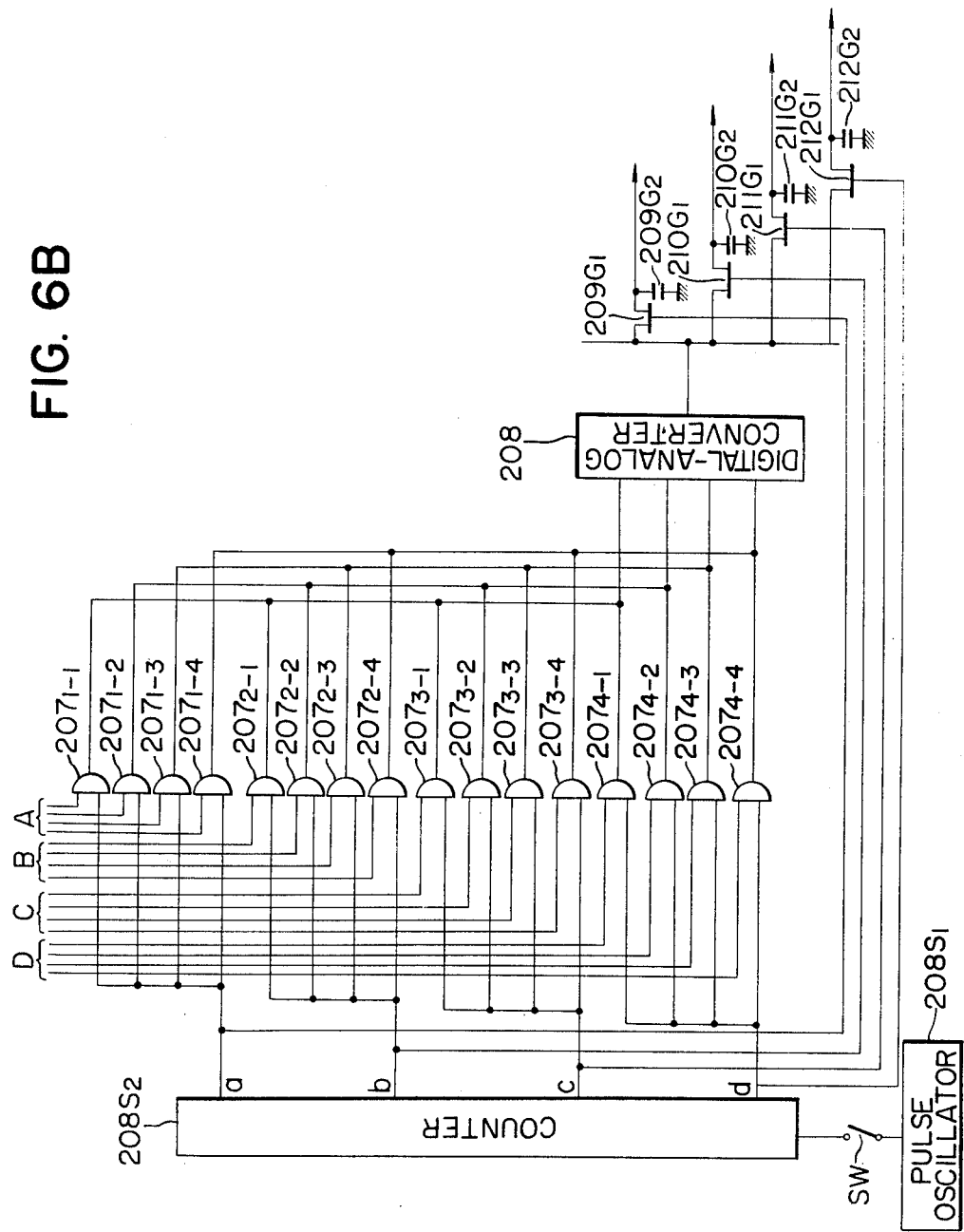

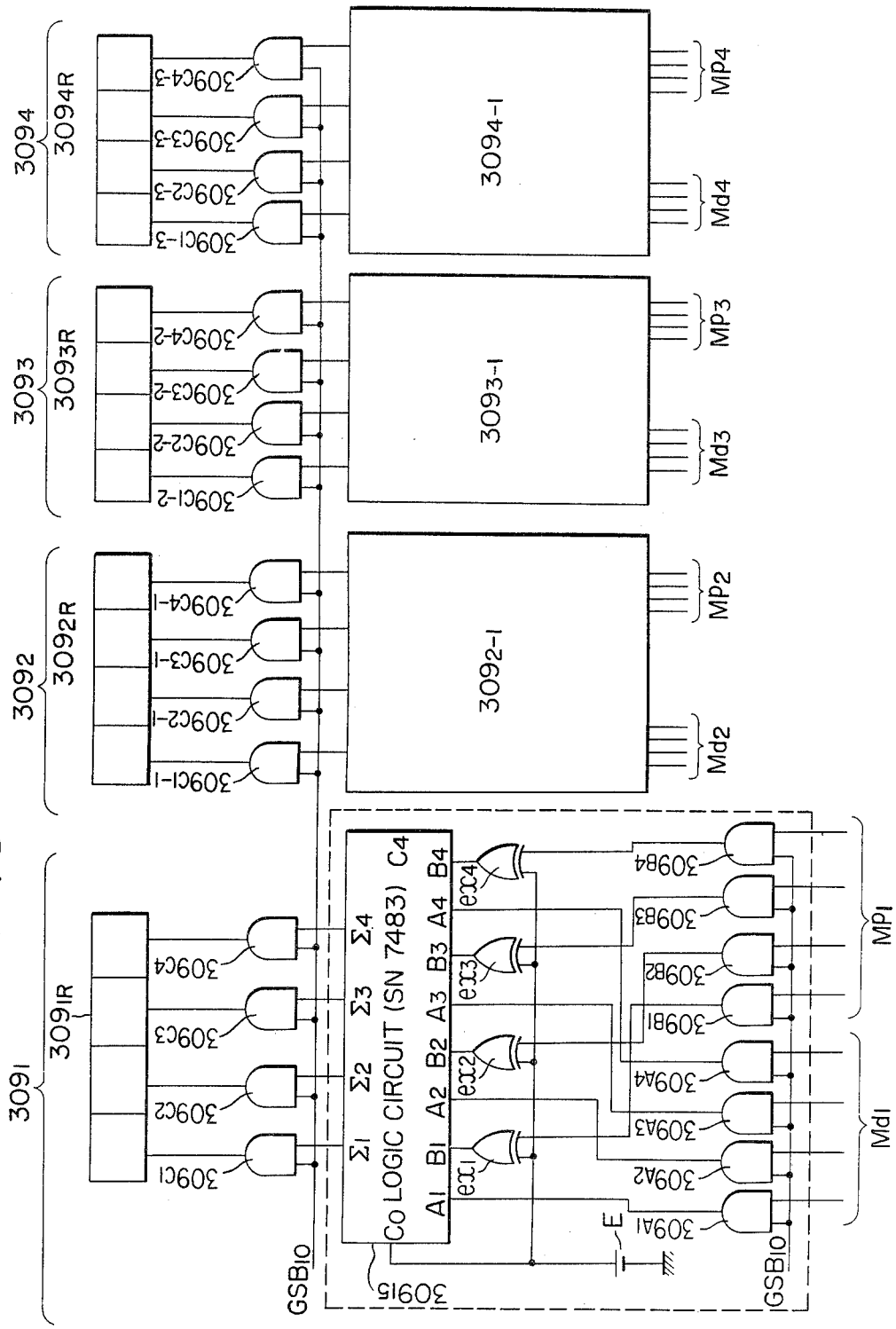

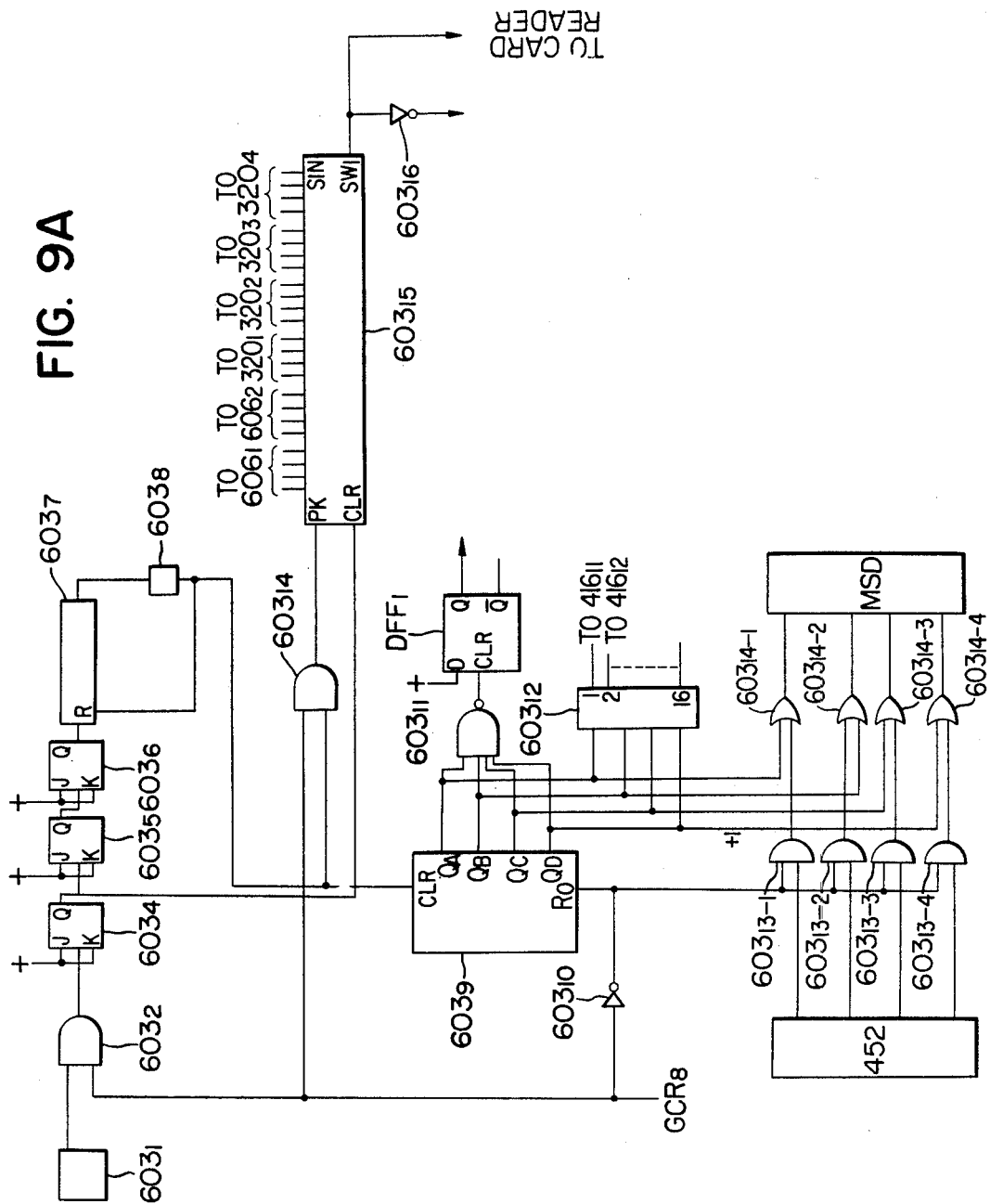

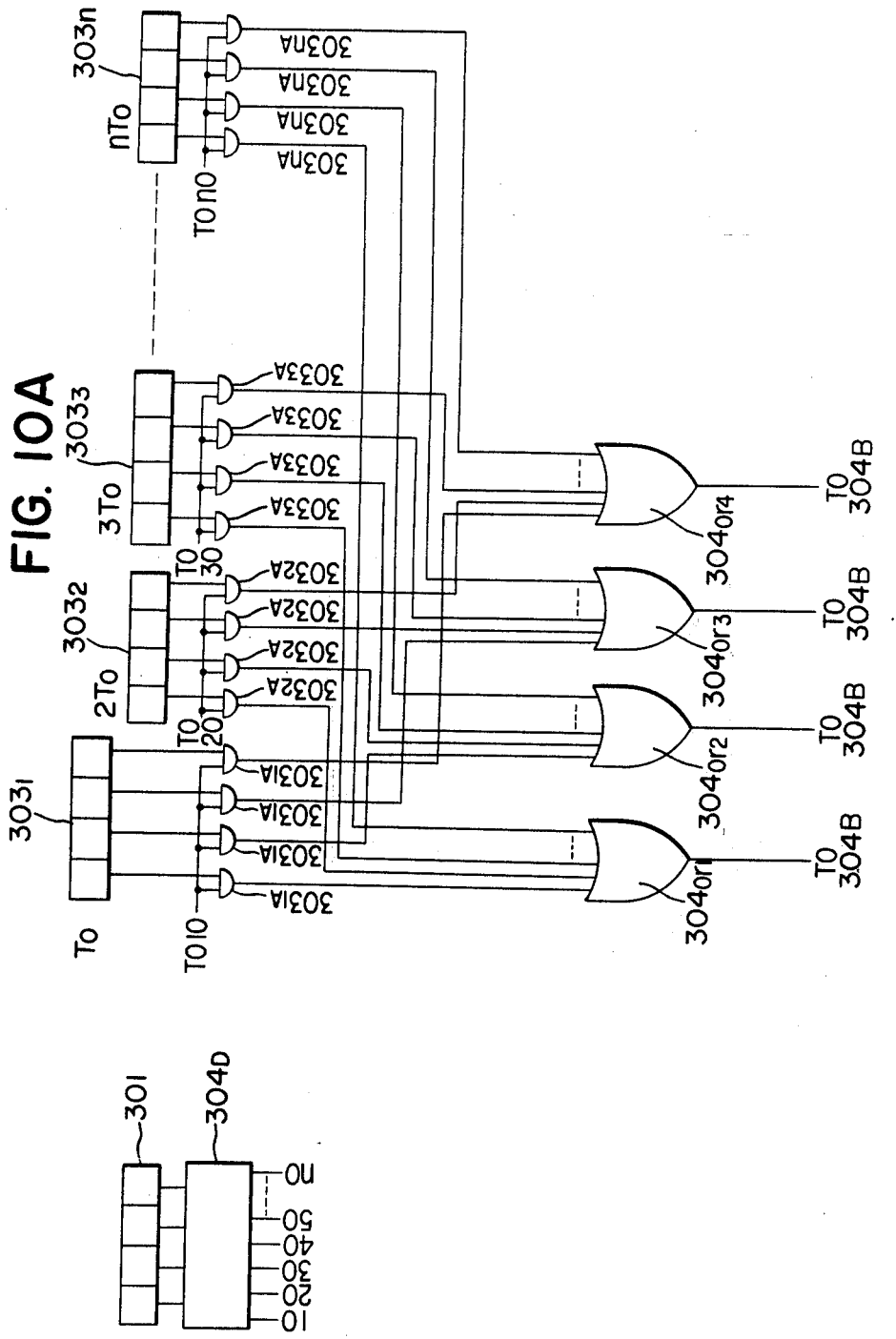

CONTROL DEVICE FOR TELEVISION CAMERA

This is a continuation of application Ser. No. 706,486, filed July 19, 1976, now U.S. Pat. No. 4,123,782, issued Oct. 31, 1978.

BACKGROUND OF THE INVENTION a. Field of the Invention

This invention relates to a remote control device which controls a device such as television camera, etc. to be disposed at a remote distance from an operating table.

b. Description of Prior Arts

There have heretofore been known various types of television camera devices to be remote-controlled on the basis of operating signals from an operating table, most of which are of such type that, when the television camera is to be remotely operated in a plurality of desired modes, such modes are preset on the side of the operating table in accordance with such various modes by the use of a plurality of potentiometers, and, at the time of the remote control operation, these potentiometers are sequentially selected according to the need, the signal from which is used as the remote control signal. Since the potentiometer per se has essentially high resolving power, precision in the control signal per se is satisfactory. However, when the desired modes of control to be set are numerous, number of the potentiometer required should correspond to number of the control mode. Still more, when a plurality of potentiometer is required to define each of the established modes, the number of the potentiometer remarkably increases with the result that correspondence between each of the potentiometers at the operating table and each of the established modes becomes difficult, which has been the main cause for poor operability.

Further disadvantage in the conventional remote control device utilizing such potentiometers is that, when the conditions for each established mode are corrected, the preset values for the mode are destroyed and the established mode cannot be restored.

Explaining in more detail the known type of remote control device for the television camera having such disadvantages, the following six major control elements for the television camera are usual, i.e., panning, tilting, zooming, focussing, aperture (or iris), and camera height (or level). Accordingly, when the television camera is to be controlled by the operating table which is remote from the TV camera, these various kinds of control signals are fed from the operating table to the television camera, and, while watching a monitor at the side of the operating table, the potentiometers are adjusted to regulate each of the control elements of the television camera so that the monitored image may become a predetermined image. In this manner, the television camera is controlled to a desired established mode. In case the established mode is plural, additional groups of the potentiometers are adjusted, and, in the same manner as mentioned above, while watching the image pick-up condition of the television camera, the control signals are fed to the control elements of the TV camera to establish the potentiometer groups. Upon completion of the setting operations of the potentiometers, if the images to be picked up by the television camera are to be sequentially selected on the basis of the established modes of each television camera (this image to be picked up by the TV camera will be called hereinafter "shot"), each potentiometer group may be sequentially selected. In other words, the above-described conventional remote control device for television camera mechanically stores the established modes of the television camera by the adjustment quantity of the potentiometers, based on which stored quantity the television camera is remote-controlled.

In this consequence, when the number of the control elements to define the established modes and each mode is increased, the number of the potentiometer also increases accordingly with the result that there accrue various defects to be enumerated in the following.

(1) the area to be occupied by the potentiometer knobs on the operating table becomes large to make it unable to increase the shot number to a desired extent;

(2) since a great many potentiometers are arranged on the operating table, it is highly difficult to recognize which potentiometer knob corresponds to which control element of the television camera, hence operability of the remote control device is poor;

(3) since each of the control elements is independently remote-controlled by the potentiometer, each control element is driven independently with the consequence that the pick-up image is extremely unsightly;

(4) after adjustment of the potentiometer, when the re-adjustment thereof is effected for correction, the original set position is lost, and it becomes impossible to reproduce the shot of the originally established mode;

(5) since the device is controlled by analog signals, it is impossible to connect the device with an external computer; and (6) since the set value for each control element is different from one to the other, the operational time for reproduction of each control element, at the time of the shot reproduction, is also different with respect to each control element, hence the image thus reproduced is unsightly.

SUMMARY OF THE INVENTION

The purpose and object of the present invention are therefore to provide an improved device for controlling television camera on the basis of an electrical signal stored in a memory device, which electrical signals are necessary for each established mode of the television camera.

It is another object of the present invention to provide a control device for television camera which converts each of the established modes of the television camera into digital signals to be stored in the memory device, on the basis of which the television camera is controlled.

It is still another object of the present invention to provide a control device for television camera which is provided with shot memory means to store therein electrical signals corresponding to each established mode of the shot for the television camera, and shot sequence memory means to store therein the sequence of the shot for reproduction, whereby shot reproduction is carried out in the sequence of the shots stored in the shot sequence memory means at the time of the shot reproduction.

It is other object of the present invention to provide a control device for the television camera which enables each shot to be repeatedly reproduced, once it is established in the shot memory means by first recording electrical signals stored in the abovementioned shot memory means into a magnetic card, and by re-storing the electrical signals corresponding to each established mode from the magnetic card into the shot memory means.

It is still other object of the present invention to provide a control device for the television camera, which is capable of performing, at the time of power supply stoppage, automatic reproduction of each shot by automatically transferring the electrical signals recorded in the abovementioned magnetic card into each memory means.

The foregoing objects and other object as well as features and advantages of the present invention together with the detailed construction and functions of the device according to the present invention will become more apparent and understandable from the following description of a preferred embodiment of the present invention, when read in conjunction with the accompanying drawing.

BRIEF DESCRIPTION OF THE DRAWING

In the drawing:

FIGS. 3A to 3E respectively show electrical circuits constituting the remote control device shown in FIG. 1, wherein FIGS. 3A, 3B and 3C are detailed wiring connection diagrams of a drive control circuit, a magnetic card circuit, and a control circuit for camera control signal; and FIGS. 3D and 3E are detailed wiring connection diagrams of an operational control circuit, and a power source circuit;

FIG. 5 is a flow chart of the operations to be rendered by the circuits shown in FIGS. 3D and 3E;

FIG. 6B is a circuit diagram showing one embodiment of sampling circuit 208S, selection circuit 207, and sample-and-hold circuits 209G to 212G shown in FIG. 3C;

FIG. 7D is a circuit diagram showing one embodiment of subtraction circuit 309 shown in FIG. 3E;

FIG. 9A is a circuit diagram showing one embodiment of write-in circuit 603 shown in FIG. 3A;

FIG. 10A is a circuit diagram showing one embodiment of the digital multiplier shown in FIG. 7A.

DETAILED DESCRIPTION OF PREFERRED EMBODIMENTS

In the following, detailed explanations will be made of the remote control device for television camera, in reference to the accompanying drawing, in which the actual embodiment of the present invention is incorporated.

(I) External Construction

Figure 1:
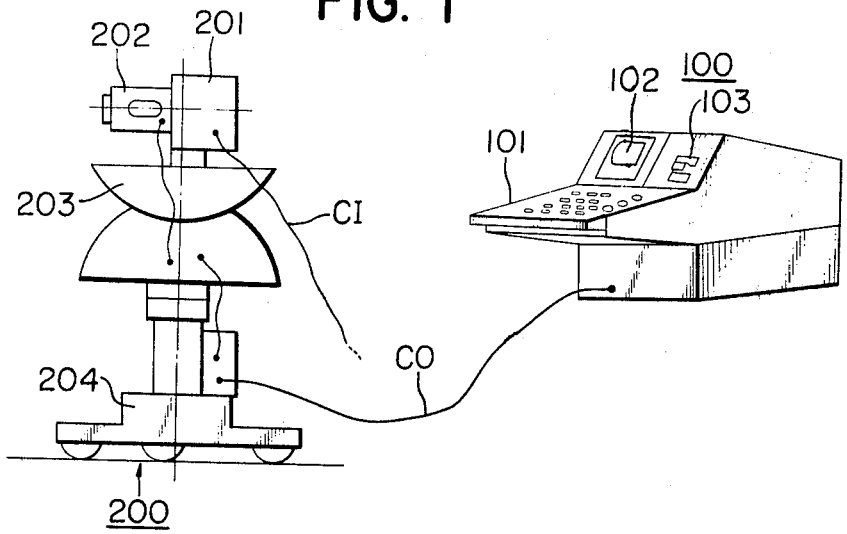
FIG. 1 is an overall arrangement of a television camera and the remote control device therefor connected together by a connector line.

FIG. 1 shows overall construction of and connection between a television camera and a remote control device therefor, in which a numeral 100 designates an operating table, 200 refers to a television camera which is connected with the operating table by a connector cable CO to be remote-controlled.

On an operating panel 101 of the operating table 100, there are provided control buttons and knobs shown in FIG. 2, a television monitor 102, and a part of a magnetic card reader 103 constituting a part of an external memory device to be described later.

On the other hand, the television camera 200 is constructed with a camera main body 201, and an image pick-up lens 202 mounted on a universal head 203 held on a tripod 204. The camera 201 and the universal head 203 incorporate therein servo-motors to effect focussing, zooming, tilting and panning of the lens, and potentiometers to detect set positions of the television camera, all of which are held within the respective components in an independent manner.

In the above-outlined construction of the television camera and the remote-control device, when set quantities of the control elements such as focussing, etc. are fed from the remote-control device to the television camera in the form of an electrical signal through the connector cable Co, the relevant servo-motors start driving. Similarly, a position setting signal of the potentiometer within the camera and the universal head is fed-back to the operating table through the connector cable Co. Incidentally, designated by CI in FIG. 1 is a transmission path for image pick-up signals such as an image to be televised, synchronous signals, and so on.

The control buttons and knobs arranged on the operating board panel 101 of the operating table 100 (vide FIG. 2) have various functions to be described hereinbelow.

Knobs 1 to 4 are for adjusting tilting, panning, focussing, and zooming of the image pick-up lens 202. On the respective rotational shafts of these knobs, there are provided rotary encoders to produce digital signals in correspondence to revolution of the knobs, thereby establishing the control elements such as panning, etc. on the side of the television camera.

A button 5 is for shot memory which sequentially sets the camera to a desired mode. This button is depressed when the established information of any of the knobs 1 to 4 necessary for the particular mode is to be stored in the memory device as an input. After depression of this button, any of the television knobs 1 to 4 is so set that the camera may pick up a desired shot. Then, when any of shot buttons $6_1$ to $6_{15}$ is depressed, the set signal of each knob enters into a predetermined address portion in a memory device to be described later in the form of a digital signal.

Buttons $7_1$ to $7_{15}$ are for patterns to be presented on television, each of which is correspondingly disposed to each of the shot buttons $6_1$ to $6_{15}$. The desired patterns to be televised are illustrated in a simple pattern on the surface of each button.

A knob 8 is for setting time, by which a shifting time for a cut scence to be described hereinafter is selected. By this time setting knob 8, there is formed a control signal to adjust a timer to be described later, the signal of which is forwarded to the memory device as an input together with the established informations of the knobs 1 to 4. Incidentally, the shot buttons $6_1$ to $6_{15}$ are provided therein with indicator lamps in red and yellow colors. The red lamps are turned on by depressing the button having therein the relevant red lamp, when the write-in operation of a desired mode is to be carried out in the memory device to be described later. At the time of reproduction of the desired mode as stored in the memory device, the red lamps, when it is turned on, indicates that any of the relevant shot buttons $6_1$ to $6_{15}$ or change buttons to be described later has been selectively depressed. The lighting of the yellow lamps in the shot buttons $6_1$ to $6_{15}$ indicates that, at the time of the write-in operation into the memory device, any of the relevant shot buttons $6_1$ to $6_{15}$ has been selectively and sequentially depressed, and the write-in operation has been completed. At the time of the read-out operation from the memory device, a construction is such that the yellow lamps in the button corresponding to the shot position to be read out subsequently from the informations to be sequentially read out by the operation of the change buttons to be described later may be turned on.

A button 9 is for shot sequence memory, which is depressed at a time when presetting operation of each shot is completed by the operation of the shot memory button 5. After this depression of the shot sequence memory button 9, the shot buttons $6_1$ to $6_{15}$ are depressed in the sequence of desired shots, whereby the sequence of shot is stored in the memory device together with the time factor to be established by the abovementioned time setting knob 8. This shot sequence is simultaneously displayed on display means $10_1$ to $10_{15}$ as a shot number.

A button 11 is an actuation button, by which an information required for each shot is read out of the memory device in the sequence of the shots to be indicated on the shot sequence indicating means $10_1$ to $10_{15}$ by the depression of the change button 12, whereby the servomotors in the television camera are driven by the readout signals through various circuits to be described hereinafter. Incidentally, when the time setting knob 8 is preset at "Auto" (automatic time setting), shifting to the subsequent shot is effected after lapse of time as preset in the memory device.

$13_1$ to $13_{15}$ designate display devices which indicate, by sequential lighting of lamp, a subsequent receiving and holding portion in the memory device of the shot sequence in correspondence to the address to be received and stored in the memory device at the time of storing the shot sequence in the memory device.

$14_1$ to $14_{15}$ also designate display devices which indicate a present position and reproduction position, at the time of the shot reproduction. A button 15 is for clearing the contents in the memory device. A button 16 is a power source switch. Buttons 18 and 19 are for shifting the shot establishing sequence or shot reproduction sequence to one shot forward or one shot reverse. A button 20 is for starting the shot establishing sequence or shot reproduction sequence over again from the beginning.

Buttons 21 to 23 are, respectively, a magnetic card operating button, a read-out button for storing informations in the magnetic card into an internal memory device, and a write-in button for transferring and storing informations in the internal memory device into the magnetic card.

A button 24 is a correction button, which effects correction of the mode of the television camera at the time of the shot reproduction by first resetting any of the knobs 1 to 4 to a corrective position, and then depressing this correction button.

A button 25 is a change-over switch for both fine and rough adjustments. When any of the knobs 1 to 4 is revolved by changing it over to the side of the fine adjustment, output signals from the rotary encoders are attenuated to thereby vary the established quantity to a remarkable extent and to attain the fine adjustment.

In all of the afore-described buttons 5, 9, 11, 12, 21, 22 and 23, there are incorporated lamps for verifying the required operations to have been done properly, which lamps are turned on simultaneously with depression of the respective buttons, and which are turned off by depression of other buttons not having such lamps. Also, the buttons 15, 18, 19 and 20 are turned on only when they are depressed, and the remaining buttons, except for the abovementioned shot buttons $6_1$ to $6_{15}$, are so constructed that they may not be subject to any instructions during performance of the operations to be described later, even when they are depressed.

FIGS. 3A to 3E show respectively the overall circuit construction of both remote control device and television camera control device, each portion of the electrical circuits being explained in detail in the following.

Figure 3A:
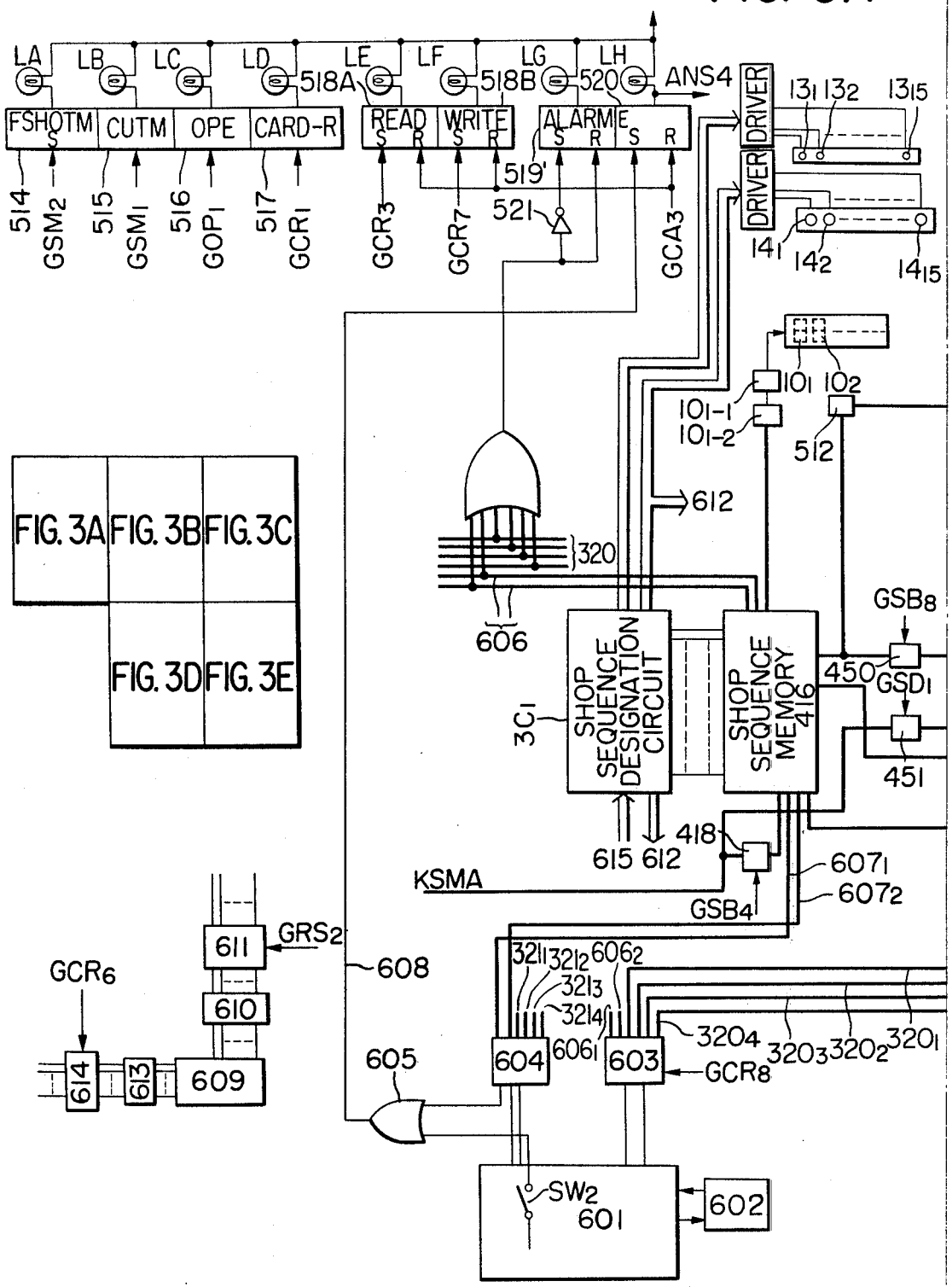
Figure 3B:
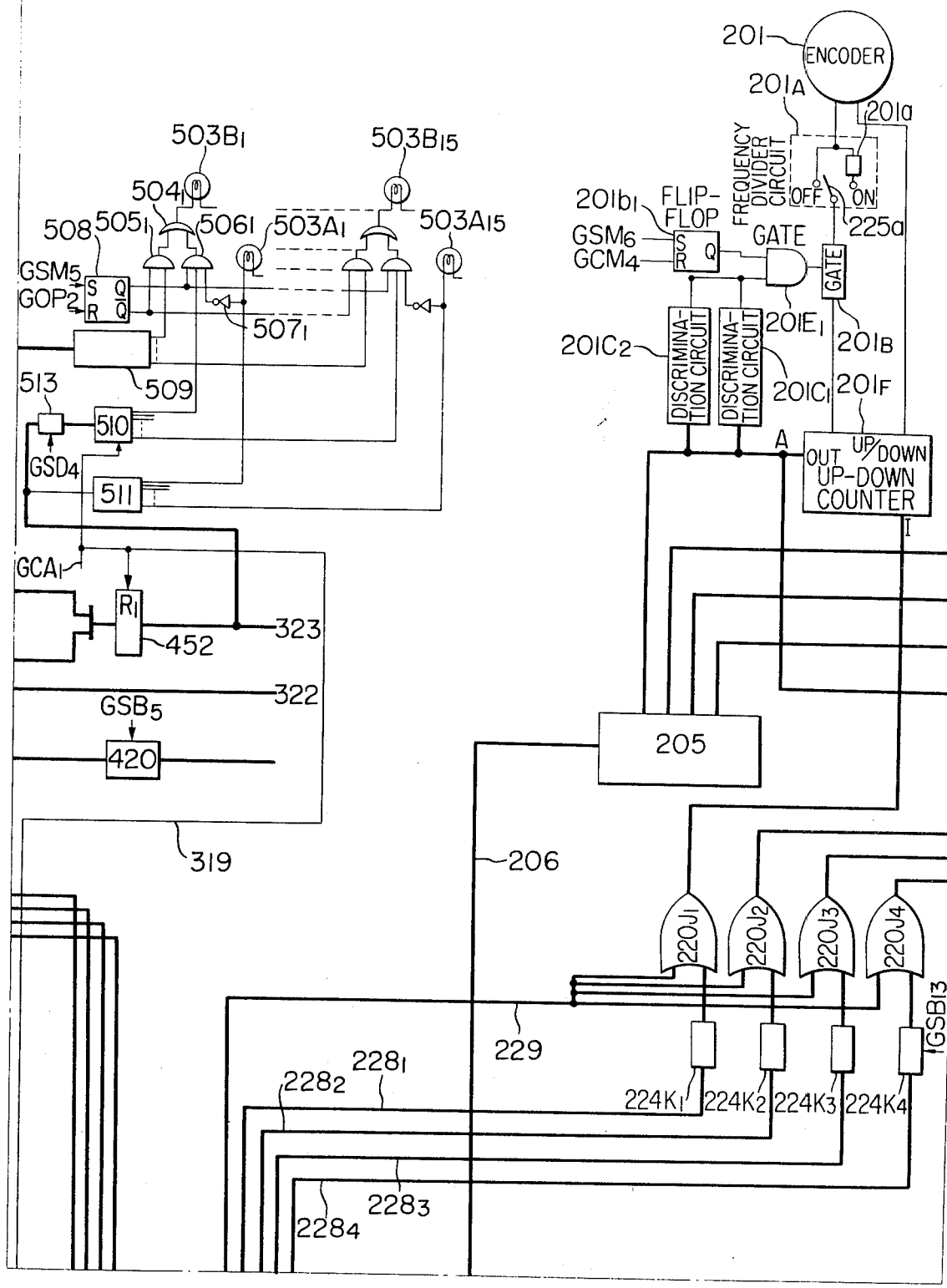
Figure 3C:
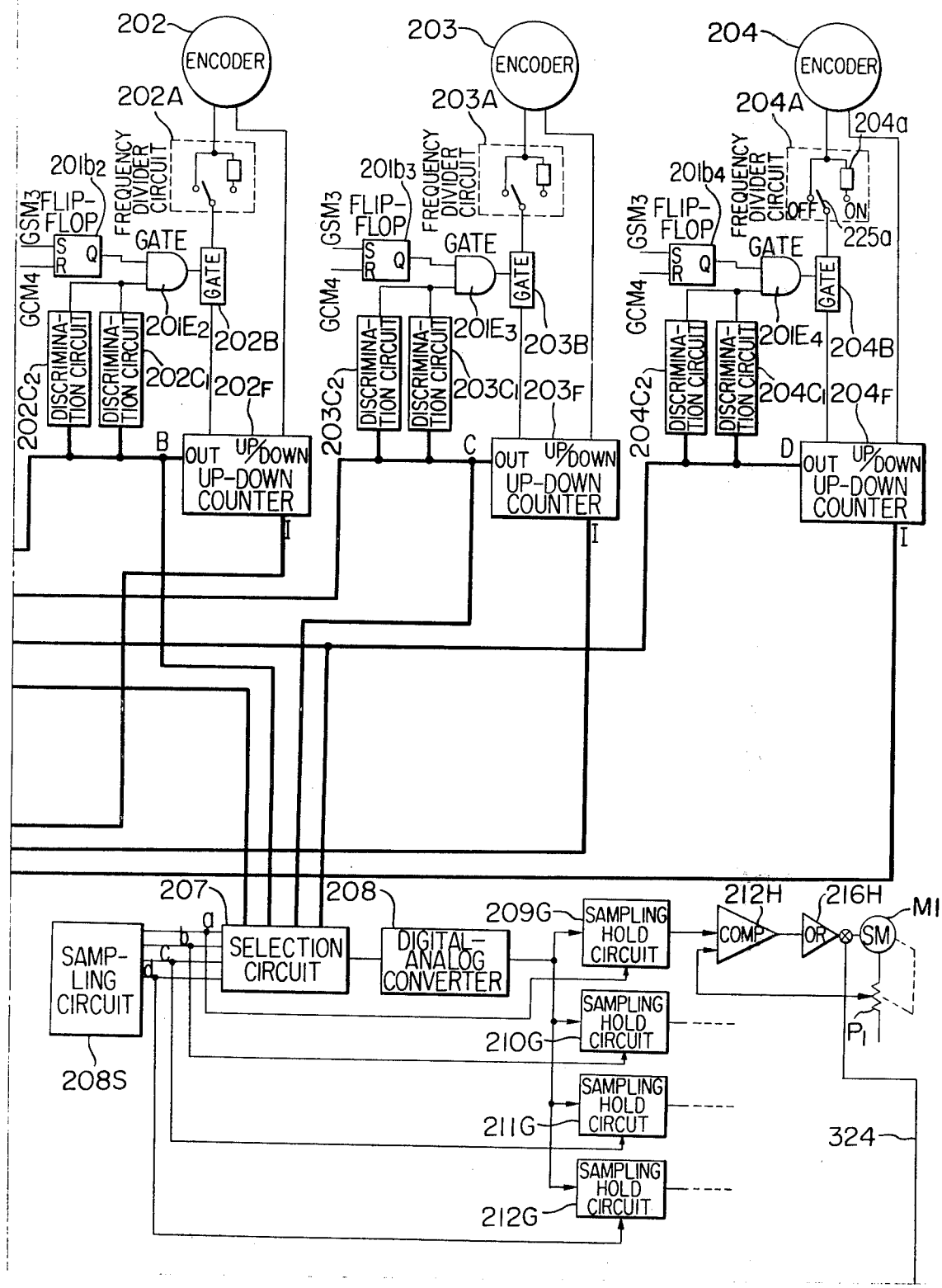

(II) Control Circuit for Television Camera Control Signal (vide: FIGS. 3B and 3C)

This circuit component is to servo-control the control elements for the television camera by the set quantities of the adjustment knobs 1 to 4, or by control signals from the operational circuit to be mentioned hereinafter.

In FIGS. 3B and 3C, reference numerals 201 to 204 designate rotary encoders to be set by the adjustment knobs 1 to 4 for tilting, panning, focussing, and zooming of the image pick-up lens 202. In other words, they are angle-pulse number converter to generate pulses having a pulse number corresponding to an amount of revolution of the knob, in which a polarity of a phase difference to be generated is reversed.

Reference numerals 201A to 204A are respectively frequency divider circuits to be connected to the respective rotary encoders 201 to 204, each circuit being constructed with a frequency divider 201a and a selection circuit forming switch 225a, as is clearly shown in the frequency divider circuit 201A. The switch 225a is interlocked with the changeover switch 25 for fine and rough adjustments, the fine adjustment being carried out when it is closed.

Reference numerals 201B to 204B are respectively gate circuits connected to the output of the frequency divider circuit. To the inputs of these gate circuits, there are connected outputs of gate circuits 201E$_1$ to 201E$_4$ with both discrimination circuits 201C$_1$ to 204C$_1$ and 201C$_2$ to 204C$_2$ and outputs of flip-flops 201$b_1$ to 201$b_4$ to be reset by synchronous control signal GSM3 from a sequence control circuit, to be described below with relation to the and-gates.

201F to 204F are up-down counters, wherein reference letters A to D respectively designate counter outputs of the respective up-down counters.

A reference numeral 205 designates a data compiling circuit which connects the outputs A to D of the respective counters 201F to 204F to its output, is time-divided by the respective outputs, and sends out from its output 206 the time-division outputs in parallel.

A reference numeral 207 is a selection circuit, which selects the outputs A to D of the respective up-down counters 201F–204F by means of sampling signals a to d from a sampling circuit 208S, and feeds the selected outputs A to D into a digital-analog converter (D-A converter) 208 one by one.

209G to 212G are sample-and-hold circuits, which select analog signals from the digital-analog converter 208 by means of analog signals from the sampling circuit 208S, and maintain the respective outputs of the counters 201F to 204F in the respective circuits 209G to 212G after the digital-analog conversion.

Each sample-and-hold circuit connects a comparison circuit 212H, an amplifying and driving circuit 216H, and a servo-motor M to its output so as to adjust tilting, panning, focussing, and zooming operations of the television camera by the servo-motor. Each servo-motor is interlocked with the potentiometer P, and, by feeding an output from the potentiometer back into the comparison circuit 212H, an adjusted quantity of each control element is inserted into a servo-circuit 703.

The discrimination circuits 201C$_1$ to 201C$_2$ are to discriminate that the counted value of the counter 201F is within a certain definite numerical value. They are to adjust the revolving quantity of the knob 1 within its maximum and minimum ranges of adjustable quantity for tilting of the television camera. Each pair of discrimination circuits 202C$_1$, 202C$_2$, 203C$_1$, 203C$_2$; and 204C$_1$, 204C$_2$ for each of the remaining counters 202F to 204F possesses the same function as the circuits 201C$_1$, 201C$_2$.

The data compiling circuit 205, same as the selection circuit 207, is composed of a multiplexer, and receives from the respective inputs A to D digital signals of the control elements to be established, and transfers the signals to the shot memory to be described in more detail hereinafter. The output digital signals of the rotary encoders 201 to 204, in the cycle period, during which the gates 201B to 204B are opened by the control signal GSM3, provide servo-drive signals for the motors M$_1$ (M$_2$ to M$_4$ not being shown) through the counters 201F to 204F, the selection circuit 207, the digital-analog converter 208, and the sample-and-hold circuits 209G to 212G, and set the control elements for the television camera such as tilting, panning, focussing, and zooming in accordance with the set quantities by the mode setting knobs 1 to 4. Accordingly, an operator becomes able to set the desired modes of the television camera and pick up the predetermined shot by the camera, while observing the monitor 102 on the operating table 101. Each of the abovementioned up-down counters 201F to 204F is provided with a preset input terminal I. Each input terminal is connected to a reference position digital signal generating circuit to be described hereinafter through or-gates 220J$_1$ to 220J$_4$ and a connecting line 229 connected to one of the input terminals of the or-gates. On the other hand, the other inputs of the or-gates 220J$_1$ to 220J$_4$ are connected with "present-site" registers of the operational control circuits to be described later through and-gates 224K$_1$ to 224K$_4$. Accordingly, in the cycle period wherein the control signal GSB$_{13}$ enters into the gates 224K$_1$ to 224K$_4$ as an input, the counters 201F to 204F are set at a definite calculated value by a reference signal from the reference position digital signal generating part, whereby the servo-motor M$_1$ for establishing the tilting mode of the television camera is set at a predetermined position. The other control elements are also controlled in the exactly same manner as described in the foregoing.

Figure 6A:
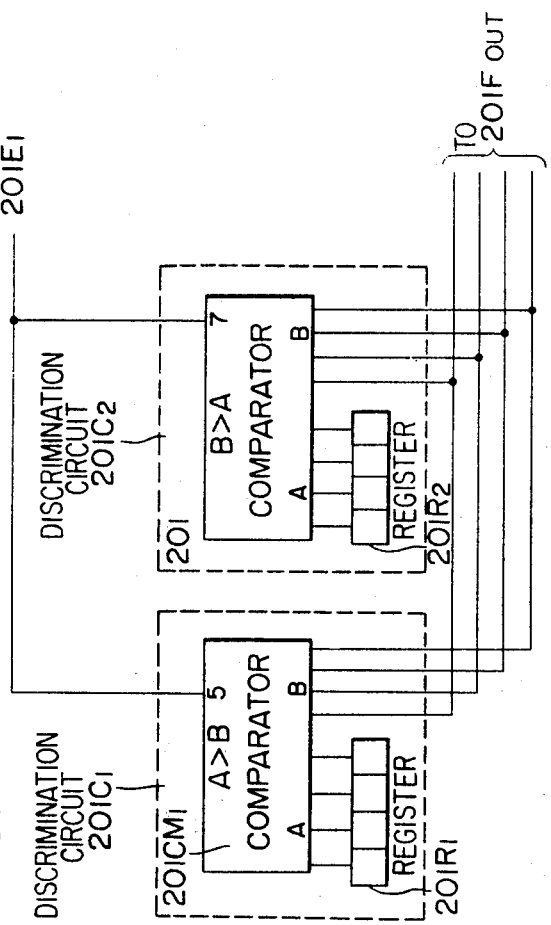
FIG. 6A is a circuit diagram showing one embodiment of discrimination circuits $201C_1$ and $201C_2$ in FIG. 3B.

FIG. 6A is a circuit diagram showing one embodiment of the discrimination circuits 201C$_1$ and 201C$_2$ shown in FIG. 3B, wherein reference numerals 201R$_1$ and 201R$_2$ designate registers. In these registers, there are stored binary code values corresponding to the count limit values (e.g., 0000, 1111) in the abovementioned counters. Designated by reference numerals 201CM$_1$ and 201CM$_2$ are 4-bit comparators (e.g., N7485 of Sigmatic Inc.), the inputs A of which are connected to registers 201R$_1$ and 201R$_2$, respectively, and the other inputs B of which are connected to the output terminal of the counter 201F. The outputs of the comparators are connected to the abovementioned and-gate 201E$_1$. In this particular embodiment, the discrimination circuits 201C$_1$ and 201C$_2$ alone are shown, but the remaining discrimination circuits are of the same construction.

FIG. 6B is a circuit diagram showing one embodiment of the sampling circuit 208S, the selection circuit 207, and the sampling hold circuits 209G to 212G shown in FIG. 3C, wherein a reference numeral 208S$_1$ designates a pulse oscillator to generate clock pulse to actuate a ring counter 208S$_2$, and SW designates a switch. The ring counter 208S$_2$ is actuated by the clock pulse generated from the pulse oscillator, and its output terminals a, b, c and d produce time-sequential output pulse signals. The sampling circuit 208S is therefore constructed with these pulse oscillator 208S$_1$, the ring counter, and the switch SW. Reference numerals 207$_{1-1}$ to 207$_{4-4}$ designate and-gates constituting the selection circuit 207, wherein one of the input terminals of each circuit is connected to the output terminal of the abovementioned counter 201F, and the other input terminal is connected to the output terminal a of the ring counter 208S$_2$. Also, one of the input terminals of each of the and-gates 207$_{2-1}$ to 207$_{2-4}$ is connected to the output terminal of the counter 202F, and the other input terminal thereof is connected to the output terminal b of the ring counter 208S$_2$. Further, one of the input terminals of each of the and-gates 207$_{3-1}$ to 207$_{3-4}$ is connected to the output terminal of the counter 203F, and the other input terminal thereof is connected to the output terminal c of the ring counter 208S$_2$. Furthermore, one of the input terminals of each of the and-gates 207$_{4-1}$ to 207$_{4-4}$ is connected to the output terminal of the counter 204F, and the other input terminal thereof is connected to the output terminal d of the ring counter 208S$_2$.

A reference numeral 209G$_1$ designates an FET (field effect transistor), the gate of which is connected to the output terminal a of the ring counter 208S$_2$. A reference numeral 209G$_2$ designates a capacitor. With both FET 209G$_1$ and capacitor 209G$_2$, the sample-and-hold circuit is composed. The remaining sample-and-hold circuits 210G to 212G are constructed in exactly the same way as mentioned in the preceding, i.e., with the FET and the capacitor.

Although the data compiling circuit shown in FIG. 3B does not illustrate its construction in detail, it may be in the similar construction to that of the selection circuit 207, whereby the outputs from the respective counters are taken out of the output terminals a through d of the ring counter in timed sequence.

The digital-analog converter 208 is constructed with a well known ladder circuit and the like, by which 4-bit digital input informations selectively entering thereinto through the and-gates 207$_{1-1}$ to 207$_{4-4}$ are converted into electrical analog quantities.

Figure 3D:
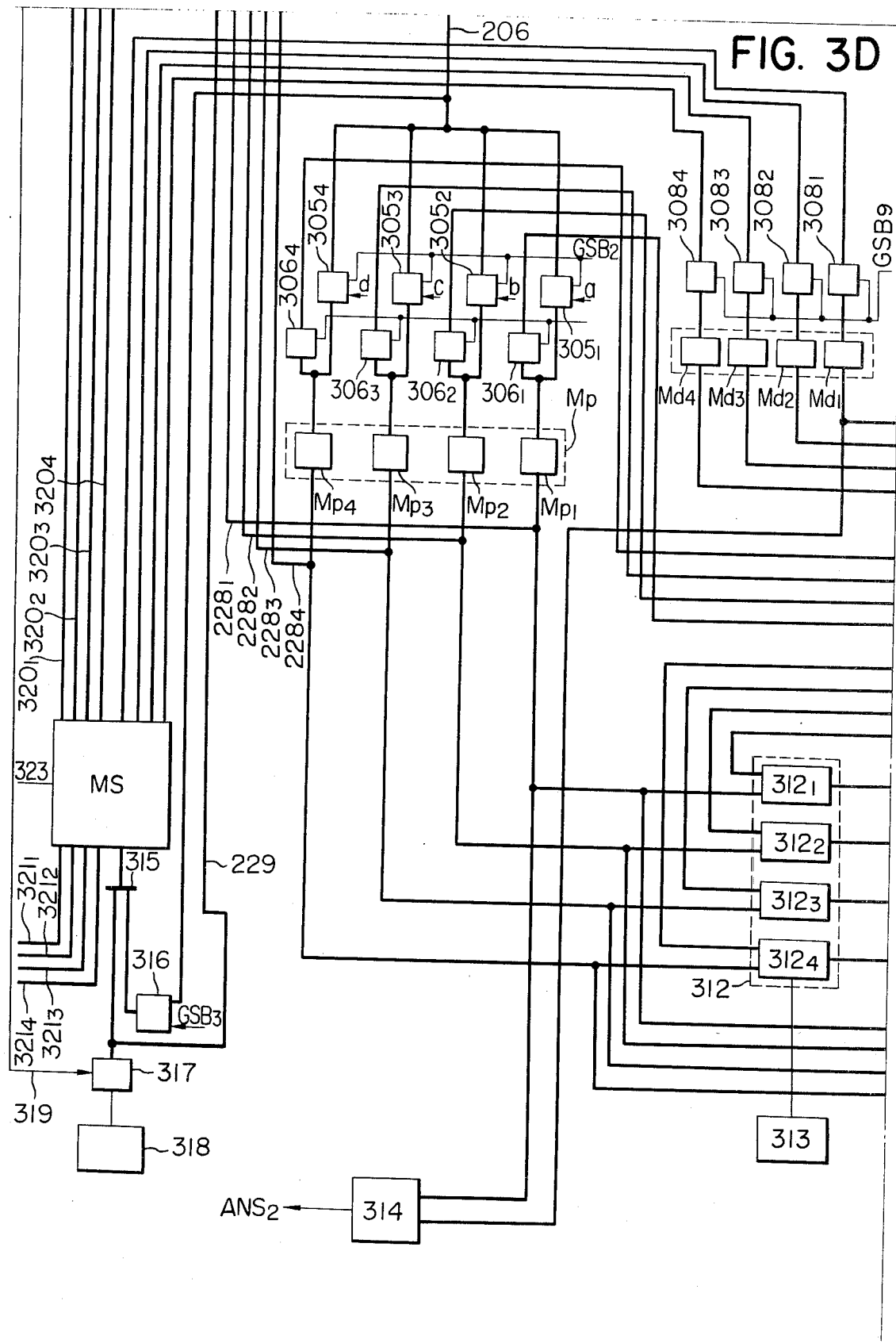

(III) Operation Control Circuit (vide: FIGS. 3D and 3E)

This operation control circuit is provided for the purpose of storing therein a desired shot time to be established for shifting the television camera from one desired mode (shot) to the next desired mode, and for changing the set time to another time, by which every control element of the television camera may be linearly shifted on the basis of this set time at the time of reproduction. The reason for such necessity is that the servo-motors M$_1$ to M$_4$ to drive each control element of the television camera require the maximum speed, i.e., the minimum time for adjusting each control element, and that, in the case of this embodiment, wherein the control elements are driven and controlled independently of the other, the adjustment quantity of each control element differs each other with the consequence that each control element operates individually and the image picked up by the television camera becomes unsightly.

In order to remove such disadvantages, this operation control circuit is employed for operating the established quantity of each control element with the required shot time as a reference, and with the maximum speed of the servo-motor as a function, and for correcting the required shot time, when necessary, so that the adjustment of each control element may be carried out linearly.

Figure 2:
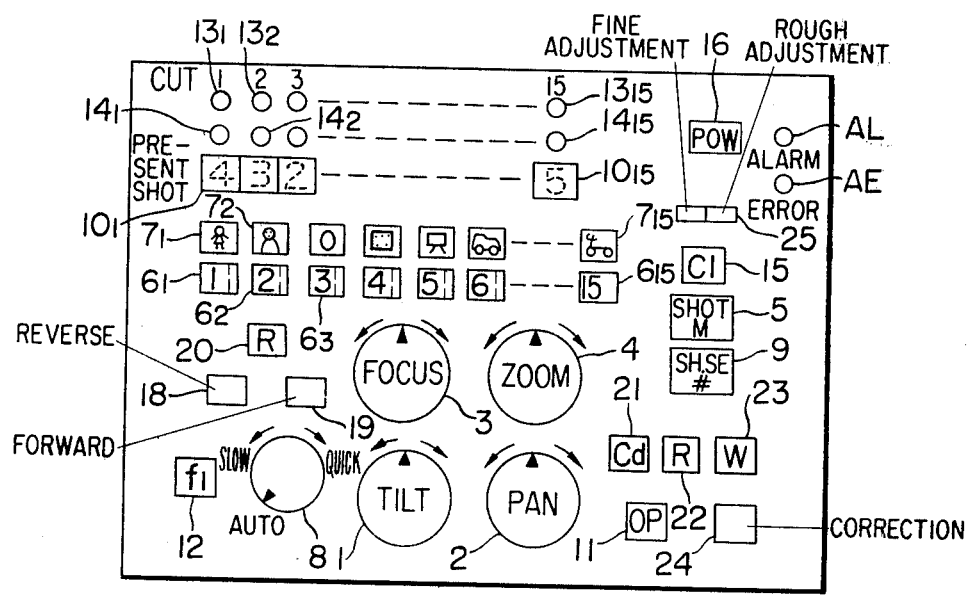
FIG. 2 is a plan view of a panel layout for operating keys and knobs on the operating table shown in FIG. 1.

In FIG. 3E, a reference numeral 8 designates the time setting knob shown in FIG. 2, by which the required shot time is established. Rotation of the knob 8 produces a digital signal corresponding to the time to be set. The time set by the time setting knob 8 is so adjusted that it may be an integer which is an integral multiple of a repetition time To of a pulse to be generated from a renewal pulse generating circuit to be described later. SW designates a switch interlocked with the time setting knob 8, by which selective change-over of position may be carried out between "AUTO" (for automatic control) position and "M" (for manual control) position. Position indexes for "AUTO" and "M" are displayed on the surface of the knob 8, and the change-over from one to another can be selectively done in association with revolution of the knob. A reference numeral 301 designates a timer register, into which a time encoding signal corresponding to the time adjusted by the time setting knob 8 enters through an and-gate 302, and in which it is temporarily stored. A reference numeral 303 designates a time reference value signal generating circuit, from which a digital value corresponding to a reference timing signal To is generated. 304 refers to a multiplication circuit which multiplies an output To of the reference value signal generating circuit 303 to be put into the input terminals I$_A$ and I$_B$ and an output n of the timer register 301 (n·To). The result of this multiplication indicates a quantity to drive each control element with respect to a time code (n) established by the time setting knob 8, in case each element is driven by each servo-motor at its maximum speed. Incidentally, the multiplication circuit executes the operational cycle by a control signal GSB$_{18}$ from the sequence control circuit to be described later. Reference numerals 305$_1$ to 305$_4$ and 306$_1$ to 306$_4$ designate and-gates. The and-gates 305$_1$ to 305$_4$ are opened by "and" of a control signal GSB$_2$ from the sequence control circuit and the outputs a to d of the sampling circuit, while the and-gates 306$_1$ to 306$_4$ are opened by a signal GSB$_{13}$ of the sequence control circuit. Reference symbols Mp, Md, and Mc designate memory registers composed of a plurality of registers, wherein Mp is a "present site" register, Md is a "destination" register, and Mc is a "renewal data" register. Mp$_1$ to Mp$_4$, Md$_1$ to Md$_4$, and Mc$_1$ to Mc$_4$ are respectively 4-bit registers constituting each of the plurality of registers. The "present site" registers Mp$_1$ to Mp$_4$ temporarily store the counted values of the counters 201F to 204F in the respective registers Mp$_1$ to Mp$_4$ through a line 206, when an input control signal GSB$_2$ from the sequence control circuit enters into the gates 305$_1$ to 305$_4$. Since the counted values of the respective counters 201F to 204F correspond to the quantities to immediately drive the servo-motors M$_1$ to M$_4$, each control element of the television camera is positioned at the "present site" as adjusted in accordance with the counted values of the counters 201F to 204F. The "destination" registers Md$_1$ to Md$_4$ receive transfer information from the shot memory to be described later through the gates 308$_1$ to 308$_4$, and temporarily store a part of the memory informations in the shot memory during the cycle period, wherein a control signal GSB$_9$ from the sequence control circuit is impressed. The shot memory, though to be described in detail hereinafter, functions in such a manner that, when the television camera is preset in a required mode so as to establish desired slots, it receives transfer of the counted values in the counters 201F to 204F necessary for establishing the modes through the line 206, and stores and holds in advance the set quantities for the control elements necessary for the established modes for the shots. Accordingly, when the gates 308$_1$ to 308$_4$ open, and the memory informations from the shot memory are stored in the registers Md$_1$ to Md$_4$, there will be held in the registers Md$_1$ to Md$_4$ the subsequent shots, i.e., the control element establishing quantities necessary for the destination. The "renewal data" registers Mc$_1$ to Mc$_4$ are for holding the results of the operations by the operational circuit to be described later. A reference numeral 309 designates a subtraction circuit which rerders subtraction between the memory informations in the "present site" registers Mp$_1$ to Mp$_4$ and the memory informations in the "destination" registers Md$_1$ to Md$_4$. Now assume that the control elements for the television camera, i.e., the set quantities or values from the reference position (intermediate portion) for the tilting, panning, focussing, and zooming of the camera are respectively expressed in terms of t, p, f, and z, the "present site" established values are expressed in terms of tm, pm, fm, and zm, and the "destination" established values are expressed in terms of tm+1, pm+1, fm+1, and zm+1.

The subtraction circuit performs the operations of $tm+1-tm$, $pm+1-pm$, $fm+1-fm$, and $zm+1-zm$ by the respective subtraction means $309_1$ to $309_4$. A reference numeral 310 designates a magnitude discrimination circuit which discriminate magnitude of output from the multiplication circuit 304 and outputs from the subtraction means $309_1$ to $309_4$ by magnitude discrimination means $310_1$ to $310_4$. $ANS_1$ refers to a discrimination signal of the discrimination circuit 310, which is excited when the output from the multiplication circuit 304 is larger than the outputs from the subtraction means $309_1$ to $309_4$, and which is then applied to the sequence control circuit, causes the control signal $GSB_{12}$ to excite, and causes the operational circuit to commence execution of the operations. Incidentally, when the output from the multiplication circuit 304 is smaller than the outputs from the subtraction means $309_1$ to $309_4$, an output from the magnitude discrimination circuit 310 is applied to a shift terminal of the timer register 301 with the consequence that the content of the timer register 301 is augmented twice as large as its original content and then put in the multiplication circuit as an input. The operational steps of the subtraction circuit 309, magnitude discrimination circuit 310 and the operational circuit 311 are shown in FIG. 5. In FIG. 5, the destination $(Am+1=\{tm+1, pm+1, fm+1, zm+1\})$ is set in the "destination" register Md, the present site $(Am=\{tm, pm, fm, zm\})$ is set in the "present site" register Mp. After the distance calculation $(D=Am+1-Am=\{D_t=tm+1-tm, D_p=pm+1-pm, D_f=fm+1-fm, D_z=zm+1-zm\})$ is performed by the subtraction circuit, when these calculated values are applied to the discrimination circuit 310, there commences the magnitude discrimination between these calculated values and n·To which has already been applied to other input terminal of the discrimination circuit 310. Since the value To, when viewed from the side of the servo-motors $M_1$ to $M_4$, corresponds to a set quantity that can be driven within a unit time To, in other words, the limit speeds tv max, pv max, fv max, and zv max, at the time when the respective servo-motors drive the respective control elements at their maximum speeds, the magnitude discrimination is done in the discrimination circuit 310 between $tm+1-tm$ and n·tv max, between $pm+1-pm$ and n·pv max, between $fm+1-fm$ and n·fv max, and between $zm+1-zm$ and n·zv max. In this case, if $tm+1-tm$ is greater than n·tv max, shifting from the present site tm to the destination at the limit speed is impossible within the time (n) established for the tilting value $tm+1$ required for arriving at the destination to be established. In such situation, the time (n) as established by the time setting knob 8 is augmented twice as large as the initial value and the discrimination is carried out again. This discrimination operation and change in the set time are repeated until $tm+1-tm$ becomes smaller or equal to n·tv max. For the other control elements p, f, and z, the same discrimination and change in the set time are carried out.

As the results of discrimination with respect to the respective control elements t, p, f, and z, if there would be the time change in the set time (n) with respect to the control elements whose difference between the destination and the present site is the maximum, the quantity of the time change is also the maximum, and the other control elements are adjusted in accordance with this maximum time change.

The operation circuit 311 is to perform operations for finding a time renewal ratio (D/n, where n is a changed value by the abovementioned steps) as to whether the time change is necessary or not with respect to the established time (n), or to what extent such time change is required, based on the result of distance calculation (D) by means of the signal $ANS_1$ from the discrimination circuit. The result of the operation is transferred to the renewal data register Mc and stored therein.

Reference numerals 312, 313, and 314 respectively designate an addition circuit, a renewal pulse oscillator, and a magnitude discrimination circuit. Data from the renewal data registers $Mc_1$ to $Mc_4$ are added to the stored values in the "present site" registers $Mp_1$ to $Mp_4$ at every time a pulse is generated from the renewal pulse oscillator (which oscillates a pulse of cycle To), and outputs from addition means $312_1$ to $312_4$ of the addition circuit 312 are transferred to the present site registers $Mp_1$ to $Mp_4$ during the cycle wherein the gates $306_1$ to $306_4$ are opened by the control signal $GSB_{13}$ from the sequence control circuit. Accordingly, the contents of the present site registers $Mp_1$ to $Mp_4$ are sequentially renewed, and increased by the renewed time at every generation of the renewal pulse. This state is well illustrated in the flow chart of FIG. 5 at its right end cycle.

In the following, explanations will be made as to this execution cycle in reference to FIGS. 3D, 3E, and 5. In FIG. 3E, the results of operations $(d=D/n\{d_t=D_t/n, d_p=D_p/n, d_f=D_f/n, d_z=D_z/n\})$ by operational means $311_1$ to $311_4$ of the operational circuit 311 are stored in the renewal data registers $Mc_1$ to $Mc_4$, and then these stored data are applied to addition input terminals of the addition means $312_1$ to $312_4$ in FIG. 3D, based on which the operational circuit 311 calculates the renewal values. While the results of the operations are being added to the addition circuit through the renewal data registers $Mc_1$ to $Mc_4$, the renewal data $d_t$, $d_p$, $d_f$, and $d_z$ are added to the values of the "present site" registers $Mp_1$ to $Mp_4$, in the addition means $312_1$ to $312_4$, at every time definite cycle pulses from the renewal pulse oscillator 313 are applied thereto. When pulses of n numbers are put in the addition circuit 312, the right end cycle shown in FIG. 5 is executed for n number of times, whereby the output of the addition circuit 312 becomes $Am+nd\{tm+nd_t=tm+D_t, pm+nd_p=tm+D_p, fm+nd_f=fm+D_f, zm+nd_z=zm+D_z\}$. As the result of this, the "present site" registers $Mp_1$ to $Mp_4$ become coincided with the contents of the destination registers $Md_1$ to $Md_4$ after extended time over the time set by the time setting knob 8. During this period, the gates $224K_1$ to $224K_4$ are opened, and the respective counters 201F to 204F drive the respective servo-motors $M_1$ to $M_4$ in accordance with the contents of the present site registers $Mp_1$ to $Mp_4$. The discrimination circuit 314 discriminates magnitude of the contents in both registers Mp and Md. When both of them coincide, a coincidence signal $ANS_2$ is produced and enters into the sequence control circuit to complete the operations.

In the drawing, Ms refers to a shot memory, the address portion of which is designated by a signal from an established mode operation control circuit to be described later, and established digital signals to be formed by the rotary encoders 201 to 204 are transferred through the line 206 and the gate 316 and stored in the designated address portion in sequence. The shot memory Ms has a memory capacity for 15 shots which is formed on the respective address portions $1_A$ to $15_A$ by the rotary encoders 201 to 204. The control element established values tm, pm, fm, and zm required for obtaining each shot are digitally stored therein.

Reference numerals 316 and 317 are respectively and-gates which are opened by control signals from the sequence control circuit. A reference numeral 318 designates a reference position signal generating circuit component which applies required numbers of digital signals to the shot memory Ms when the gate 317 is opened for the execution cycle so as to establish the entire addresses of the shot memory Ms to a predetermined value, and, at the same time, sets the counters 201F to 204F to the same values, thereby setting the respective control elements for the camera to the intermediate values.

Each of the abovementioned registers and memories Mp, Md, Mc, and Ms is impressed with a signal to clear the stored content at the time of its being connected to the power source of the device, as will be described hereinafter, hence no previous contents remain therein at the start of its operation.

Figure 7A:
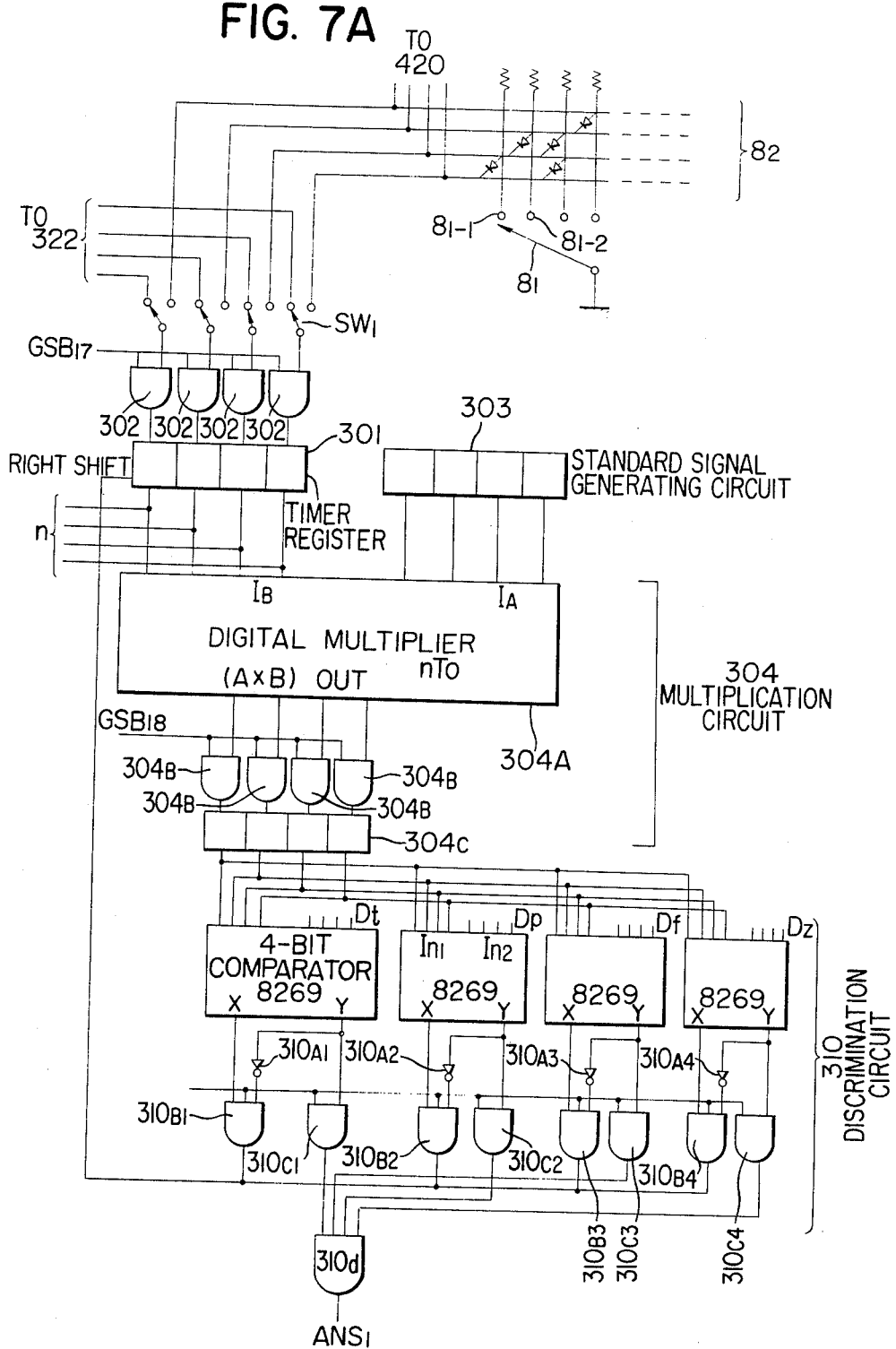
FIG. 7A is a circuit diagram showing one embodiment of registers 301 and 303, multiplication circuit 304, and magnitude discrimination circuit 310 shown in FIG. 3E.

FIG. 7A is a circuit arrangement showing one embodiment of a code conversion circuit $8_2$, in FIG. 3E, consisting of diode matrices to form binary code signals in contact with contact points $8_{1-1}$, $8_{1-2}$ to $8_{1-10}$ of a switch $8_1$ which is changed over in association with the timer register 301, the reference value signal generating circuit 303, the multiplication circuit 304, the magnitude discrimination circuit 310, and the time setting knob 8. In this circuit construction, 302 refers to and-gate, 301 refers to a shift register constituting the timer register, 303 refers to a register, in which a binary code corresponding to the reference time To is stored, and 304A designates a digital multiplier, one input teminal $I_A$ of which is connected to the register 303, and the other input terminal of which is connected to the shift register 301. 304B designates and-gates, the input terminal of each of which is connected to output terminals of respective bits of the digital multiplier 304A. 304C refers to registers, wherein the input terminals of respective bits are connected to the output terminals of respective and-gates, and which constitutes the multiplication circuit 304 with 304A and 304B being combined. $310_1$ to $310_4$ refer to 4-bit magnitude comparators, each consisting of, for example, 8269 of Sigmatic Inc., in which the input signal of the input terminal $In_1$ and the input signal of the input terminal $In_2$ have the true values of the output terminals of $X=Y=1$, when $In_1 = In_2$, $X=1$ and $Y=0$, when $In_1 < In_2$, and $X=0$ and $Y=1$, when $In_1 > In_2$. The input terminals $In_1$ are connected to the register 304C, and the input terminals $In_2$ are applied with the outputs from the subtraction circuits $D_t$, $D_p$, $D_f$, and $D_z$. $310A_1$ to $310A_4$ designate inverters, and $310B_1$ to $310B_4$ designate and-gates. The output terminals of the respective and-gates are connected to the right shift terminals of the abovementioned shift register 301. $310C_1$ to $310C_4$ refer to and-gates, the output terminals of which are connected to the input terminals of the and-gate $310_d$. These gates $310_d$, $310B_1$ to $310B_4$, $310C_1$ to $310C_4$, inverters $310A_1$ to $310A_4$, and comparators $310_1$ to $310_4$ constitute the magnitude discrimination circuit 310.

Figure 7B:
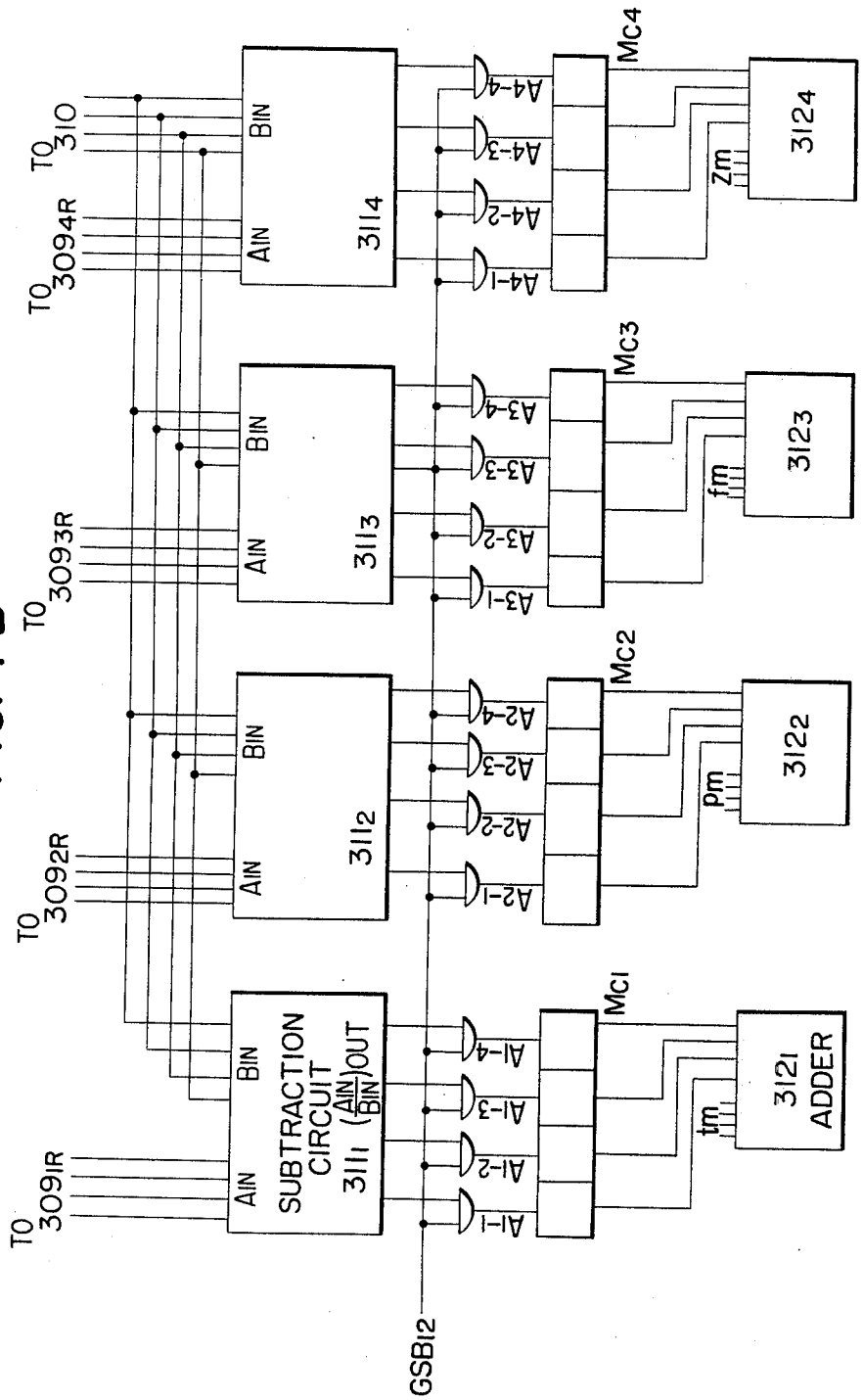
FIG. 7B is a circuit diagram showing one embodiment of operational circuit 311, gates $A_1$ to $A_4$, renewal registers $Mc_1$ $Mc_4$, and addition circuit 312 shown in FIG. 3E.

FIG. 7B is a circuit diagram showing one embodiment of the operational circuit 311, the gates $A_1$ to $A_4$, the renewal registers $Mc_1$ to $Mc_4$, and the addition circuit 312 shown in FIGS. 3D and 3E. In this circuit arrangement, $311_1$ to $311_4$ designate division circuits, the input terminals $B_{in}$ of which are connected to the output terminals of the abovementioned registers 301, and the input terminals $A_{in}$ of which are connected to the output terminals of respective subtraction means $309_1$ to $309_4$ of the subtraction circuit 309, hence the outputs from the operation means $311_1$ to $311_4$ are $D_t/n = d_t$, $D_p/n = d_p$, $D_f/n = d_f$, $D_z/n = d_z$. $A_{1-1}$ to $A_{1-4}$ refer to and-gates constituting the abovementioned and-gate $A_1$. $A_{2-1}$ to $A_{2-4}$ refer to and-gates constituting the abovementioned and-gate $A_2$. $A_{3-1}$ to $A_{3-4}$ designate and-gate constituting the and-gate $A_3$. $A_{4-1}$ to $A_{4-4}$ designate and-gates constituting the and-gate $A_4$. $Mc_1$ to $Mc_4$ refer to registers constituting the renewal register. $312_1$ to $312_4$ refer to addition means of the addition circuit 312, one of the input terminals of each of which is applied with an output from each of the registers $Mc_1$ to $Mc_4$, and the other input terminal of which is applied with each of the outputs tm, pm, fm, and zm of the "present site" registers $Mp_1$ to $Mp_4$.

Figure 7C:
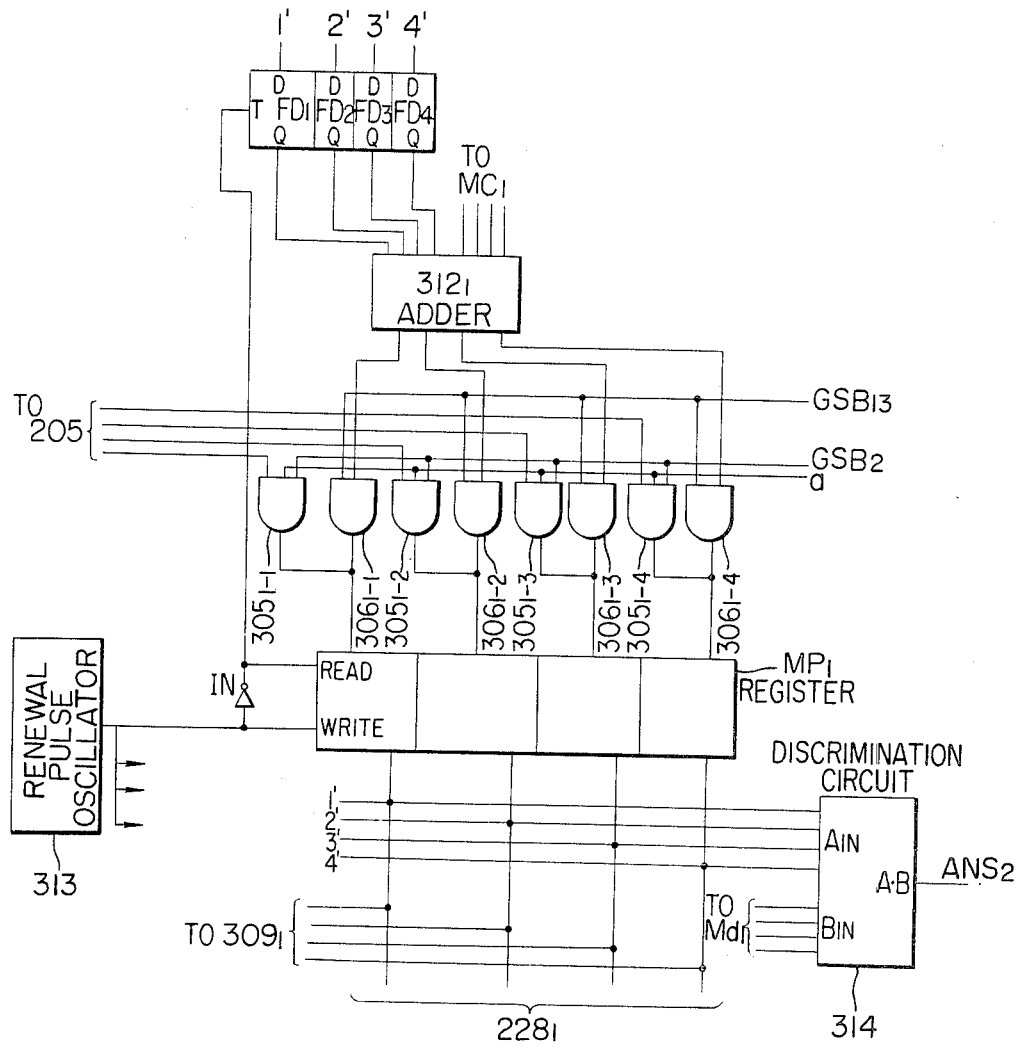
FIG. 7C is a circuit diagram showing one embodiment of addition circuit 312, "present site (or location)" register Mc, and magnitude discrimination circuit 314 shown in FIGS. 3D and 3E.

FIG. 7C is a circuit diagram showing one embodiment of the addition circuit 312, the "present site" register Mc, and the magnitude discrimination circuit 314 shown in FIGS. 3D and 3E. The drawing shows only the addition circuit with respect to the signal tm. $312_1$ designates the addition means, one of the input terminals of which is connected to the register $Mc_1$ as mentioned in the foregoing, and the other input terminal of which is connected to the respective output terminals of four D-type flip-flops $FD_1$ to $FD_4$. $305_{1-1}$ to $305_{1-4}$ designate the abovementioned and-gates 305. To the input of $305_{1-1}$ to $305_{1-3}$, there is applied an output a of the sampling circuit 308S; to the other input thereof, there is applied an input signal from the sequence control circuit; and to still other input thereof, there is applied an output of the data compiling circuit. $306_{1-1}$ to $306_{1-4}$ refer to the and-gates $306_1$, the input terminals of which are applied with outputs of the respective bits of the addition means $312_1$, and the other input terminals of which are applied with input signals of the sequence control circuit. $MP_1$ designates a register for information tm of the abovementioned "present site" register, wherein, when a code "1" is applied to its "READ" terminal, an input signal is taken in, and when a code "1" is applied as the input to its "WRITE" terminal, the previously taken-in signal is produced as an output. 313 designates the abovementioned renewal pulse oscillator, and IN designates an inverter. An output from the $MP_1$ is applied to the above-described D-type flip-flops $FD_1$–$FD_4$ through the lines $1'$–$4'$, and, at the same time, is applied to the input terminal $A_{IN}$ of the magnitude descrimination circuit 314. This output is also applied as an input to the gate $224K_1$ through the line $228_1$. It is further transmitted to the subtraction means $309_1$ of the subtraction circuit 309. To the $B_{IN}$ input terminal of the magnitude discrimination circuit 314, there is applied an output of a register $Md_1$ constituting the "destination" register. Although, in the drawing, only the addition means $312_1$, the gates 305 and 306, the register $MP_1$, the flip-flops $FD_1$–$FD_4$ are shown to constitute the addition circuit for the information tm, the registers $MP_2$–$MP_4$, the gates $305_2$–$305_4$ and $306_2$–$306_4$, the addition means $312_2$–$312_4$ and the flip-flops $FD_2$–$FD_4$ are constructed in the same manner as described above for the other informations pm, fm and zm.

FIG. 7D is a circuit diagram showing one embodiment of the subtraction circuit 309 shown in FIG. 3E, wherein reference numerals $309_1$–$309_4$ designate subtraction means, and $309_{A1}$–$309_{A4}$ refer to and-gates, to the respective inputs of which there are applied outputs from the respective bits of the register $Md_1$. $309_{B1}$–$309_{B4}$ designate and-gates, to the respective inputs of which there are applied outputs from the respective bits of the register $MP_1$. The other input terminals of $309_{A1}$–$309_{A4}$ and $309_{B1}$–$309_{B4}$ are applied with signals from the sequence control circuit. $309_{15}$ refers to a logical circuit having the functions of subtraction, which is constituted, for example, by SN7483, etc. of Texas Instrument Inc., the input terminals $A_1$–$A_4$ of which are applied with outputs from $309_{A1}$–$309_{A4}$, and the other input terminals $B_1$–$B_4$ of which are applied with outputs through exclusive or-gates $ex_1$–$ex_4$ of $309_{B1}$–$309_{B4}$. $309_{C1}$–$309_{C4}$ are and-gates, the respective input terminals of which are applied with outputs $\Sigma_1$–$\Sigma_4$ of the respective bits of the logical circuit, and the other input terminals of which are applied with signals from the sequence control circuit. $309_{1R}$ designates a register, wherein outputs from the and-gates $309_{C1}$–$309_{C4}$ are applied as inputs. E refers to a cell to apply the code "1" to the exclusive or-gates $ex_1$–$ex_4$. $309_{2-1}$ to $309_{4-1}$ are of the same circuit construction as that of the portion enclosed by dotted lines in $309_1$. Outputs from the registers $Md_2$ and $MP_2$ are applied to $309_{2-1}$, outputs from $Md_3$ and $MP_3$ are applied to $309_{3-1}$, and outputs from $Md_4$ and $MP_4$ are applied to $309_{4-1}$. $309_{C1-1}$–$309_{C4-3}$ designate the and-gates which are connected in the same way as the abovementioned and-gates $309_{C1}$–$309_{C4}$, and $309_{2R}$–$309_{4R}$ refer to registers of the subtraction means respectively corresponding to the abovementioned register $309_{1R}$.

Figure 7E:
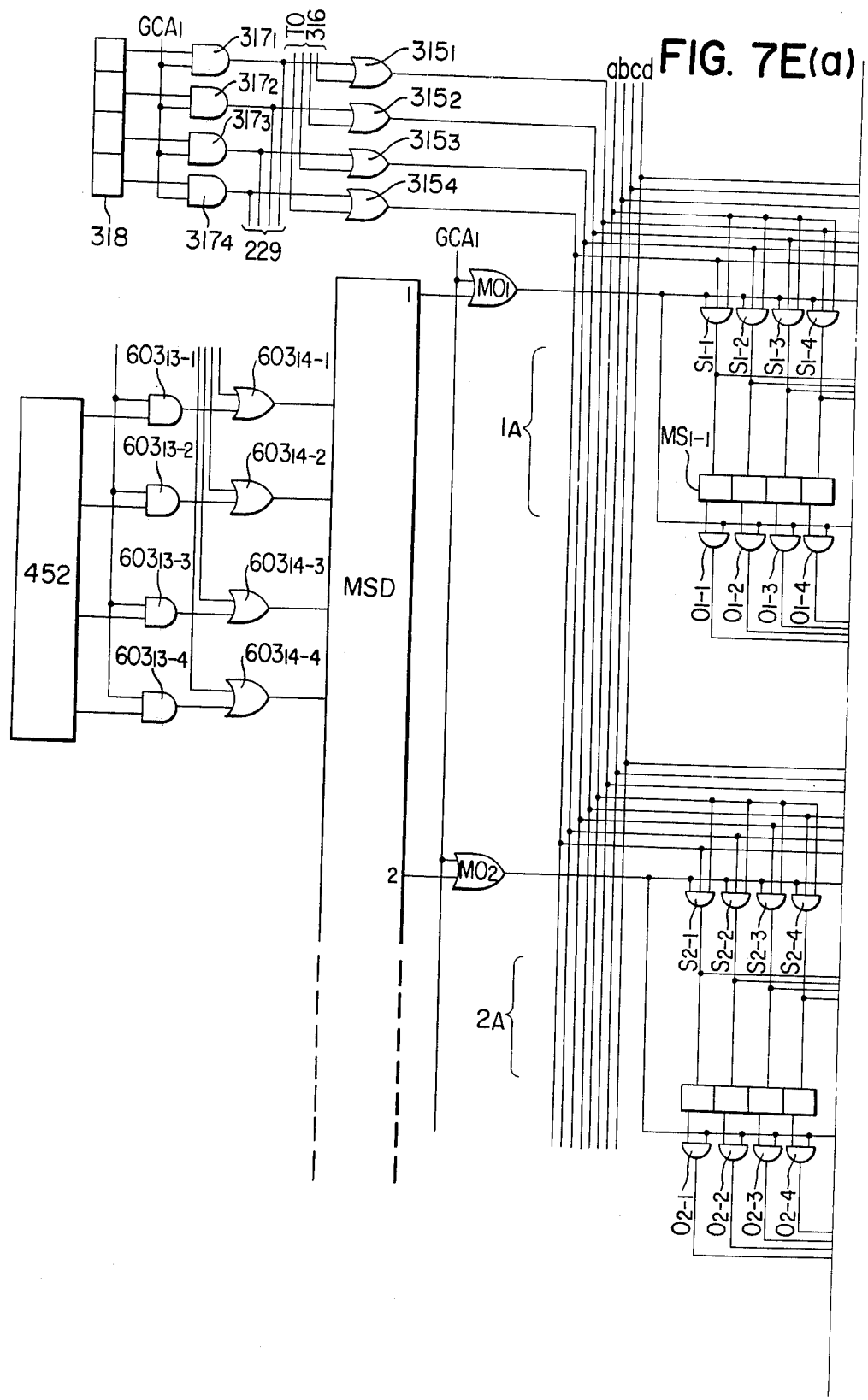
FIG. 7E is a circuit diagram showing one embodiment of reference position signal generating circuit 318, and shot memory MS shown in FIG. 3D.
Figure 7E:
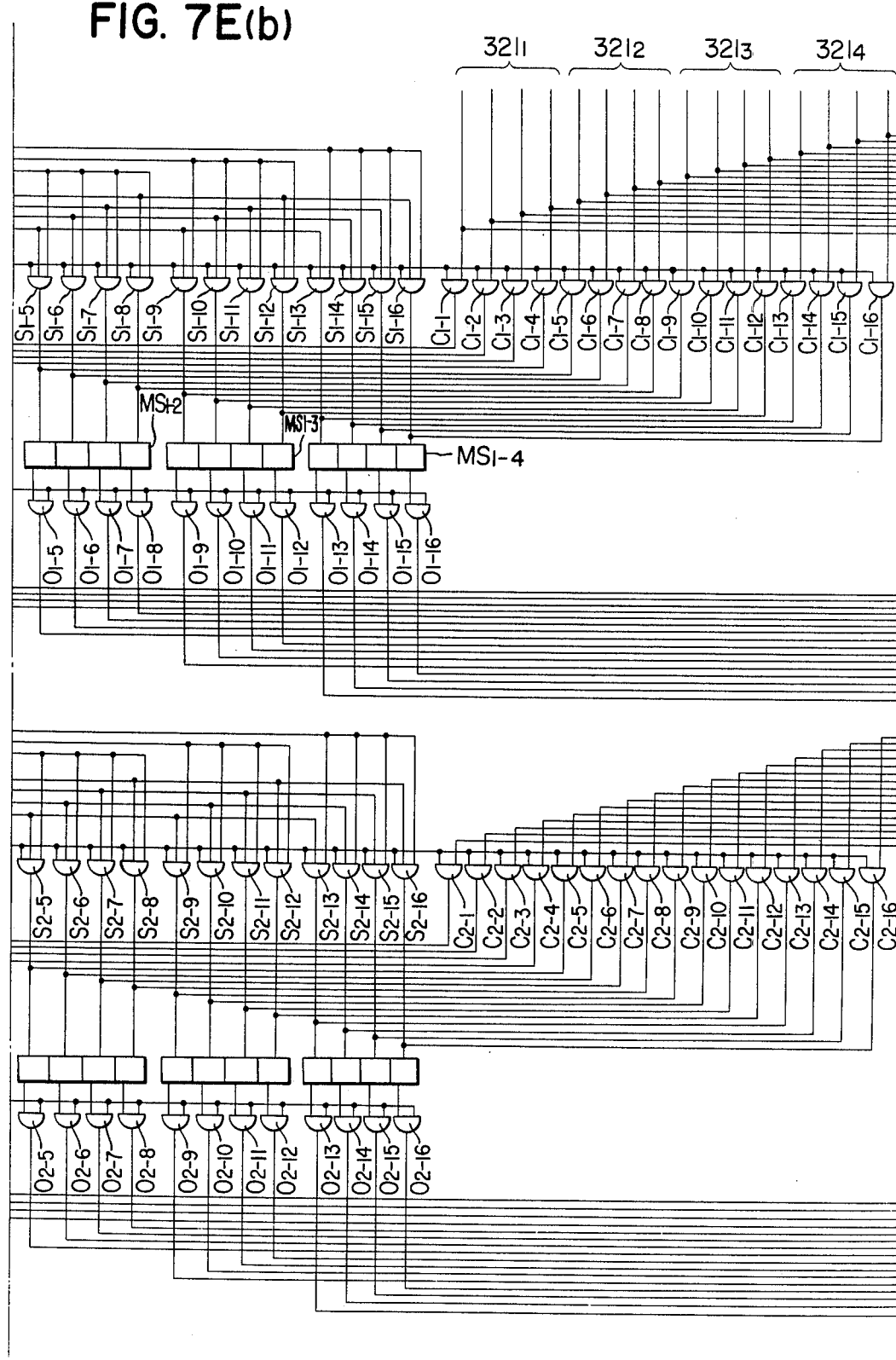
Figure 7E:
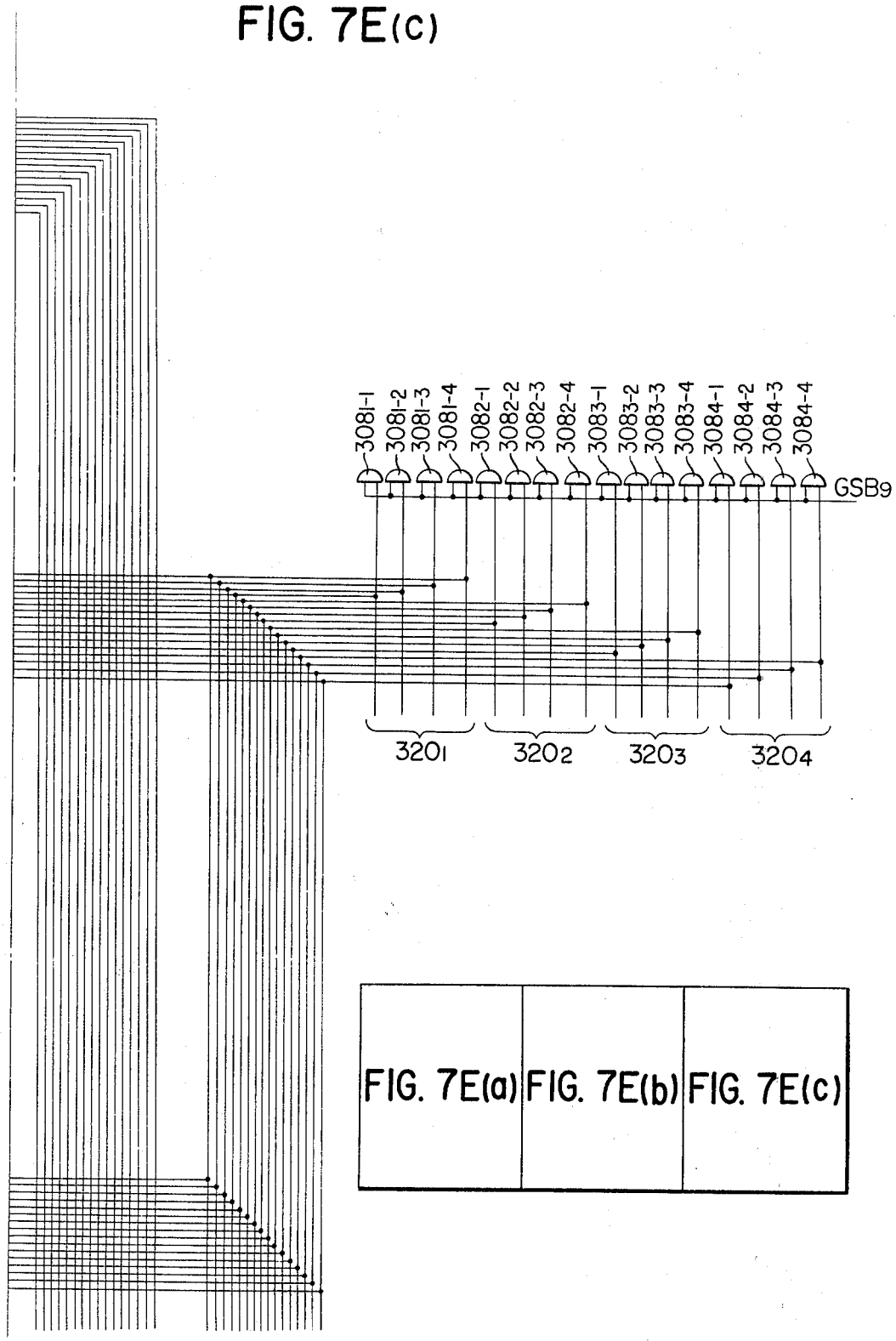

FIG. 7E is a circuit diagram showing one embodiment of the reference position signal generating circuit 318 and the shot memory MS shown in FIG. 3D. The shot memory MS is constructed with a decoder MSD which decodes a binary code of the register SMA, or-gates $MO_1$–$MO_{15}$ ($MO_3$–$MO_{15}$ not being shown) respectively connected to the output terminals 1–15 of the decoder, and-gates $S_{1-1}$ to $S_{1-16}$, $C_{1-1}$ to $C_{1-16}$, $O_{1-1}$ to $O_{1-16}$ connected to the respective or-gates $MO_1$ to $MO_{15}$, $S_{2-1}$ to $S_{2-16}$, $C_{2-1}$ to $C_{2-16}$, $O_{2-1}$ to $O_{2-16}$ (connected to the output terminal of $MO_2$) (in the drawing, only the and-gate connected to $MO_1$ and $MO_2$ are shown, but the other and-gates are also connected to the output terminals of the respective or-gates $MO_3$–$MO_{15}$), and registers for storing informations by the output signals from the decoder such as exemplified in $MS_{1-1}$ to $MS_{1-4}$, i.e., the register $MS_{1-1}$ for storing the tilting information which is connected to the output terminal of the and-gates $S_{1-1}$ to $S_{1-4}$, the register $MS_{1-2}$ for storing the panning information which is connected to the output terminals of the and-gates $S_{1-5}$ to $S_{1-8}$, the register $MS_{1-3}$ for storing the focussing informations which is connected to $S_{1-9}$ to $S_{1-12}$ and the register $MS_{1-4}$ for storing the zooming information which is connected to $S_{13}$ to $S_{14}$, and so on. Although, in the drawing, only the $MS_{1-1}$ to $MS_{1-4}$ and $MS_{2-1}$ to $MS_{2-4}$ which store informations in response to only the decoder outputs 1 and 2 alone are shown, there are provided the registers to store the informations in response to the outputs 3–15 of the decoder in the same manner. Therefore, when any of the decoder outputs is produced, the and-gate connected to each output terminal is selectively opened, and the register for storing the information corresponding to the decoder output is selected, and the selected information is provided as an input to or an output from this selected register. $308_{1-1}$ to $308_{4-4}$ refer to and-gates constituting the abovementioned gate 308, the output terminals of which are connected to the "destination" register. 318 designates a 4-bit register which constitutes the reference position signal generating component, wherein a desired binary code signal is stored. $317_1$ to $317_4$ refer to and-gates showing the abovementioned gate. $315_1$ to $315_4$ refer to or-gates showing the abovementioned or-gate 315. One of the input terminals in the respective or-gate is connected to the output of the and-gates $317_1$ to $317_4$, respectively, and the other input terminals is connected to the abovementioned line 206 through the gate 316. Also, the abovementioned and-gates $C_{1-1}$ to $C_{1-16}$ and $C_{2-1}$ to $C_{2-16}$ as well as the and-gates (not shown) corresponding to these respective and-gates function as the input gates for data from the card reader, and the output terminals $320_1$ to $320_4$ are the data lines to the card reader. Incidentally, $1_A$ to $15_A$ ($3_A$ to $15_A$ not being shown) indicate the address portions of $1_A$ to $15_A$ of the memory, and the addresses of $1_A$ to $15_A$ are designated in correspondence to the shot No. by the content of the register 452.

(IV) Mode Establishing Operation Control Circuit Construction (vide: FIGS. 3A and 3B)

In FIGS. 3A and 3B, a reference numeral $3C_1$ designates a shot sequence designation circuit for designating a shot sequence No. in a shot sequence memory to be described later, and 416 refers to the shot sequence memory, in which a shot No. designation codified signal (KSMA) to be input in the shot sequence address to be designated by the designation circuit $3C_1$ through the gate 418 is stored. 452 refers to a shot address register to temporarily store the shot No. designation codified signal to be sequentially stored in the address which is designated by the abovementioned designation circuit of the abovementioned shot sequence memory 416, which, when shot buttons $6_1$ to $6_{15}$ are depressed, stores KSMA signal transferred through the gate 451 to be opened by a control signal $GSB_1$ from the sequence control circuit. The shot memory MS transfers the stored informations in the designated address accommodated in the shot memory through the line 323 in accordance with an instruction signal from the shot address register 452 to the "destination" memory Md by the opening of the gate 308. A gate 450 is for putting the KSMA signal stored in the shot sequence memory into the register at the time of the reproduction. An and-gate 420 is for putting a time signal to be set by the aforedescribed knob 8 into the shot sequence memory. $10_1$ to $10_{15}$ are respectively display means to display the KSMA signals stored in each shot sequence address of the shot sequence memory. $10_{1-1}$ refers to a driver for the display means $10_1$, and $10_{1-2}$ designates a segment decoder. Although, in the drawing, the decoder and the driver for $10_1$ alone are shown, it should be understood that these decoder and driver are provided for each of the display means to display the KSMA signal stored in the shot sequence address to be sequentially designated by the designation circuit $3C_1$. $13_1$ to $13_{15}$ and $14_1$ to $14_{16}$ designate the display devices shown in FIG. 1 which are connected to the abovementioned designation circuit $3C_1$ so as to display the positions of both subsequent shot sequence No. and the present shot sequence No. at the time of the shot sequence establishing and the reproduction. Also, the shot buttons $6_1$ to $6_{15}$ are provided with red lamps $503A_1$ to $503A_{15}$ and yellow lamps $503B_1$ to $503B_{15}$. 504 to 507 designate drive circuit elements to be provided in the respective lamps; 504 an or-gate; 505 and 506 and-gates; and 507 an inverter circuit. (In the drawing, each button is denoted with a suffix being attached thereto.) 508 refers to a flip-flop, and 509 designates a latch decoder circuit which decodes and holds a digital signal applied thereto through the and-gate 512. 510 designates a latch decoder circuit which detects the shot codified signal stored in the shot address register 452 through the and-gate 513. 511 refers to a decoder. (Each of the circuit 509–511 possesses decoding output lines corresponding in number to the lamps 503A and 503B, although they are omitted in the drawing). LA–LH are buttons for verifying the button operations, which are built in each of the buttons shown in FIG. 2. More specifically, LA is for the shot memory button 5, LB is for the shot sequence memory button 9, LC is for the operation button 11, LD is for the card operation button 21, LE is for the read-out button 22, and LF is for the write-in button 23. LG and LH respectively designate lamps provided in the warning lamp AL and the erroneous operation lamp. 514 to 520 are flip-flops for operating the respective lamps. 521 designates the inverter circuit.

Figure 8A:
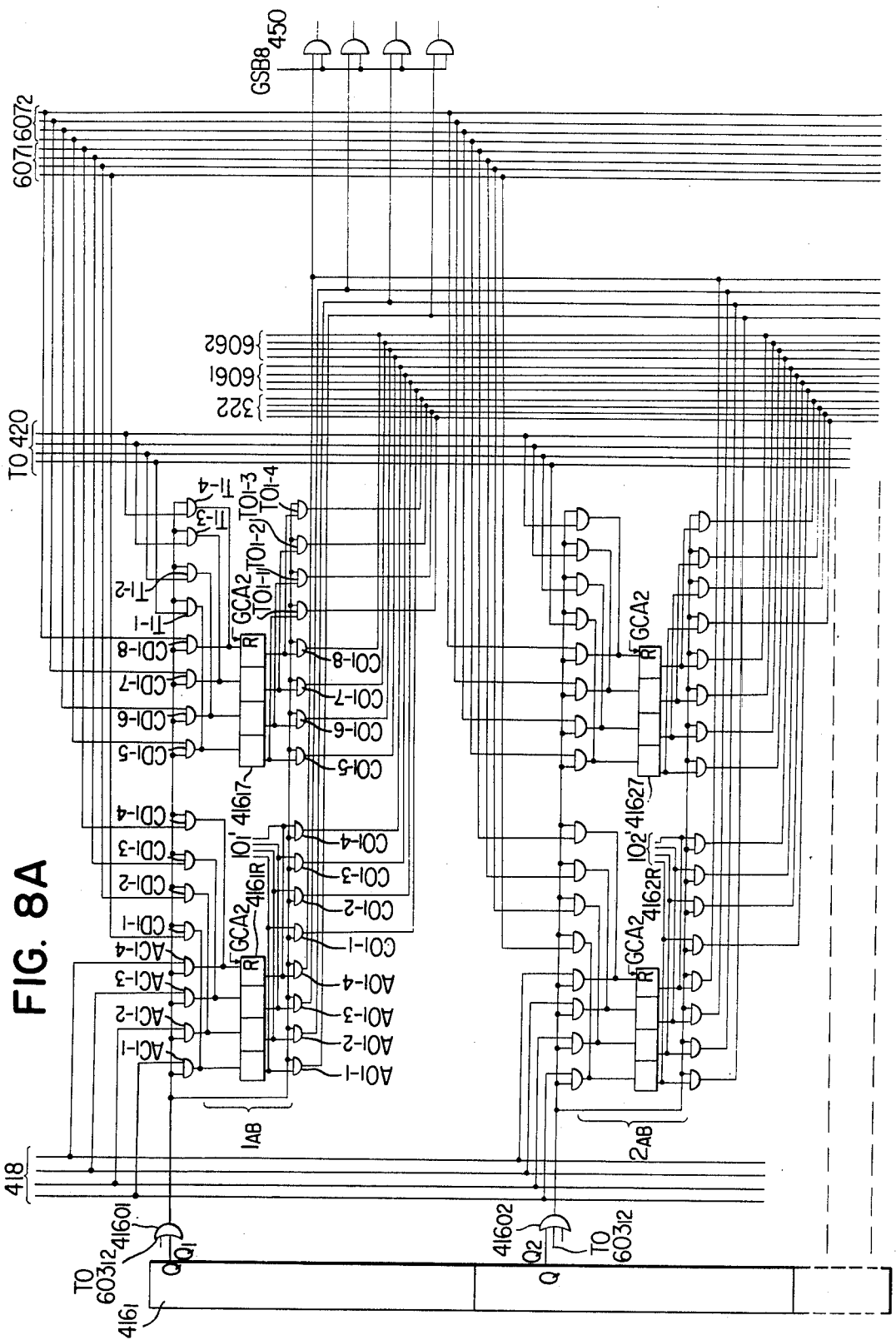
FIG. 8A is a circuit diagram showing one embodiment of shot sequence memory 416 shown in FIG. 3A.

FIG. 8A is a circuit diagram showing one embodiment of the shot sequence memory 416, wherein $416_1$ designates a 15-bit shift register, $416_{01}$ to $416_{015}$ ($416_{03}$ to $416_{015}$ not being shown) refer to or-gates connected to the outputs of the respective bits of the shift register $416_1$, and $416_R$ is a register to store the abovementioned KSMA signal. $AC_{1-1}$ to $AC_{1-4}$ designate and-gates, one of the input terminals of which are connected to the or-gate $416_{01}$ and the other of which are connected to the gate 418. The gates function to selectively input the KSMA signal into the register $416_{1R}$. $AO_{1-1}$ to $AO_{1-4}$ also designate and-gates, one of the input terminals of each of which is connected to the or-gate $416_{01}$, and the other input terminal of each of which is connected to the register $416_{1R}$. The gates function to selectively transmit the output of the register $416_{1R}$ to the register 452 through the gate 450. A register $416_{1T}$ is to store a time signal adjusted by the abovementioned knob 8. $T_{1-1}$ to $T_{1-4}$ designate and-gates, one of the input terminals of each of which is connected to the matrix to form the time signal in interlocking with the knob 8 through the gate 420. The other input terminal of each of the and-gates is connected to the or-gate 406. The gates function to selectively input the time signal into the register $416_{1T}$. $CD_{1-1}$ to $CD_{1-8}$ refer to the and-gates, one of the input terminals of each of which is connected to the signal lines $607_1$ and $607_2$ from the card reader portion to be described later so as to selectively input the signals from the card reader into the registers $416_{1R}$ and $416_{1T}$. $T0_{1-1}$ to $T0_{1-4}$ represent and-gates, one of the input terminals of each of which is connected to the register $416_{1T}$ and the other input terminal of which is connected to the abovementioned or-gate $416_{01}$. The gates are to selectively transmit the contents of the register $416_{1T}$ to the above-mentioned line 322. $CO_{1-1}$ to $CO_{1-8}$ designate and-gate, one of the input terminals of each of which is connected to the registers $416_{1R}$ and $416_{1T}$ respectively, and the other input terminal of which is connected to or-gate $416_{01}$. The gates are to selectively transmit the contents of the registers $416_{1R}$ and $416_{1T}$ to the card reader through the lines $606_1$ and $606_2$. Also, the output of the register $416_{1R}$ is connected to the segment decoder, the driver and the display means $10_1$ through the terminal $510'$ so as to display the content of the register $416R$.

The foregoing are the explanations about the registers, gates, and display circuit with respect to the or-gate $416_{01}$. It is to be noted that the same registers, gates and display circuit are provided for each of the or-gates $416_{01}$ to $416_{015}$ ($416_{03}$ to $416_{015}$ not being shown), thereby transferring the informations to the registers corresponding to the bits of the outputting shift register $416_1$. Incidentally, $1_{AB}$ to $15_{AB}$ ($3_{AB}$ to $15_{AB}$ not being shown) designate the shot sequence address portions to be designated by the content of the abovementioned register $416_1$, which are selectively designated by the outputs of the or-gates $416_{01}$ to $416_{15}$.

Figure 8B:
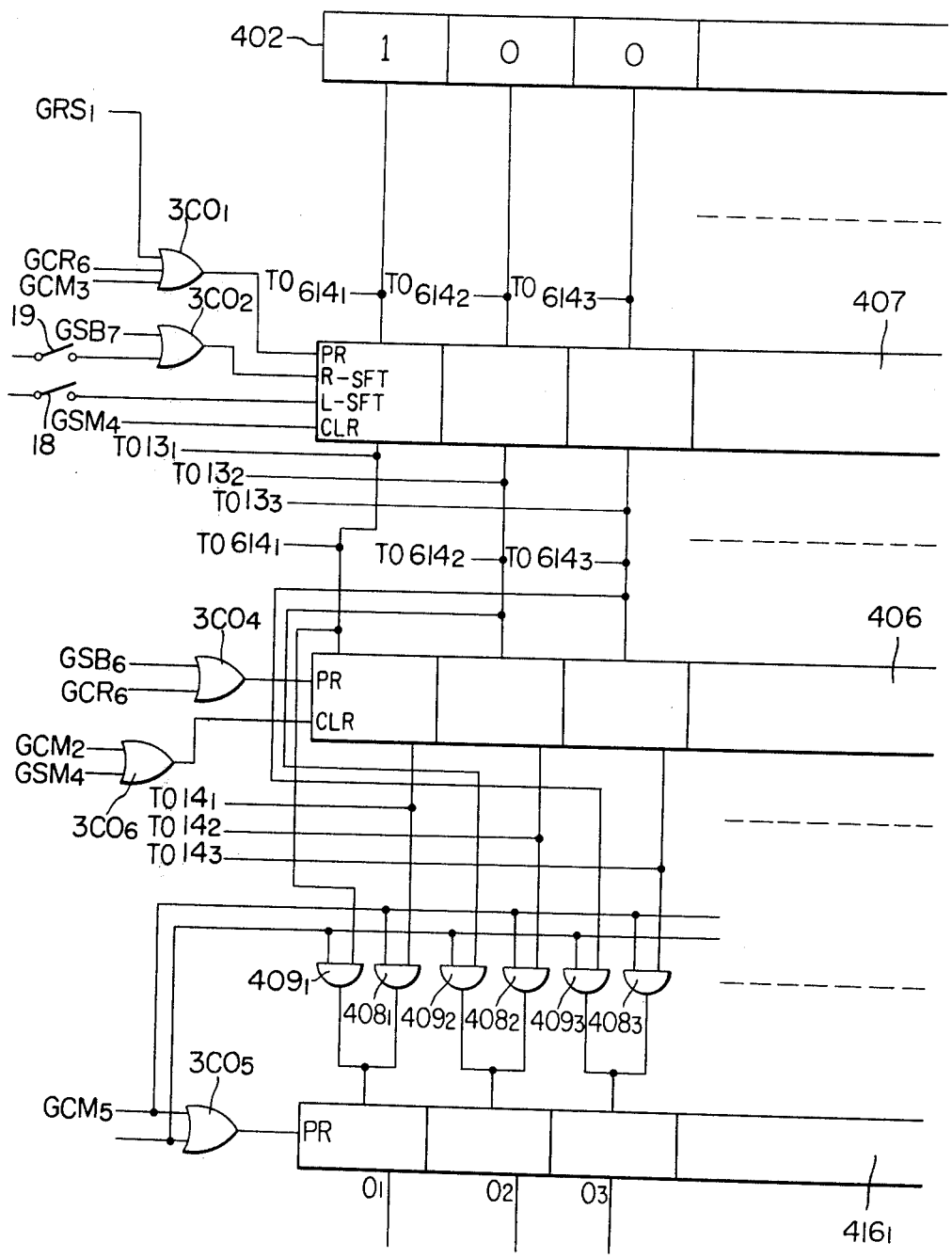
FIG. 8B is a circuit diagram showing one embodiment of shot sequence designation circuit $3C_1$ shown in FIG. 3A.

FIG. 8B is a circuit diagram showing one embodiment of the shot sequence designation circuit shown in FIGS. 3A and 3B, wherein 402 designates a register which stores a digital value "...001" showing the shot sequence No. 1, and 407 refers to a shift register which constitutes a subsequent shot sequence register to store therein the subsequent shot sequence No. of the present shot sequence No., the parallel-in input terminal of which is connected to the outputs of the register 402. Also, a preset terminal PR of the register 407 is connected to the or-gate $3CO_1$, and the left shift terminal L-SFT and the right shift terminal R-SFT are respectively connected to the sequence control circuit and the or-gate $3CO_2$. On account of this, the shift register 407 is established therein with a value of the register 402, i.e., the shot sequence No. 1, by a signal to its preset terminal PR. The register also possesses the right shift terminal R-SFT, and is so constructed that, every time a signal is applied to the right shift terminal R-SFT through the gate $3CO_2$, it causes the signal value to be shifted rightward, whereby the shot sequence No. is renewed sequentially. 406 designates "present" shot sequence register, the parallel-in input terminals of which are connected to the output terminals of the register 407.

The preset input terminal 5PR of the register 406 is connected to the or-gate $3CO_4$, the input terminal of which is connected to the sequence control circuit. On account of this, when an input signal enters into this input terminal PR from the sequence control circuit, the content of the register 407 is transferred to the register 406. $416_1$ is a shift register constituting the abovementioned shot memory. The input terminal of each bit in this register is connected to each of the and-gates $408_1$ to $408_{15}$ ($408_4$ to $408_{15}$ not being shown), the input terminals of which are connected to the output terminals of each bit of the register 406, and the and-gates $409_1$ to $409_{15}$ ($409_4$ to $409_{15}$ not being shown), one of the input terminals of each of which is connected to the output terminals of each bit of the register 407, whereby the contents of the registers 406 and 407 are selectively transferred. Also, $3CO_5$ designates an or-gate connected to the preset terminal of the register $416_1$. The output terminal of each bit of the register 407 is connected to each of the display lamps $13_1$ to $13_{15}$, and, at the same time, the output terminal of each bit of the register 406 is connected to each of the display lamps $14_1$ to $14_{15}$.

(V) Magnetic Card Circuit Construction (vide: FIG. 3A)

In FIG. 3A, 601 designates a crad reader portion, and 602 schematically shows the magnetic card. 603 and 604 respectively show the write-in circuit to the magnetic card and the read-out circuit therefrom. 605 indicates control or-gate. When the write-in button 23 is depressed, a motor in the card reader portion is actuated by the control signal GCR4 from the sequence control circuit, and the magnetic card 602 is fed. At the same time, the write-in circuit 603 is actuated by the control signal GCR8, and the shot sequence No. informations in the entire addresses stored in the shot sequence memory 416 are transferred through the feed lines $607_1$ and $607_2$, and the established informations of each shot of the shot memory MS shown in FIG. 3D are transferred through the lines $320_1$ to $320_4$ in real time, and are written in the magnetic card 602. On the other hand, when the read-out button 22 is depressed, the read-out circuit is actuated by a signal $GCR_5$ from the sequence control circuit to transfer the shot sequence No. informations and the shot established informations which have once been stored in the magnetic card again to each memory so as to re-store the information therein. Accordingly, after the established informations are stored in each memory, when the same informations are stored in the magnetic card, no resetting becomes necessary, even if the content in each memory is evaporated by interruption of the power source of the device, so that reproduction of each shot can be easily done by simply transferring the informations in the card, and by distributing the informations into each memory. Incidentally, the gate 605 is connected to the circuit 604 and the card reader 601 so as to cause the error lamp LH to turn on and off to indicate the parity check and insufficient write-in operation. 609 designates a magnet counter which stores the content of the abovementioned register 406 in a mechanical manner. 610 designates a drive circuit which, by an output from the gate 611, causes the counter 609 to proceed in accordance with the proceeding of the address register. 613 refers to an output circuit to read out the stopped position of the counter, which is connected to the designation circuit $3C_1$ (vide: FIG. 3A) through a gate 614 which is opened by a signal $GCR_6$ which is generated when a power source switch is closed, as will be described later, and a line 615. The magnet counter 609 mechanically stores the contents of the address register 406 even in the case of interruption of the power source or stoppage of power supply, so that, when the device is started, the register 406 is established in the previous position, on account of which the interrupted shot sequence No. is immediately instructed to the shot sequence memory 416. The card reader 601 may be of any known type such as, for example, PCR, etc. of Canon Denshi K.K. Japan, which stores therein input informations entering in series in a sequential manner, or serially takes out the output information therefrom. Detailed explanations of the card reader will be dispensed with, since it has no direct bearing with the present invention.

FIG. 9A is a circuit diagram showing one embodiment of the write-in circuit 603 shown in FIG. 3A, wherein $603_1$ designates a pulse oscillator, and $603_2$ refers to an and-gate, one of the input terminals of which is so constructed as to be applied with an input signal $GCR_8$ from the sequence control circuit, and the other input terminal of which is connected to the pulse oscillator $603_1$. $603_4$ to $603_6$ refer to the flip-flop circuits. The cycle of the output pulse from each of $603_4$, $603_5$, and $603_6$ is such that it is twice as high as the pulse of $603_1$, four times as high as that of $603_1$, and eight times as high as that of $603_1$. $603_7$ is a hexanary counter which generates an output at every time it counts 6 pulses of the pulse from $603_6$. $603_8$ is a one-shot multivibrator which is triggered by an output from the counter $603_7$ to generate a single pulse of a pulse width narrower than that of the pulse from $603_4$. $603_9$ refers to a binary counter, the clock input terminal CLK of which is connected to the abovementioned $603_8$, and, at the same time, a terminal $R_o$ to control the count starting operation of which is connected to the sequence control circuit through the inverter $603_{10}$. The counter is brought to its operative state upon application of a signal $a_0$ to the terminal $R_o$. $603_{11}$ is a nand-gate, the input terminal of which is connected to the output terminal of $Q_A$ to $Q_D$. $603_{12}$ designates a decoder which decodes an output (a binary code) of the abovementioned $603_9$ to selectively generate an output at the output terminals 1 to 15. Each output of the decoder $603_{12}$ is connected to each of the or-gates $416_{01}$ to $416_{015}$ shown in FIG. 8A. $603_{13-1}$ to $603_{13-4}$ designate and-gates, and $603_{14-1}$ to $603_{14-4}$ designate or-gates, the outputs of these gates being connected to the abovementioned decoder MSD in FIG. 7E. $603_{15}$ is a shift register, the clock input terminal CLK of which is connected to the output terminal of $603_4$ and one of the preset input terminals PR of which is connected to the output terminal of the one-shot multivibrator $603_8$ and the other of which is connected to the output terminal of and-gate $603_{14}$. Also, the parallel-in input terminal of the register is so constructed that informations from lines $606_1$, $606_2$, and $320_1$ to $320_4$ may be put therein, and, in synchronism with a clock pulse entering into the terminal CLK, the respective informations are serially input into the card reader in the time-sequential manner from the serial output terminal SOUT. $603_{16}$ designates an inverter connected to the output terminal SOUT, which functions to input an inverted informations of respective informations output from $603_{15}$ into the card reader. The information to be input into the card reader through the inverter is one that is used for performing the parity check at the time of reading out the respective informations from the card reader. $DFF_1$ designates a one-shot multivibrator, the input terminal of which is connected to the nand-gate $603_{11}$, and which generates a single pulse output Q by a rising signal to the input terminal. Since the write-in circuit is constructed as described in the foregoing, when a signal $GCR_8$ from the sequence control circuit is applied to the and-gate $603_2$, a clock pulse is transmitted to the flip-flops $603_4$ to $603_6$, whereby the pulse of $603_4$ is transmitted to the register $603_{15}$, and, at the same time, a pulse of twice as high as that of the pulse from $603_4$ is output at $603_5$, and a pulse of four times as high as that of $603_4$ is output at $603_6$, and these pulses are transmitted to the counter $603_7$. On account of this, the counter $603_7$ generates an output at the time when the six pulse signals are output from $603_6$ (i.e., when 24 pulses are output from $603_4$) to trigger the one-shot multivibrator $603_8$ to transmit the signals to the pulse counter $603_9$. As the result of this, an output is generated from the output terminal $Q_A$, which is transmitted to the decoder $603_{12}$ and MSD so as to transmit the contents of the registers $416_{12}$, $416_{1T}$, $MS_{1-1}$ to $MS_{1-4}$ to the parallel-in input terminal through the gates $CO_{1-1}$ to $CO_{1-8}$ shown in FIG. 8A, the gates $O_{1-1}$ to $O_{1-16}$ shown in FIG. 7E, and the lines 606, $606_2$ and $320_1$ to $320_4$. At the same time, the pulse generated from the abovementioned one-shot multivibrator $603_8$ is transmitted to the preset input terminal of $603_{15}$, whereby the contents of the registers $416_{1R}$, $416_{1T}$, and $MS_{1-1}$ to $MS_{1-4}$ which have already been transmitted to the lines $606_1$, $606_2$ and $320_1$ to $320_4$ are put in the registers $603_{15}$. Subsequently, when 24 pulses are output from $603_4$, the respective informations which have been input in the above-mentioned register $603_{15}$ are transferred to the card reader in a serial manner, and are recorded in the card. Thereafter, at every time 24 pulses are output from $603_4$, the counter $603_3$ performs counting-up operation, designates the address of each register in each memory, and transfers the contents of each register in a time-sequential manner to the card reader, as the result of which the contents of the entire registers are recorded serially on the card by means of the card reader.

Figure 9B:
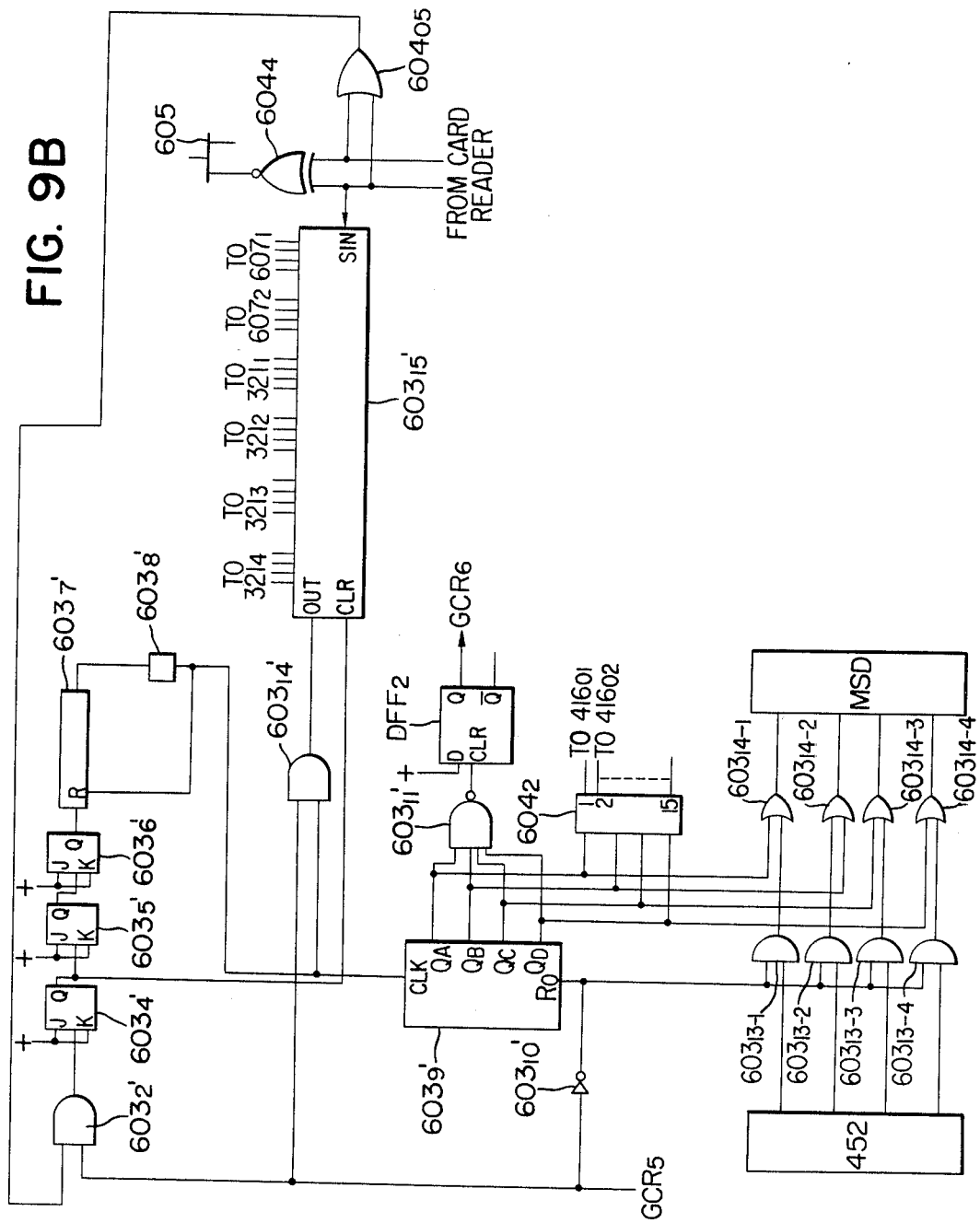
FIG. 9B is a circuit diagram showing one embodiment of read-out circuit 604 shown in FIG. 3A.

FIG. 9B is a circuit diagram showing one embodiment of the read-out circuit 604, in which the same component parts as in FIG. 9A are designated by the same reference numerals accompanied by a prime symbol. Thus, a reference numeral $603_9'$ designates a binary counter which is set by the trailing of the one-shot multivibrator $603_8'$. $604_2$ refers to a decoder which is the same construction as $603_{12}$. $603_{15}'$ designates a shift register, the serial-in input terminal $S_{in}$ of which is connected to the card reader, and the parallel-out output terminal OUT is connected to the abovementioned one-shot multivibrator $603_8'$, thereby generating the respective output informations in parallel by means of the rising pulse. $604_4$ refers to an exclusive or-reverse gate which functions to check the parity at the time of the read-out operation. $604_{or}$ is an or-gate which takes out the respective informations from the card reader and 'or' of a reverse signal of the informations signals so as to form a clock pulse for the read-out operation. Since the circuit 604 is constructed as such, when a signal $GCR_5$ from the sequence control circuit is applied to the and-gate $603_2'$ as is the case with the circuit shown in FIG. 9A, and the initial 24 pulses are output from the flip-flop $603_4'$, the counter $603_7'$ generates an output to trigger the one-shot multivibrator, which in turn causes a single pulse to generate. Then, in synchronism with the rising of the single pulse, the serial input informations in the register $603_{15}'$ are output in parallel, and, at the same time, the counter $603_9'$ is caused to render the count-up by the trailing of the single pulse, thereby opening the gates $CD_{1-1}$ to $CD_{1-8}$ in FIG. 8A and the gates $C_{1-1}$ to $C_{1-16}$ in FIG. 7E. Subsequently, when the next 24 pulses are output from $603_4'$, the respective informations which are serially input in the register $603_{15}'$ are input in the register $MS_{1-1}$ to $MS_{1-4}$ in FIG. 7E, and the registers $416_{1R}$ and $416_{1T}$ in FIG. 8A. Thereafter, at every time 24 pulses are generated from $603_4$, the address of the registers in each memory are designated, and the informations recorded sequentially in the card was transferred to the original register.

Figure 9C:
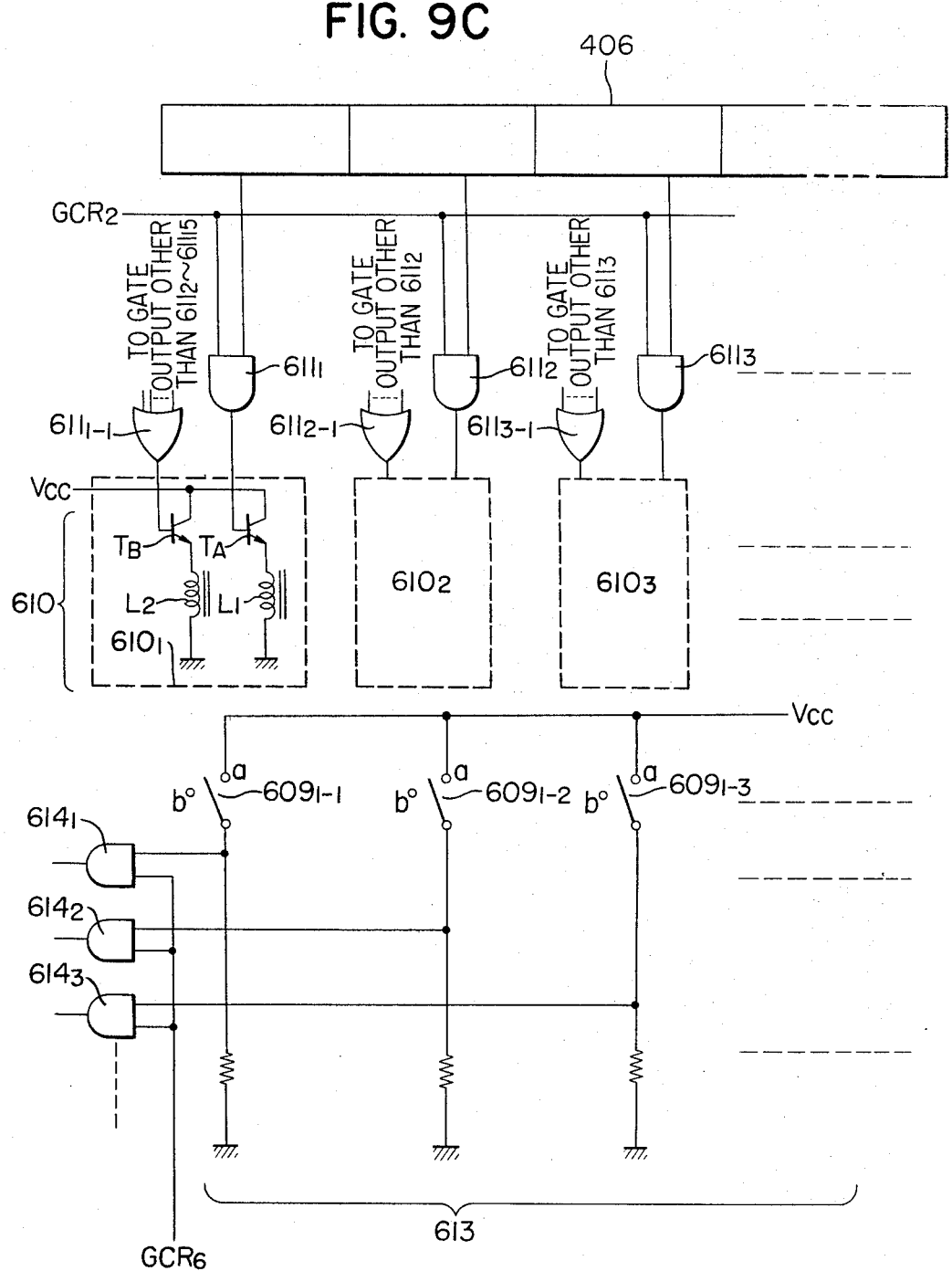
FIG. 9C is a circuit diagram showing one embodiment of gates 611 and 614, driving circuit 610, output circuit 613, and magnet counter 609 shown in FIG. 3A.

FIG. 9C is a circuit diagram of one embodiment of the gates 611 and 614, the drive circuit 610, and the output circuit 613, in which 406 designates a register shown in FIG. 8B, and $611_1$ to $611_{15}$ ($611_4$ to $611_{15}$ not being shown) are and-gates constituting the gate 611, one of the input terminals of each of which is connected to the output terminal of the register 406, and the other input terminal of which is so constructed that a signal $GRS_2$ from the sequence control circuit may be applied thereto. 610 designates a coil driver which includes a coil driver circuit consisting of $610_1$ to $610_{15}$ ($610_4$ to $610_{15}$ not being shown) with respect to the respective and-gates. The coil driver circuit, as is exemplified in $610_1$, comprises a transistor $T_A$, the base of which is connected to the output terminal of the and-gate $611_1$, a transistor $T_B$, the base of which is connected to the output terminal of the or-gate $611_{1-1}$, and relays $L_1$ and $L_2$ which are connected to the respective transistors. The relays are so constructed that, when electric current flows in the relay $L_1$, it causes the switch $609_{1-1}$ to connect with the contact a, and when electric current flows in the relay $L_2$, it causes the switch $609_{1-1}$ to connect with the contact b. $611_{1-1}$ to $611_{15-1}$ ($611_{4-1}$ to $611_{15-1}$ not being shown) are or-gates connected to the respective coil driver circuits, the input terminals of which are connected to the output terminals of the and-gate other than the and-gate connected to the coil driver circuit, to which the or-gate is connected such as, for example, the input terminal of $611_{1-1}$ connected to the output terminal of the and-gate other than the gate $611_1$, and the input terminal of $611_{2-1}$ connected to the output terminal of the and-gate other than the gate $611_2$. $609_{1-1}$ to $609_{1-15}$ ($609_{1-4}$ to $609_{1-15}$ not being shown) designate the switches respectively corresponding to the abovementioned coil driver circuits $610_1$ to $610_{15}$. The switches are so constructed that they may operate each other between the corresponding coil driver circuit and the switch as in the relationship, for example, between the coil driver circuit $610_1$ and the switch $609_{1-1}$. The magnet counter 609 is constructed with the switch and the relay of the coil driver circuit. 613 refers to a circuit network constituting the abovementioned output circuit, and $614_1$ to $614_{15}$ ($614_4$ to $614_{15}$ not being shown) are and-gates constituting the abovementioned gates. The output terminal of each of the gates is connected to the input terminal of each bit of the registers 406 and 407 shown in FIG. 8B.

Figure 9D:
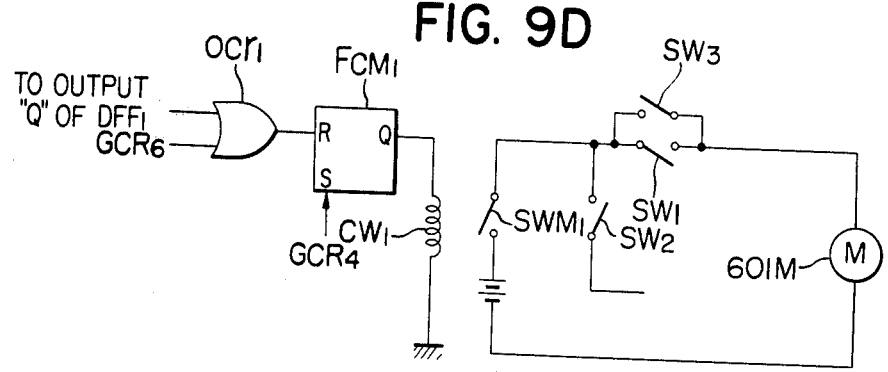
FIG. 9D is a circuit diagram showing one embodiment of power source for motor.
Figure 9E:
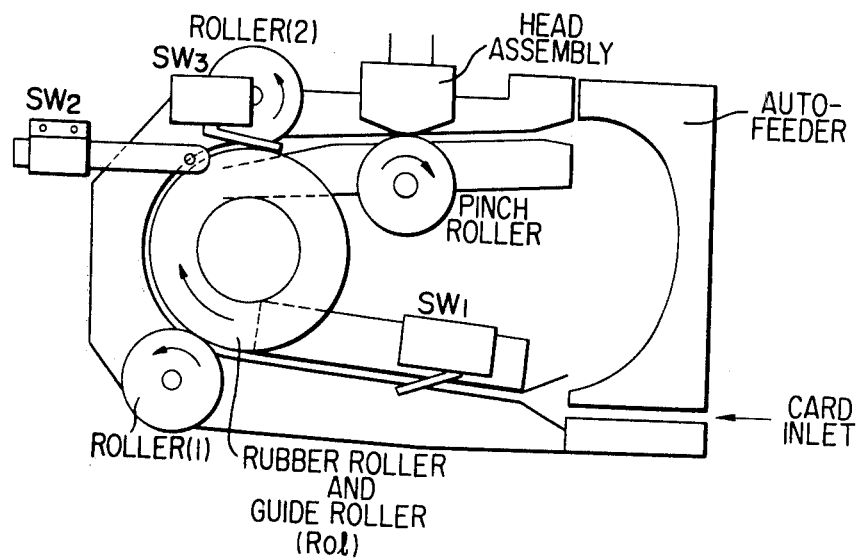
FIG. 9E is a general side view of the card reader shown in FIG. 3A.

FIG. 9D is a circuit diagram showing one embodiment of the motor power source, and FIG. 9E shows a general side view of the card reader shown in FIG. 3A. In FIG. 9D, a reference symbol $ocr_1$ designates an or-gate, the input terminal of which is applied with the single pulse output Q of the one-shot multivibrator $DFF_1$ in FIG. 9A and an output Q of $DFF_2$ in FIG. 9B. $F_{CM1}$ refers to a flip-flop, the set input terminal S of which is so constructed that a signal $GCR_4$ may be applied thereto. When $F_{CM1}$ is set, an output Q is generated to cause electric current to flow through the coil $Cio_1$, whereby a switch $SWM_1$ becomes "on". $SW_1$ refers to a switch which is closed by insertion of a card into an insertion slot or card inlet of the card reader. $SW_3$ also refers to a switch which is so constructed that, in conjunction with the switch $SW_1$, either of the switches becomes closed, while the card is inserted into the card reader. $SW_2$ refers to a switch to detect a notched portion in the card and to become opened or closed in accordance with the detection, by which propriety of the card as inserted is detected. 601M designates a motor for the card reader. In FIG. 9E, Ro1 designates a roller which rotates in association with the motor 601M, and which serves to feed the card into the card reader. OF designates an auto-feeder to guide the card which has passed through the head part of its initial position. Incidentally, the card is returned to its initial position by the inertia of the motor 601M upon completion of the read-out operation or write-in operation by means of the head.

(VI) Power Source Circuit Construction (vide: FIG. 3E)

The power source circuit component comprises a power source portion 702, and a circuit 703 which renders the current feeding lines for the servo-motors $M_1$ to $M_4$ to be "on" and "off". 704 designates a flip-flop to render the motor circuit to be "on" and "off" by means of the sequence control circuit to be described later.

Figure 4:
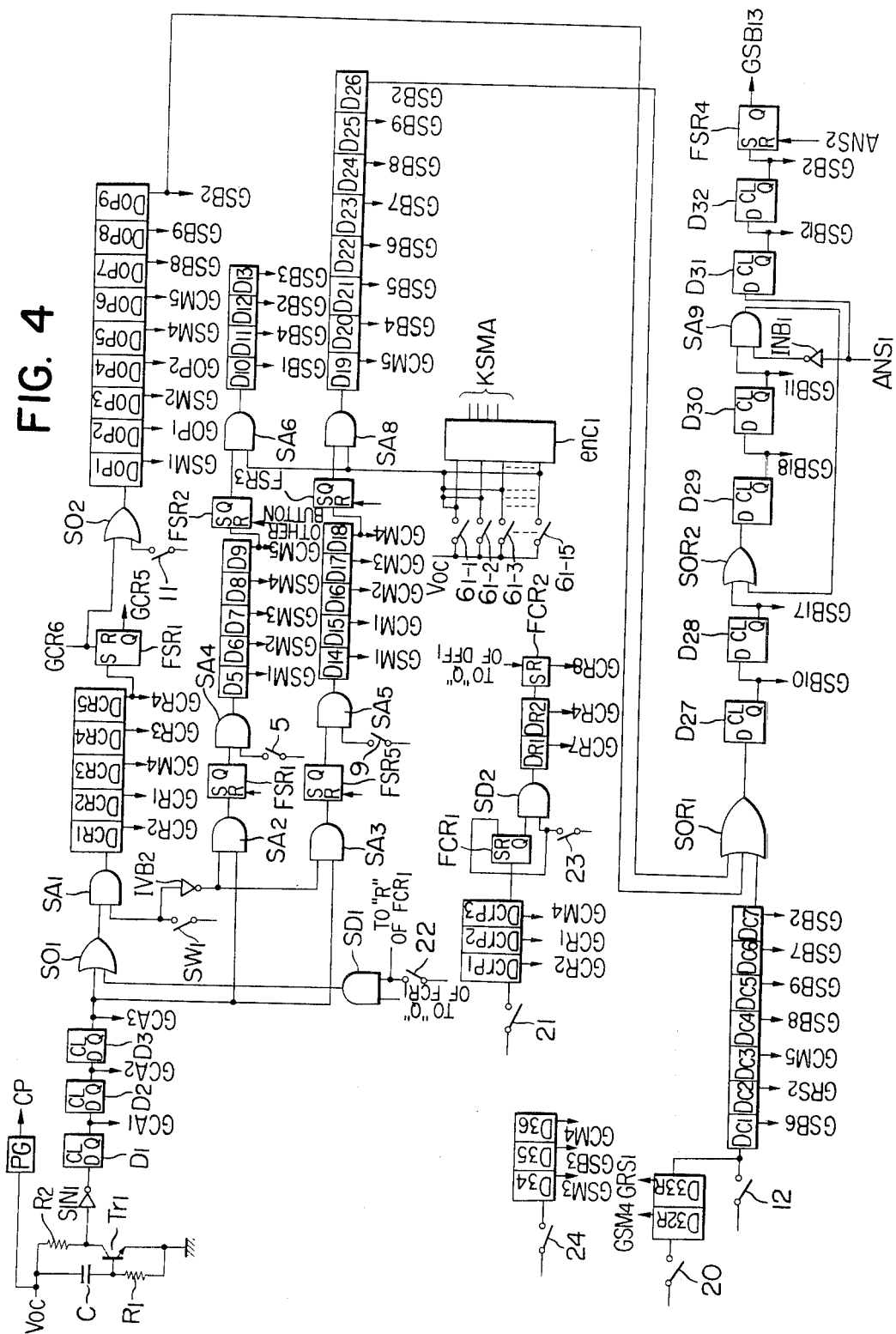
FIG. 4 is a circuit diagram showing one embodiment of a sequence control circuit to form control signals to the respective circuits shown in FIGS. 3A to 3E.

(VII) Sequence Control Circuit (vide: FIG. 4)

In FIG. 4, the single pulse generating circuit comprises a capacitor C, resistors $R_1$ and $R_2$, a transistor $Tr_1$, and an inverter $SIN_1$, which generates a single pulse by an output from the power source portion 702 in FIG. 3E. In the illustrated circuit construction, $D_1$ to $D_3$ designate D-type flip-flops, the output terminal Q and the input terminal D between the adjacent flip-flops being connected mutually so as to generate sequentially an output Q in synchronism with the clock pulse from the clock pulse oscillator PG, thereby producing signals $GCA_1$, $GCA_2$, and $GCA_3$ to be described hereinafter. $SO_1$ designates an or-gate, one of the input terminals of which is connected to the output terminal Q of $D_3$, and the other input terminal of which is connected to the and-gate $SD_1$ which generates an output by depression of the read-out button 22 and transmits the output to the and-gate $SA_1$. One of the input terminals of the and-gate $SA_1$ is connected to the switch $SW_1$ of the abovementioned card reader. The and-gate $SA_1$ generates an output only when the switch $SW_1$ is closed, i.e., when the card is inserted into the card reader. $D_{CR1}$ to $D_{CR5}$ designate D-type flip-flops. As is the case with the abovementioned flip-flops $D_1$ to $D_3$, the output terminal Q and the input terminal D of the adjacent flip-flops are mutually connected to generate an output Q, thereby producing card reading signals $GCR_2$, $GCR_1$, $GCM_4$, and $GCR_3$. $FSR_1$ designates an RS flip-flop which is set by an output of the abovementioned $D_{CR5}$ and is reset by the abovementioned signal $GCR_6$ so as to generate an output signal $GCR_5$. $SO_2$ refers to an or-gate, one of the input terminals of which is applied with the abovementioned signal $GCR_6$, and the other input terminal of which is connected to the switch 11 interlocked with the actuating button 11 and generates an output by the signal $GCR_6$ or by closure of the switch 11. $D_{op1}$ to $D_{op9}$ designate D-type flip-flops which are constructed in the same manner as the abovementioned $D_1$ to $D_3$. The flip-flops produce signals $GSM_1$, $GOP_1$, $GSM_3$, $GOP_2$, $GSM_4$, $GCM_5$, $GSB_8$, $GSB_9$, and $GSB_2$ for the reproduction operations by an output from the gate $SO_2$. $SOR_1$ designates an or-gate, one of the input terminals of which is connected to the abovementioned $D_{op9}$. $D_{27}$ to $D_{32}$ are D-type flip-flops, $FSR_4$ refers to a flip-flop which is so constructed that the abovementioned signal $ANS_2$ may be input into the reset terminal thereof, $SOR_2$ designates an or-gate, $SA_9$ denotes an and-gate, and $INB_1$ is an inverter. These components in combination constitutes a circuit to produce sequentially signals $GSB_{10}$, $GSB_{17}$, $GSB_{18}$, $GSB_{11}$, $GSB_{12}$, $GSB_2$, and $GSB_{13}$ to carry out the time prolonging operations at the time of reproduction as well as at the time of setting the shot sequence. $INB_2$ is also an inverter which transmits an output "1" to the and-gates $SA_2$ and $SA_3$ when the switch $SW_1$ is open. $FSR_1$ designates a flip-flop with the set input terminal thereof being connected to the output terminal of the and-gate $SA_2$. An output from this $FSR_1$ is applied to the and-gate $SA_4$. The and-gate $SA_4$ is connected, at the other input terminal thereof, with a switch interlocked with the abovementioned shot memory button 5. $D_5$ to $D_{13}$ refer to D-type flip-flops which are constructed in the same manner as the afore-described D-type flip-flops $D_1$ to $D_3$. $FSR_2$ is an RS flip-flop with the set terminal thereof being connected to the D-type flip-flop $D_9$, and $SA_6$ refers to an and-gate. These flip-flops $D_5$ to $D_{13}$, $FSR_2$, and-gates $SA_4$ and $SA_6$ are for producing signals $GSM_1$, $GSM_2$, $GSM_4$, $GSM_5$, $GSB_1$, $GSB_4$, $GSB_2$, and $GSB_3$. $FSR_5$ designates a flip-flop with the set input terminal thereof being connected to the output terminal of the gate $SA_3$, $SA_5$ refers to an and-gate, one of the input terminals of which is connected to the output terminal of $FSR_5$, and the other input terminal of which is connected to a switch interlocked with the shot sequence button 9, $D_{14}$ to $D_{26}$ designate flip-flops constructed in the same manner as the D-type flip-flops $D_1$ to $D_3$, $FSR_3$ is an RS flip-flop, and $SA_8$ designates an and-gate. These flip-flops $D_{14}$ to $D_{26}$, $FSR_3$, and gates $SA_5$ and $SA_8$ are for producing signals $GSM_1$, $GCM_1$, $GCM_2$, $GCM_3$, $GCM_4$, $GCM_5$, $GSB_6$, $GSB_7$, $GSB_9$, and $GSB_2$ for setting the shot sequence. 24 designates a switch interlocked with the abovementioned correction button, which applies a start pulse to D-type flip-flops $D_{34}$ to $D_{36}$ which are constructed in the same manner as the flip-flops $D_1$ to $D_3$. The flip-flops $D_{34}$ to $D_{36}$ produce signals $GSM_3$, $GSB_3$, and $GCM_4$ for the shot correction. 20 refers to a switch interlocked with the reset button, which applies a start pulse to D-type flip-flops $D_{32R}$ to $D_{33R}$ which are connected in the same manner as the abovementioned D-type flip-flops $D_1$ to $D_3$. The flip-flops $D_{32R}$ to $D_{33R}$ produce signals $GSM_4$ and $GRS_1$ for setting the shot sequence No. at "1". 12 designates a switch which is turned on by being interlocked with the change button, which applies a start pulse to D-type flip-flops $D_{C1}$ to $D_{C7}$ which are connected in the same manner as the D-type flip-flops $D_1$ to $D_3$. The D-type flip-flops $D_{C1}$ to $D_{C7}$ function to step forward the shot sequence No. at the time of the reproduction operation, and to produce signals $GSB_6$, $GRS_2$, $GCM_5$, $GSB_8$, $GSB_4$, $GSB_7$, and $GSB_2$ for reproducing the thus step-forwarded shot. 21 refers to a switch interlocked with a card reader preparation button, which applies a start pulse to D-type flip-flops $D_{crp1}$ to $D_{crp3}$ which are connected in the same manner as the D-type flip-flops $D_1$ to $D_3$. The flip-flops $D_{crp1}$ to $D_{crp3}$ produce signals $GCR_2$, $GCR_1$, and $GCM_4$ for preparing the operations of the card reader. $FCR_1$ designates an RS flip-flop which is so constructed that it may be reset by closure of a switch interlocked with both read-out and write-in buttons 22 and 23. $SD_2$ designates an and-gate which transmits a start pulse to D-type flip-flop $D_{R1}$ in interlocking with depression of the write-in button 23. The flip-flops $D_{R1}$ and $D_{R2}$ are connected in the same manner as the D-type flip-flops $D_1$ and $D_3$, and for producing signals $GCR_7$, $GCR_4$, and $GCR_8$ for performing write-in operations to the card along with the RS flip-flop $FCR_2$. $6_{1-1}$ to $6_{1-15}$ designate switches which become instantaneously "on" by being interlocked with the shot buttons $6_1$ to $6_{15}$. A reference symbol $enc_1$ refers to an encoder which converts the "on" state of the switches $6_{1-1}$ to $6_{1-15}$ to binary codes, thereby forming the afore-mentioned KSMA signal. Incidentally, it is understood that all the D-type flip-flops are synchronized with a clock pulse CP from the pulse oscillator PG which is actuated by the turning on of the power source. Also, the RS flip-flop is set by the rising of pulse to be applied to the S terminal thereof. Moreover, the reset terminal R of the flip-flop $FSR_2$ is connected to the switch 9, and is reset when the switch is turned on. Further, the reset terminal R of $FSR_2$ is connected to the switch 5, and is reset by the turn-on of the switch. At the same time, the flip-flops $FSR_1$ and $FSR_5$ are so constructed that they may be reset by turn-off of the power source. The thick lines shown in FIGS. 3A to 3E indicate the 4-bit lines, and each gate provided in each thick line is actually four in number in correspondence to the number of signals in each bit.

FIG. 10A is a circuit diagram showing one embodiment of a digital multiplier 304B shown in FIG. 7C, in which 301 designate the abovementioned registers to record therein digital values corresponding to a time signal n set by the knob 8. $304_D$ decodes the content of 301 and generates outputs to the output terminals $1_O$ to $n_O$. 303 designate registers, in which digital values corresponding to the abovementioned reference value To are recorded. $303_2$ to $303_n$ respectively designate registers, wherein reference value 2To to nTo are stored. $303_A$ refer to and-gates connected to the output terminals of the registers 303, one of the input terminals of each of which is connected to the output terminal $1_O$ of the abovementioned decoder $304_D$. $303_{2A}$ to $303_{nA}$ respectively designate and-gates, one of the input terminals of each of which is connected to each of the respective registers $303_2$ to $303_n$, and the other input terminal of which is connected to each of the output terminals of the decoders $2_O$ to $n_O$. $304_{or1}$ designates an or-gate, the input terminal of which is connected to the output terminal of the and-gate which is connected to the first stage output terminal of the abovementioned registers 303 to $303_n$. Further, the input terminals of the or-gates $304_{or2}$ to $304_{or4}$ are respectively connected to the output terminals of the and-gates which are connected to the second, third and fourth stage output terminals of the registers 303 to $303_n$. The and-gates $303_A$ to $303_n$ are selectively opened on the basis of the content of 301, and, by outputting the contents of the registers connected to the selected gates through the or-gates $304_{or1}$ to $304_{or4}$, multiplied outputs of the content of 301 and the content of 303 are generated.

Figure 10B:
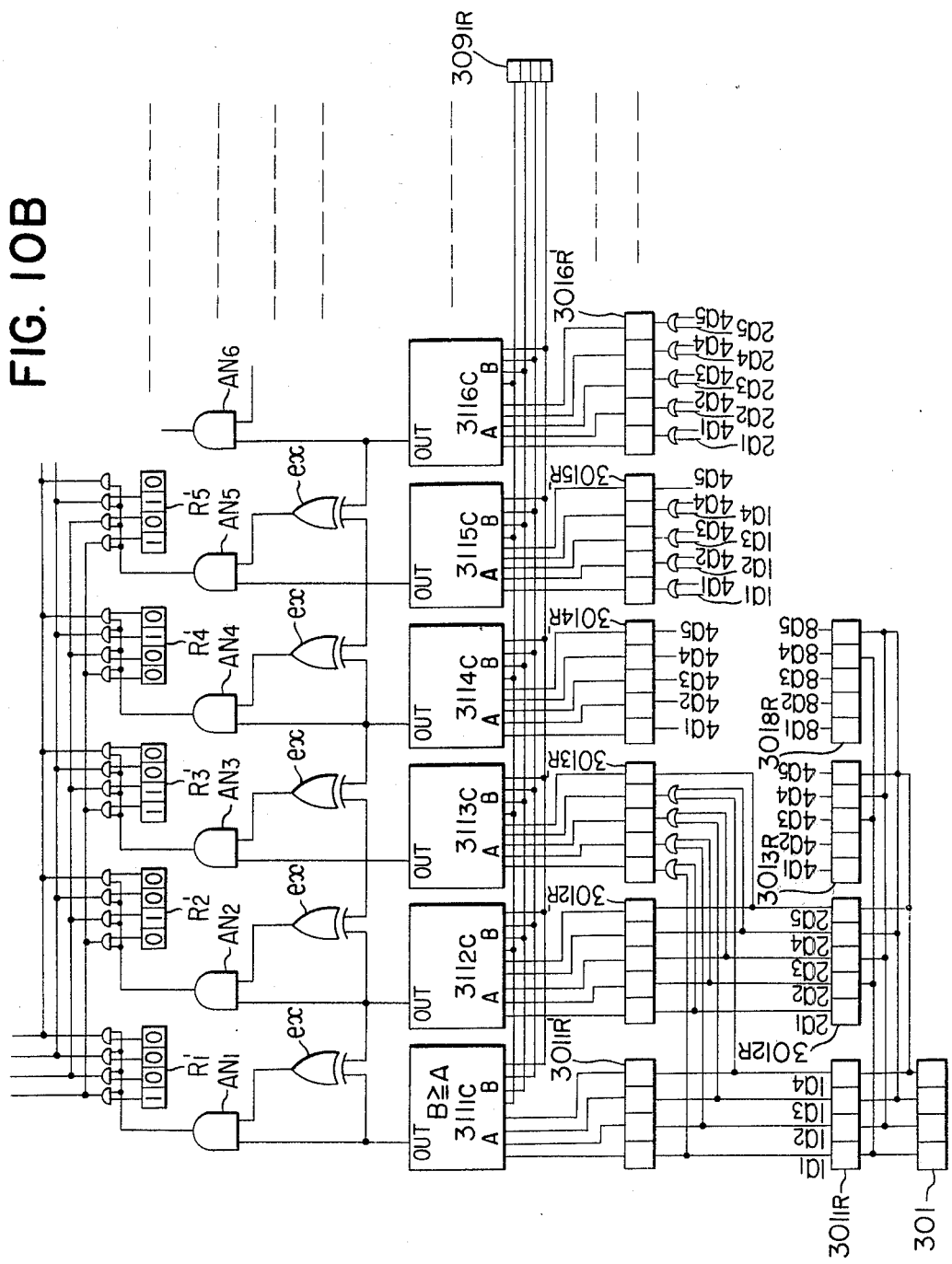
FIG. 10B is a circuit diagram showing one embodiment of the division circuit shown in FIG. 7B.

FIG. 10B is a circuit diagram showing one embodiment of the division circuit shown in FIG. 7B, in which 301 designates registers to store therein digital values corresponding to the abovementioned value n; $301_{1R}$, $301_{2R}$, $301_{4R}$, and $301_{8R}$ are respectively registers to store therein digital values having respectively once, twice, four times, and eight times as large a value as the content of the register 301; and $301_{1R}'$ to $301_{15R}'$ ($301_{7R}'$ to $301_{15R}'$ not being shown) are respectively registers to store therein the contents having from once to fifteen times as large values as the content of the register 301. Each register is constructed with the or-gate, etc. so that it may store the content having from once to fifteen times as large values as the content of the register 301. $311_{1C}$ to $311_{15C}$ ($311_{7C}$ to $311_{15C}$ not being shown) respectively designate magnitude comparators, the input terminals A of which are connected to the output terminals of the registers $301_{1R}'$ to $301_{15R}'$, and the input terminals B of which are connected to the register $309_{1R}$ storing therein the abovementioned $D_t$ so that an output "1" may be generated, when $B \geq A$, i.e., $D_t \geq n$. A reference symbol ex designates or-gates, $AN_1$ to $AN_{15}$ ($AN_7$ to $AN_{15}$ not being shown) respectively designate and-gates, and $R_1'$ to $R_{15}'$ ($R_6'$ to $R_{15}'$ not being shown) respectively refer to registers storing therein digital values corresponding to 1 to 15, the output terminal of each register being provided with an and-gate.

Since the divider is constructed as such, when, for example, n=2, and $D_t=4$, the comparators $311_{1C}$ and $311_{2C}$ alone generate the output "1", hence the exclusive or-gates alone connected to the output terminals of the comparators $311_{2C}$ and $311_{3C}$ generate the output "1" with the consequence that the and-gate $AN_2$ generate the output "1", and the content of the register $R_2'$, i.e., the output "2" alone is generated to carry out the division of $D_t/n=4/2=2$. Incidentally, the drawing shows the divider $311_1$ alone, it should be understood that the other dividers $311_2$ to $311_4$ are constructed in the same manner.

In the following, operations of the control device according to the present invention will be described on the basis of the afore-described respective circuit components.

(A) Desired Mode Setting Operations (Shot Establishing Operations)

The setting operations of the desired modes (shots) are carried out in the following sequence.

First of all, the power source switch 16 shown in FIG. 2 is turned on. Then, the shot memory button 5 is depressed, and the setting knobs 1 to 4 are operated, after which the shot buttons $6_1$ to $6_{10}$ are depressed.

When the power source switch 16 is first closed, the power source portion 702 in FIG. 3E is actuated to render the entire circuits to be ready for operations, and, at the same time, a clock pulse is applied to the circuits. In this state, the switch SW in FIG. 6B is also closed to input the clock pulse into the ring counter $208S_2$. Further, $V_{cc}$ is applied to the sequence control circuit in FIG. 4 to instantaneously turn on the transistor $Tr_1$. In this consequence, an output from the inverter $SIN_1$ is synchronized with the activated power source, whereby a single pulse is generated. Upon transmission of this single pulse to the D-type flip-flop $D_1$, an output Q from this flip-flop assumes "1" in synchronism with the clock pulse, whereby an output signal $GCA_1$ is generated. Thereafter, the outputs Q from the flip-flops $D_2$ and $D_3$ are time-sequentially produced in synchronism with the clock pulse, whereby signals $GCA_2$ and $GCA_3$ are sequentially generated. On account of this, all the temporary memory registers for information transfer, except for the register of the shot sequence memory 416, and the latch decoder shown in FIG. 3A are reset by the signal $GCA_1$, and, at the same time, the gates $317_1$ to $317_4$ in FIG. 7E are opened instantaneously, and reference value signal from the register 318 is input in the entire registers of the address portions $1_A$ to $15_A$ constituting the shot memory in synchronism with signals a–d from the afore-mentioned ring counter $208S_2$. Simultaneously with this, the reference value signal of the register 318 is transmitted to the or-gates $220J_1$ to $220J_4$ in FIG. 3B through the line 229, whereby the contents of the counter 201F to 204F are all set at the reference value. Also, the registers of the shot sequence memories are all reset by the signal $GCA_2$, whereby all the display means $10_1$ to $10_{15}$ in FIG. 3A indicate "0". The flip-flops $518_A$, $518_B$, and 520 are reset by the signal $GCA_3$ to turn off all the lamps LE, LF, and LH. If no card is inserted in the card reader, the switch $SW_1$ is in an open state, on account of which the signal $GCA_3$ is transmitted to $FSR_1$ through the gate $SA_2$, and this flip-flop $FSR_1$ is set by the signal $GCA_3$ to generate an output Q. In this state, when the shot memory button 5 is depressed, the D-type flip-flops $D_5$ to $D_9$ time-sequentially generate the outputs Q with the result that subsequent control signals are produced sequentially from the sequence control circuit in FIG. 4, and the following cycle operations are performed.

$GSM_1$ . . . sets the flip-flop 704 in FIG. 3E, turns the motor circuit 703 on, and supplies electric current to the servomotors $M_1$ to $M_4$.

$GSM_2$ . . . sets the flip-flop 514 in FIG. 3A, and turns on the lamp LA in the button 5.

$GSM_3$ . . . sets the flip-flops $201b_1$ to $201b_4$ in FIGS. 3B and 3C, and opens the gates 201B to 204B. As the result of this, outputs from the rotary encoders 201 to 204 are counted by the counters 201F to 204F, then the respective output (counted values) A to D are transmitted to the digital-analog converter 208 in synchronism with the outputs a to d of the ring counter $208S_2$ in FIG. 6B so as to be sequentially stored in the capacitors $209G_2$ to $211G_2$ of the sample-and-hold circuit, whereby the servo-motors $M_1$ to $M_4$ are servo-driven on the basis of the stored values. Accordingly, the knobs 1 to 4 are manipulated to set the respective control elements for the television camera (tm, pm, fm, and zm) at desired values, while watching the monitor. As already mentioned, in the initial stage, as the contents of the counters 201F to 204F are set at the reference value, the respective servomotors once drive the television camera at the reference position, thereafter to a position to be set by manipulating the knobs 1 to 4.

$GSM_4$... resets the registers 406 and 407 in FIG. 8B.

$GSM_5$... sets the flip-flop 508 in FIG. 3C, and prepares for turning-on of the lamps $503B_1$ to $503B_{15}$. Also, by this $GSM_5$ signal, the flip-flop $FSR_2$ is set to generate the output Q, and, by depression of any one of the shot buttons $6_1$ to $6_{15}$, the D-type flip-flops $D_{10}$ to $D_{13}$ sequentially generate the outputs Q with the consequence that signals KSMA, $GSB_1$, $GSB_4$, $GSB_2$, and $GSB_3$ are sequentially generated from the sequence control circuit in FIG. 4 to perform the following cycle operations.

$GSB_1$... opens the gate 451 in FIG. 3C, whereby the KSMA signal, which has been derived from conversion of the signals from the switches $6_{1\text{-}1}$ to $6_{15\text{-}1}$ (FIG. 4) closed in response to depression of the buttons $6_1$ to $6_{15}$ into binary codes by means of the encoder $enc_1$, is sent into the register 452 in FIG. 3B as the input. At the same time, the KSMA signal is decoded by the decoder 511 to turn on the red lamp corresponding to the depressed buttons $6_1$ to $6_{15}$, thereby displaying the designated shot No.

$GSB_4$... opens the gate 513 in FIG. 3B, and prepares for lighting of the yellow lamp of the depressed shot button.

$GSB_2$... sequentially opens the and-gates $305_1$ to $305_4$ in FIG. 3D by the outputs a to d of the ring counter $208S_2$, and time-sequentially transfers and stores the respective informations in the counters 201F to 204F to and in the "present site" registers $MP_1$ to $MP_4$ through the data compiling circuit 205.

$GSB_3$... opens the and-gate 316 in FIG. 3D, whereby the outputs A to D of the counters 201F to 204F to be time-sequentially generated from the data compiling circuit 205 in FIG. 3B are input into the shot memory through the gates $315_1$ to $315_4$ in FIG. 7E in synchronism with the outputs a to d of the ring counter $208S_2$. On the other hand, as the KSMA signal corresponding to the depressed shot button has been input in the register 452 as already mentioned, this KSMA signal is decoded by the decoder MSD in FIG. 7E, and the outputs 1 to 15 are selectively output on the basis of the KSMA signal to cause only the gate of the address portion (any of $1_A$ to $15_A$) corresponding to the pressed button to open, and the contents of the counters 201F to 204F are transferred to and stored in the register constituting the address position designated by the shot button. Also, with the data being stored in the shot memory, any of the outputs $320_1$ to $320_4$ of the memory assumes a value including "1" with the consequence that a signal is transmitted to the reset terminal of the flip-flop 519 (FIG. 3A) to reset the flip-flop and to turn off the lamp LG.

By the afore-described cycle operations, desired control informations (i.e., the tilting, panning, focussing, and zooming informations) are set in the address portion of the shot memory by the knobs 1 to 4 in correspondence to the depressed shot button. Thereafter, by setting the knobs 1 to 4 and depressing the shot button of the subsequently desired shot, the signals $GSB_1$, $GSB_4$, $GSB_2$, and $GSB_3$ are generated as mentioned in the foregoing, whereby the respective control informations are stored in the desired shot address portions in exactly the same manner as in the previous shot establishing operations. Incidentally, the display lamps $503B_1$ to $503B_{15}$ provided in the shot buttons $6_1$ to $6_{19}$ are so constructed that the red lamps are turned on by the signal $GSB_1$, as mentioned above, when the shot button is depressed. When another shot button is subsequently depressed, the decoder 511 turns on the red lamp of only the depressed button, so that the red lamps which have so far been "on" are turned off. This turn-off signal is applied to the and-gates $506_1$ to $506_{15}$ through the inverters $507_1$ to $507_4$, whereby the red lamps which have so far been turned on are turned off, and the yellow lamps are turned on instead. As the result of this, the display color of the lamp in the shot button changes from red to yellow, which indicates that the set quantity of the required control elements of the shot corresponding to the depressed shot button has been stored and held within the shot memory MS. Therefore, the turning-on of the entire yellow lamps in the shot buttons $6_1$ to $6_{15}$ indicates that the setting operations of the entire shot have been completed.

(B) Shot Sequence Memory Setting Operations

The operations are to determine the shot sequence of the shots stored in the shot memory MS, i.e., in what sequence the shots are to be presented at the time of their reproduction, and to store such determined sequence in the shot sequence memory 416, the operations of which are performed in the following manner: (1) depression of the shot sequence memory button 9; (2) time-setting by manipulation of the time setting knob; (3) depression of the shot button corresponding to a desired initial shot; and (4) depression of the shot button corresponding to the shot desired to be reproduced. The operations of (3) and (4) are repeated thereafter.

First of all, by depression of the shot sequence memory button 9, the D-type flip-flops $D_{14}$ to $D_{18}$ time-sequentially generate the outputs Q with the consequence that the signals $GSM_1$, $GCM_1$, $GCM_2$, $GCM_3$, and $GCM_4$ are sequentially output to perform the following cycle operations.

$GSM_1$... sets the flip-flop 704 in FIG. 3E to turn on the motor driving circuit 703.

$GCM_1$... sets the flip-flop 515 in FIG. 3A, and turns on the lamp LB to display the setting operation of the shot sequence memory.

$GCM_2$... transmits the $GCM_2$ signal to the reset terminal CLR of the address register 406 through gate $3CO_6$ in FIG. 8B to thereby render the content of the register in "0" state.

$GCM_3$... transmits the $GCM_3$ signal to the preset terminal PR of the register 407 through the gate $3CO_1$ in FIG. 8B to input "1" into the initial stage bit of the register. Owing to this, the lamp $13_1$ in FIG. 3A is turned on to display the shot sequence No. to be subsequently designated.

$GCM_4$... resets the flip-flops $201b_1$ to $201b_4$ in FIG. 3A to close the gates 201B to 204B, whereby the transfer paths between the rotary encoders 201 to 204 and the counters 201F to 204F are shut.

In the above-described cycle operations, when the button 9 is depressed, a pulse is input into the reset terminals of the flip-flops 514, 516, and 517 in FIG. 3A to thereby reset the respective flip-flop, and the lamps LA, LC and LD are turned off. Also, when the output signal $GCM_4$ is generated, the flip-flop $FSR_3$ is set to generate the output Q. On account of this, when the shot button is depressed, a pulse is transmitted to the flip-flop $D_{19}$ through the and-gate $SA_8$ in FIG. 4, whereby the flip-flops $D_{19}$ to $D_{26}$ sequentially generate the outputs Q. In this consequence, the output signals $GCM_5$, $GSB_4$, $GSB_5$, $GSB_6$, $GSB_7$, $GSB_8$, $GSB_9$, and $GSB_2$ are sequentially generated to perform the following cycle operations. Incidentally, when the shot button is depressed, a pulse is also transmitted to the and-gate $SA_6$ of the and-gate in FIG. 4. However, since the flip-flop $FSR_2$ has been reset by the depression of the button to designate the respective operations (in this case, the button 9), no signal $GSB_1$ to $GSB_3$ generates at the time of the shot designation operations but the abovementioned signals alone.

$GCM_5$ ... opens the gates $3CO_5$ and $408_1$ to $408_{15}$ in FIG. 8B, whereby the content of the register 406 (the digital values corresponding to the shot sequence No.) is transferred to the register $416_1$ of the shot sequence memory so as to designate the shot sequence addresses $1_{AB}$ to $15_{AB}$ respectively corresponding to the shot sequence No. 1 to No. 16 of the shot sequence memory (FIG. 8A).

$GSB_4$ ... opens the and-gate 418 in FIG. 3A and send a binary code signal (KSMA signal) corresponding to the abovementioned depressed shot button into the shot sequence memory, whereby the KSMA signal is stored in the register (FIG. 8A) constituting the designated shot sequence address portion as mentioned above.

$GSB_5$ ... opens the gate 420 in FIG. 3C, and stores a time codified signal (n) set by the knob 8 in the register (FIG. 8A) constituting the designated shot sequence address portion as mentioned above. On account of this, there are stored, in the two registers of the designated address portion in the shot sequence memory, the shot No. codified signal KSMA and the time codified signal (n).

$GSB_6$ ... transmits a pulse to the preset terminal PR of the register 406 through the gate $3CO_4$ in FIG. 8B and transfers the content of the register 407 to the register 406, as the result of which the red lamp $14_1$ is turned on to indicate the preset shot No.

$GSB_7$ ... transmits a pulse to the right shift terminal R-SFT of the register 407 through the gate $3 CO_2$ in FIG. 8B to shift the content of the register 407 to the right. On account of this, the lamp$13_1$ is turned off, and the lamp $13_2$ is turned on to indicate that the subsequent shot is the second one.

$GSB_8$ ... opens the gate 450 in FIG. 8A to transfer into the register 452 the KSMA signal which is stored in the register of the address portion designated by the abovementioned register $416_1$ by means of the $GSB_4$ signal. By this signal transfer, the address portions $1_A$ to $15_A$ shown in FIG. 7E which correspond to the KSMA signal (the signal corresponding to the depressed shot button) are designated and the gates provided in the designated address portions are opened, whereby the contents of the register, in which the informations constituting the address portions are recorded, are generated as outputs. Incidentally, the gates $603_{13-1}$ to $603_{13-4}$ in FIG. 7E are opened during a period other than operation of the card reader to be described later, and one of the input terminals of each of the gates $603_{14-1}$ to $603_{14-4}$ is normally applied with an input "O", hence the address portion of the shot memory is determined by the content of the register 452.

$GSB_9$ ... opens the gates $308_{1-1}$ to $308_{4-4}$ in FIG. 7E, and the set informations which are stored and held in the designated address portion of the shot memory to be designated by the shot address register 452 are transferred to the "destination" register Md.

$GSB_2$ ... opens the gates $305_1$ to $305_4$ in FIG. 3D in synchronism with the outputs a to d of the abovementioned ring counter, whereby digital values corresponding to the respective informations of the counter 201F to 204F are input into the "present site" registers $MP_1$ to $MP_4$. Since the counters 201F to 204F contain the counted values corresponding to the modes, in which the television camera is set beforehand, determination is first made as to whether it is possible to drive the television camera to its destination set by the signal as transferred to and stored in the "destination" memory Md within a time period set for the respective control elements of the television camera and at the limit speeds of the respective servomotors $M_1$ to $M_4$, and, if the result of the determination indicates inability to such driving, the operations to index a renewed time which has been extended to a renewed time which has been extended to a possible extent will subsequently be carried out by the counters. Also, the $GSB_2$ signal enters into the or-gate $SOR_1$ in FIG. 4 to transmit a pulse to the flip-flop $D_{27}$ and causes the outputs Q of the flip-flops $D_{27}$ to $D_{30}$ to be sequentially generated, whereby the signals $GSB_{10}$, $GSB_{17}$, $GSB_{18}$, and $GSB_{11}$ are generated to execute the abovementioned cycle.

$GSB_{10}$ ... opens the respective and-gates of the subtraction circuits $309_1$ to $309_4$ in FIG. 7D to cause the subtraction operation of the contents of the registers Mp and Md to be performed. As mentioned in the foregoing, the registers $Md_1$ to $Md_4$ have been input with informations corresponding to the destination, to which the television camera is controlled, and the registers $Mp_1$ to $Mp_4$ have been input with informations corresponding to the present state of the television camera. On account of this, in the respective subtraction circuits, there are performed operations represented by the equations $D_t = tm + 1 - tm$, $D_{p=pm} + 1 - pm$, $D_f = fm + 1 - fm + 1$, and $D_z = zm + 1 - zm$ (where $tm + 1$, $pm + 1$, $fm + 1$, and $zm + 1$ denote the subsequent control position of the respective control elements, and Dm, Pm, Tm, and Zm denote the present control positions) corresponding to the control amount of the television camera in the respective control elements, as the result of which $D_t$, $D_p$, $D_f$, and $D_z$ are stored in the registers $309_{1R}$ to $309_{4R}$.

$GSB_{17}$ ... opens the gate 302 in FIG. 7A, and transfers the time codified signal (n) set by the knob 8 into the timer register 301.

$GSB_{18}$ ... opens the gate $304_B$ in FIG. 7A, and transfers into the register 304 a value n.To which is the result of multiplication of the abovementioned time codified signal n and the reference signal To stored in the register 303 by means of the multiplier $304_A$.

$GSB_{11}$ ... opens the gates $310_{B1}$, to $310_{B4}$ and $310_{C1}$ to $310_{C4}$, and performs magnitude comparison of the contents n.To of the register $304_6$ and the contents of the abovementioned registers $309_{1R}$ to $309_{4R}$ in FIG. 7D by means of the comparators $310_1$ to $310_4$. Since the comparators have such properties that, when the input $In_1$ is equal to the input $In_2$ ($In_1 = In_2$), the output $X = Y = 1$; when $In_1 < In_2$, $X = 1$ and $Y = O$; and when $In_1 > In_2$, $X=0$ and $Y=1$, so that the outputs of the and-gates $310_{C1}$ to $310_{C4}$ become "1", only when the outputs of the entire comparators are $In_1 \geq In_2$, i.e., $n \cdot To \geq D_p$ to $D_z$, whereby the and-gate $310_d$ generates an output $ANS_1$, and, in other occasions, an output "1" is generated from any of the and-gates $310_{B1}$ to $310_{B4}$. In this consequence, when the output $ANS_1$ is not generated, the and-gate $SA_9$ in FIG. 4 generates the output "1" and transmits the output to the flip-flop $D_{29}$. On account of this, the signals $GSB_{18}$ and $GSB_{11}$ are regenerated. On the other hand, when the output $ANS_1$ is not generated, the output "1" of the and-gates $310_{B1}$ to $310_{B4}$ is transmitted to the right shift terminal of the shift register 301, so that the content of the timer register assume a value twice as great as the original value, i.e., 2n, and the abovementioned operations are again performed by the signals $GSB_{18}$ and $GSB_{11}$, whereby the content of the shift register 301 is increased until the outputs $ANS_1$ is generated. When the outputs $ANS_1$ is generated by the abovementioned operations, i.e., when $n \cdot To \geq D_p$ to $D_z$, $D_{31}$ and $D_{32}$ generate the outputs Q and the following operations are performed by the output signals $GSB_{12}$ and $GSB_2$.

$GSB_{12}$ ... opens the gates $A_{1-1}$ to $A_{4-8}$ in FIG. 7B, whereby outputs $D_t/n$, $D_p/n$, $D_f/n$, and $D_z/n$ of the content n (where n is a value when the output $ANS_1$ is generated) of the abovementioned register 301, and the contents $D_t$, $D_p$, $D_f$, and $D_z$ of the above-mentioned registers $309_{1R}$ to $309_{4R}$ enter into the renewal registers $Mc_1$ to $Mc_4$ through the dividers $311_1$ to $311_4$.

$GSB_2$ ... opens the gates $305_1$ to $305_4$ in FIG. 3D, and transfers the content of the present site from the counters 201F to 204F into the "present site" registers $MP_1$ to $MP_4$. by this $GSB_2$ signal, the flip-flop $FSR_4$ is set and generates an output Q, whereby the output signal $GSB_{13}$ is generated to perform the following action.

$GSB_{13}$ ... opens the gates $306_{1-1}$ to $306_{1-4}$ in FIG. 7C, whereby addition of the content of the register $Mc_1$, i.e., $D_t n$, and the content tm of $MP_1$ is performed by the adder $312_1$ every time a pulse is generated from 313 with a cycle of To. That is, $MP_1$, when an input "1" enters into its "READ" terminal, reads the content of the adder $312_1$ therein, and, when the input "1" enters into its "WRITE" terminal, generate the thus read-in content as an output, so that the result of addition from $MP_1$ is output at every cycle To, and the content of $MP_1$ is transmitted into the input terminal of the adder 312 at every time the input "1" enters into the terminals T of $FD_1$ to $FD_4$, hence the content of $MP_1$ is added to the content of $Mc_1$ at every cycle To. On the other hand, as the content of $Md_1$, i.e., tm+1, enters into the input terminal $B_{1r}$ of the comparator 314, the equations $tm + (D_t/n) \times n = tm + D_t = tm + tm + 1 = tm = tm + 1$ become established, when the adder $312_1$ has carried out the addition for n number of times, whereby the contents of $MP_1$ and $Md_1$ coincide to generate the output $ANS_2$. Moreover, since the signal $GSB_{13}$ is input in the and-gates $224K_1$ to $224K_4$ in FIG. 3B, the contents of the counters $201F_1$ to $201F_4$ are increased at every cycle To until the output $ANS_2$ is generated, and the entire control elements simultaneously assume the values of the destination. In other words, suppose that tm=5, ppm=4, fm=4, zm=1, tm+1=7, pm+1=5, fm+1=6, zm+1=3, n=1, To=1, then $D_t=2$, $D_p=1$, $D_f=2$, and $D_z=2$. Since $n \cdot To < D_t$, $D_p, D_z$, n is shifted to be twice as large as the original value, hence n=2. At this time, the output $ANS_1$ is generated, and $D_t/n=1$, $p/n=\frac{1}{2}$, $D_f/n=1$, and $D_z/n=1$ are stored in the respective registers $Mc_1$ to $Mc_4$, and the additions $tm+D_t/n$, $pm+D_p/n$, $fm+D_{f/n}$, and $zm+D_z/n$ are carried out. As the result, when the addition is performed for n number of times, e.g., for two times, $tm+(D_t/n)n=5+(2/2) \times 2 = 7 = tm+1$, $pm(D_p/n)n=4+(\frac{1}{2}) \times 2 = 5 = pm+1$, $fm+(D_f/n)n=4+(2/2) \times 2 = 6 = fm+1$, and $zm+(D_z/n)n=1+(2/2) \times 2 = 3 \cdot 3$. Therefore, all the control elements simultaneously arrive at the destination. Thus, when the contents of the "present-site" registers and the "destination" registers are coincided, the comparator 314 in FIG. 7C generates the output $ANS_2$ to reset the flip-flop $FSR_4$ in FIG. 4, and to extinguish the signal $GSB_{13}$, whereby a series of operations are completed. After the operations, when the shot button is depressed again, the output signals $GCM_3$ to $GSB_3$ are generated again, whereby the shot address designated signal KSMA is stored by depression of the shot button to the next shot sequence address. Thereafter, designation of the desired shot address from the shot sequence No. 1 to No. 15 can be carried out in the exactly same manner as explained in the foregoing. That is, in the above-described operations, the signal $GSB_7$ functions to sequentially shift the content of the shift register 407 shown in FIG. 8B, so that the contents of the registers 406 and $416_1$ shift accordingly at every time the shot button is depressed, while the address portions $1_{AB}$ to $15_{AB}$ of the shot sequence memory shown in FIG. 8A are sequentially designated at every time the shot button is depressed. As the result, the shot No. is stored in the sequence of the shot buttons ($6_1$ to $6_{15}$) depressed to the address portions $1_{AB}$ to $15_{AB}$ corresponding to the shot sequence No. 1 to No. 15, whereby the shot sequence can be established. The characteristic features in the afore-described operations reside in that, if the initially set time is short for covering the destination mode to be set by depression of the shot buttons, extension ratio for the set time is operated so that the actual linear movement of the television camera at the time of its reproduction may be monitored.

(C) Desired Mode Reproduction Operations

In order to set the television camera in the desired mode and in the predetermined shot sequence, the following operations are performed: (1) depression of the operating button 11; (2) depression of the reset button 20; and (3) depression of the change button 12.

At the time of reproducing the desired modes, the television camera is first controlled on the basis of the respective control elements in the shots in the ultimately established shot sequence No., after which the reproduction is carried out in the sequence of from the shot sequence No. 1 to the shot sequence No. 15. First of all, the operating button 11 is depressed, whereby the flip-flops $D_{OP1}$ to $D_{OP9}$ shown in FIG. 4 sequentially generate the outputs Q to produce the signals $GSM_1$, $GOP_1$, $GSM_3$, $GOP_2$, $GCM_4$, $GCM_5$, $GSB_8$, $GSB_9$, and $GSB_2$, performing the following cycle operations.

$GSM_1$ ... sets the flip-flop 704 in FIG. 3E to actuate the motor driving circuit 703.

$GOP_1$ ... sets the flip-flop 516 in FIG. 3A to turn on the lamp LC.

$GSM_3$ ... sets the flip-flops $201b_1$ to $201b_4$ in FIGS. 3B and 3C to open the gates 201B to 204B.

$GOP_2$ ... resets the flip-flop 508 and turns off the entire yellow lamps.

$GCM_4$ ... resets the flip-flops $201b_1$ to $201b_4$ in FIGS. 3B and 3C, and shuts the signal transfer paths between the encoders 201 to 204 and the counters 201F to 204F.

GCM$_5$ . . . opens the gate 408$_1$ to 408$_{15}$ in FIG. 8B, and transfers the content of the register 406 to the register 416$_1$. Now, assume that the ultimately established shot sequence No. is the shot sequence No. 14. The register 416$_1$ generates the output from the output terminal O$_{14}$ alone, on account of which the address 14AB of the shot sequence memory 416 in FIG. 8A is designated, and the content of the register of the address 14AB is transmitted to one of the input terminals of the gate 450. On the other hand, the addresses 1$_{AB}$ to 15$_{AB}$ are designated in the sequence of 1$_{AB}$ to 15$_{AB}$ in correspondence to the shot sequence No. 1 through the shot sequence No. 15 at the time of the abovementioned shot sequence setting operation. In this case, since the shot address signals KSMA of the respective shot sequence Nos. have been stored in the shot sequence memory, the contents of the register of the address 14AB to be transmitted to the gate 450 becomes the shot address signal of the shot sequence No. 14.

GSB$_8$ . . . opens the gate 450 in FIG. 8A to transfer the shot address signal of the shot sequence No. 14 (address 14AB) into the shot memory address register 452. At this time, the gates 603$_{13-1}$ to 603$_{13-4}$ in FIG. 7E are opened as already mentioned with respect to the shot sequence setting, and, moreover, no signal is applied to one of the input terminals of each of the gates 603$_{14-1}$ to 603$_{14-4}$, as mentioned above, so that the content of the register 452 is transmitted to the decoder MSD. In this consequence, the red lamps corresponding to the shot address signals are turned on by the decoder shown in FIG. 3C. Furthermore, the contents of the register 452 transmitted to the decoder MSD are decoded by the decoder, whereby the addresses 1$_A$ to 15$_A$ are selectively designated in correspondence to the shot address signals transferred to the register 452. The addresses 1$_A$ to 15$_A$ have established therein the respective control informations for every shot at the time of the shot establishing operation, hence the respective control informations corresponding to the selected shot sequence No. 14 are transmitted to one of the input terminals of each of the gates 308$_{1-1}$ to 308$_{4-4}$.

GSB$_9$ . . . opens the gates 308$_{1-1}$ to 308$_{4-4}$, and causes the respective informations of the designated address portions to enter into the "destination" registers Md$_1$ to Md$_4$ as the input.

GSB$_2$ . . . transfers the data from the counters 201F to 204F in FIGS. 3B and 3C to the "present site" registers MP$_1$ to MP$_4$ through the data compiling circuit 205 and the gates 305$_1$ to 305$_4$ shown in FIG. 3D. This GSB$_2$ signal is transmitted to the or-gate SOR$_1$ in FIG. 4, whereby the abovementioned signals GSB$_{10}$, GSM$_{17}$, GSB$_{18}$, GSB$_{12}$, GSB$_2$, and GSB$_{13}$ are produced. The television camera moves linearly in response to the respective control values corresponding to the shot of the shot sequence No. 14 stored in the "destination" register. After reproduction of the shots of the ultimately established shot sequence No. through the aforedescribed operations, the reset button 20 in FIG. 4 is depressed, whereby the flip-flop D$_{32R}$, and D$_{33R}$ sequentially generates the outputs Q, and the signals GSM$_4$ and GRS$_1$ are produced to perform the following cycle operations.

GSM$_4$ . . . is transmitted to the clear terminal CLR of the registers 406 and 407 in FIG. 8B to render the contents of these registers "0".

GRS$_1$ . . . is transmitted to the preset terminal PR of the register 407 through the gate 3CO$_1$ in FIG. 8B to render the initial stage of the register 407 to be "1", and the subsequent stages thereof to be "0", whereby the content of the register 407 becomes " . . . 001" in correspondence to the shot sequence No. 2, and the shot sequence No. 1 is designated. This GRS$_1$ signal is also transmitted to the flip-flops D$_{C1}$ to D$_{C11}$ in FIG. 4 to thereby sequentially generate the outputs Q. As the result of this, the signals GSB$_6$, GRS$_2$, GCM$_5$, GSB$_8$, GSB$_9$, GSB$_7$, and GSB$_2$ are produced to perform the following cycle operations.

GSB$_6$ . . . is transmitted to the gate 3CO$_4$ in FIG. 8B to transfer the content of the register 407 to the register 406. Also, since the content of the register 407 has been set at "1" in its initial stage, and at "0" in its subsequent stages, the content of the register 406 is step-forwarded from " . . . 0, 0" to " . . . 0,1", whereby the register 406 will be designated to the shot sequence No. 1, and the red lamp is turned on by the decoder 511 in FIG. 3B.

GRS$_2$ . . . opens the gates 611$_1$ to 611$_{15}$ in FIG. 9C, whereby the coil driver circuit 610$_1$ is selected in accordance with the content of the register 406 ( . . . 0,1), the relay L$_1$ of the coil driver circuit 610$_1$ is actuated to turn on the switch 609$_{1-1}$, thereby storing the shot sequence No. 1 in the magnet counter.

GCM$_3$ . . . opens the gates 408$_1$ to 408$_{15}$ in FIG. 8B and transfers the content of the register 406 into the register 416$_1$. As the result, the register 416$_1$ generates an output from its output terminal 0$_1$, whereby the address 1$_{AB}$ corresponding to the shot sequence No. 2 of the shot sequence memory 416 shown in FIG. 8A is designated, and the content of the register 416$_{1R}$ is transmitted to one of the input terminals of the gate 450. Further, the addresses 1$_{AB}$ to 15$_{AB}$ have been designated in the sequence of 1$_{AB}$ to 15$_{AB}$ in correspondence to the shot sequence No. 1 to the shot sequence No. 15 at the time of setting the shot sequence, and have been stored with the shot address signals KSMA of the respective shot sequence Nos., the content of the register 416$_{1R}$ to be transmitted to the gate 450 assumes the shot address signal of the shot sequence No. 1.

GSB$_8$ . . . opens the gate 450 in FIG. 8A, and transfers the shot address signal of the shot sequence No. 1 stored in the register 416$_{1R}$ into the shot memory address register 452 shown in FiG. 7E. As the result, the red lamps corresponding to the shot address signals are turned on by the decoder shown in FIG. 3B. Further, the content of the register 452 is decoded by the decoder MSD, and the addresses 1$_A$ to 15$_A$ are selectively designated in correspondence to the shot address signals of the shot sequence No. 1 in the register 452. Since the addresses 1$_A$ to 15$_A$ have established therein the respective informations for each shot at the time of the shot establishing operation, they are transmitted to one of the input terminals of the respective control information gates 308$_{1-1}$ to 308$_{4-4}$ corresponding to the shots of the selected shot sequence Nos.

GSB$_9$ . . . opens the gates 308$_{1-1}$ to 308$_{4-4}$ to put the respective control informations of the designated address portions into the "destination" registers Md$_1$ to Md$_4$ as the shot of the shot sequence No. 1.

GSB$_7$ . . . enters into the terminal R-SFT of the register 407 through the gate 3CO$_2$ in FIG. 8B to shift the content of the register 407. As the result, the content of this register is forwarded by one step to shift from " . . . 0,1" to " . . . 0,1,0" showing the shot sequence No. 2.

GSB$_2$ . . . transfers the data of the counters 201F to 204F into the "present site" registers MP$_1$ to MP$_4$, and, at the same time, applies a pulse signal to the flip-flop D$_{27}$ through the or-gate SOR$_1$ shown in FIG. 4 to produce the abovementioned signals $GSB_{10}$, $GSB_{17}$, $GSB_{18}$, $GSB_{11}$, $GSB_{12}$, $GSB_2$, and $GSB_{13}$, whereby the television camera is controlled to a control value designated by the shot sequence No. 1. Next, when the change button 12 shown in FIG. 4 is depressed, the flip-flops $D_{C1}$ to $D_{C7}$ sequentially generate the outputs Q to produce the abovementioned signals $GSB_6$ to $GSB_2$, hence the following cycle operations are carried out.

$GSB_6$ . . . is transmitted to the gate $3C0_4$ in FIG. 8B to transfer the content of the register 407 to the register 406. As mentioned above, the register 407 has already stored therein the content " . . . 0,1,0" which indicates the shot sequence No. 2, the content of the register 406 is also step-forwarded from " . . . 0,1" showing the shot sequence No. 1 to " . . . 0,1,0" showing the shot sequence No. 2, whereby the shot sequence designation is changed from No. 1 to No. 2, and the red lamp is turned on in $14_2$ by the decoder 511 shown in FIG. 3B.

$GRS_2$ . . . opens the gates $611_1$ to $611_{15}$, as already mentioned, whereby the gates $611_2$ generates an output in accordance with the content of the register 406, the relay $L_1$ (not shown in the drawing) of the coil driver circuit $610_2$ becomes actuated to connect the switch $609_{1-2}$ with the contact a so as to close the same, and to step-forward the magnet counter once. At this time, the or-gate $611_{1-1}$ generates an output, whereupon the relay $L_2$ of the coil driver circuit $610_1$ becomes actuated, and the switch $609_{1-1}$ is changed over to the side of the contact b.

$GCM_5$ . . . opens the gates $408_1$ to $408_{15}$ in FIG. 8B, as already mentioned, and transfers the content of the register 406 into the register $416_1$ to generate the output "1" from the output terminal $O_2$. As the result, the address portion $2_{AB}$ corresponding to the shot sequence No. 2 is designated, whereby the shot address signal KSMA of the shot sequence No. 2 is designated.

$GSB_8$ . . . opens the gate 450, causes the shot address signal of the shot sequence No. 2 in the address $2_{AB}$ to enter into the register 452, and designates the address portion corresponding to the shot sequence No. 2 among the address portions $1_A$ to $15_A$ in the shot memory.

$GSB_9$ . . . opens the gates $308_{1\text{-}1}$ to $308_{4\text{-}4}$, and transfers the respective control informations stored in the address portion corresponding to the shot sequence No. 2 into the "destination" registers $Md_1$ to $Md_4$.

$GSB_7$ . . . enters into the terminal R-SFT of the register 407 through the gate $3CO_2$ in FIG. 8B to shift the content of this register. As the result, the register 407 is forwarded by one step to shift from " . . . 1,0" to " . . . 1,0,0" showing a shot sequence No. 3.

$GSB_2$ . . . transfers the data of the counters 201F to 204F into the "present-site" registers $MP_1$ to $MP_4$, and, at the same time, applies a pulse signal to the flip-flop $D_{27}$ through the or-gate $SOR_1$ in FIG. 4 to produce the abovementioned signals $GSB_{10}$, $GSB_{17}$, $GSB_{18}$, $GSB_{11}$, $GSB_{12}$, $GSB_2$, and $GSB_{13}$, whereby the television camera is controlled to the controlled values as designated by the shot sequence No. 2. Thereafter, at every time the change-button 12 is depressed, the addresses $3_{AB}$ to $15_{AB}$ of the shot sequence memory are sequentially designated, and the reproduction thereof can be performed sequentially from the shot sequence No. 3 to the shot sequence No. 15.

(D) Shot Changing Operation After Reproduction Operation

After the reproduction, when it is desired to correct the control value of the shot, the knobs 1 to 4 are reset, and the correction button 24 in FIG. 4 is depressed, whereupon the flip-flops $D_{34}$, $D_{35}$, and $D_{36}$ sequentially generate the output Q to produce the signals $GSM_3$, $GSB_3$, and $GCM_4$, and the following cycle operations are performed.

$GSM_3$ . . . sets the flip-flops $301b_1$ to $201b_4$ in FIG. 3A, and opens gates 201B to 204B, whereby the informations in the counters 201F to 204F are corrected, the servomotors $M_1$ to $M_4$ are driven for the corrected portion (or amount), and the mode of the camera is corrected.

$GSB_3$ . . . opens the gate 315 in FIG. 3D, and put the respective control informations into the address portion of the shot memory corresponding to the shot address signal stored in the register 452 shown in FIG. 7E. At this time, as a value same as the shot address signal of the last reproduced shot has been stored in the register 452, the control information for the shot only is corrected.

$GCM_4$ . . . resets the flip-flop $GCM_4$ in FIG. 3B to shut the transfer path between the encoder and the counter. Incidentally, when the forward skip button 19 and the reverse skip button 18 shown in FIG. 8B are depressed, a pulse is applied to either the left shift terminal L-SFT of the register 407 or the right shift terminal R-SFT thereof to shift the content of the register 407 either to the left or to the right, so that the shot sequence No. can be corrected.

(E) Write-In Operations to Magnetic Card

In order to perform write-in operations to the magnetic card, the card reader preparation button 21 is depressed, whereby the flip-flops $D_{crp1}$ to $D_{crp3}$ in FIG. 4 sequentially generate the output Q to produce the signals $GCR_2$, $GCR_1$, and $GCM_4$, and the following cycle operations are performed.

$GCR_2$ . . . resets the flip-flop 704 in FIG. 3E to stop power supply to the servo-motors $M_1$ to $M_4$ (FIG. 3C).

$GCR_1$ . . . sets the flip-flop 517 in FIG. 3A to turn on the display lamp LD.

$GCM_4$ . . . resets the flip-flops $201b_1$ to $201b_4$ for the purpose of inhibiting inputs from the rotary encoders into the counters 201F to 204F, thereby bringing the gates 201B to 204B in the inhibited state. The signal also sets the flip-flop $FCR_1$ in FIG. 4. Next, when the write-in button 23 is depressed, the flip-flops $D_{R1}$ and $D_{R2}$ generate the output Q to produce the signals $GCR_7$ and $GCR_4$, thereby performing the following cycle operations. Also, by depressing the button 23, the flip-flop $FCR_1$ in FIG. 4 is reset.

$GCR_7$ . . . sets the flip-flop 518B in FIG. 3C to turn on the lamp LF.

$GCR_4$ . . . sets the flip-flop $FCM_1$ in FIG. 7D to close the switch $SWM_1$, whereby the motor 601M of the card reader is driven to rotate the roller Rol in FIG. 9D and to start feeding of the card 602. Also, the signal $GCR_4$ sets the flip-flop $FCR_2$ to produce the signal $GCR_8$ and to perform the following operations.

$GCR_8$ . . . actuates the write-in circuit 603 in FIG. 3A, whereby the gate $603_2$ in FIG. 9A is opened, and a pulse from the pulse oscillator $603_1$ is transmitted to the flip-flop $603_4$. This signal is also transmitted to the gates $603_{13\text{-}1}$ to $603_{13\text{-}4}$ through the inverter $603_{10}$ to inhibit transfer of a signal from the register 452 into the decoder MSD, and, at the same time, to actuate the counter 603. On account of this, when the pulse signal containing 24 pulses is generated from $603_4$, the counter $603_7$ generates an output to cause the counter $603_9$ to generate the output $Q_A$, and to cause the decoder $603_{12}$ to generate an output at its output terminal 1, thereby transmitting the same to the or-gate $416_{01}$ in FIG. 8A, designating the address $1_{AB}$ of the shot sequence memory, and outputting the content of the register in the address $1_{AB}$ to the lines $606_1$ and $606_2$. Further, the signal is transmitted to the decoder MSD in FIG. 7E through the or-gate $603_{14-1}$ by means of the above-mentioned output $Q_A$ to generate an output from the output terminal 1 of the decoder MSD, thereby designating the address $1_A$, and outputting the content of the register in the address $1_A$ into the lines $320_1$ to $320_4$. At this time, a pulse is transmitted to the preset terminal PR of $603_{15}$ by the output from $603_7$ through $603_{14}$, whereby outputs to the lines $606_1$ to $320_4$ are read-in parallel. On account of this, subsequent 24 pulses are generated from the flip-flop $603_4$ with simultaneous recording of the content of the addresses $1_A$ and $1_{AB}$ into the card reader in a time-sequential and serial manners. Thereafter, the addresses in the respective memories are designated in the sequence of $1_A$ to $15_A$ and $1_{AB}$ to $15_{AB}$ at every time the 24 pulses are generated from the flip-flop $603_4$ in the same way as described above, whereby the contents of the respective addresses are serially recorded in the card. When the informations of the entire address portions are recorded in the card by the afore-described operations, the output from the counter 603 changes from all "1" to all "0", at which time the nand-gate $603_{11}$ generates a rising pulse, and the one-shot multivibrator $DFF_1$ generates a single pulse output Q, by which output the flip-flop $FCR_2$ shown in FIG. 4 is reset to cease the write-in operation into the card. At this time, the single pulse output Q of the one-shot multivibrator $DFF_1$ is transmitted to the reset terminal of the flip-flop $FCM_1$ in FIG. 9D, whereby $FCM_1$ is reset and the power supply switch $SWM_1$ to the motor $601M$ becomes open.

(F) Card Reading and Reproduction at Time of Power Supply Stoppage

As the write-in operation into the magnetic card has been completed, the reproduction of the desired shot is performed. However, if there takes place power supply stoppage during this reproduction operations, it can be restored in such a way that the power source is turned on again, the signals $GCA_1$, $GCA_2$, and $GCA_3$ are generated to carry out the afore-mentioned operations, and, at the same time, the signal $GCA_3$ is transmitted to the flip-flop $DCR_1$ through the gates $SO_1$ and $SA_1$, whereby $DCR_1$ to $DCR_5$ sequentially generate the output Q to produce the signals $GCR_2$, $GCR_1$, $GCM_4$, $GCR_3$, and $GCR_4$ which perform the following cycle operations. In this case, it is understood that a card is inserted into the card reader, whereby the switch $SW_1$ is closed.

$GCR_2$ . . . resets the flip-flop 704 in FIG. 3E to stop the power supply to the servo-motors.

$GCR_1$ . . . sets the flip-flop 517 in FIG. 3A to turn on the lamp LD.

$GCM_4$ . . . resets the flip-flops $201b_1$ to $201b_4$ in FIGS. 3B and 3C to close the gates 201B to 204B.

$GCR_3$ . . . sets the flip-flop 518A in FIG. 3A to turn on the lamp LE.

$GCR_4$ . . . sets the flip-flop $FCM_1$ in FIG. 9D to close the switch $SWM_1$ thereby to drive the motor 601M for the card reader to feed the card. This signal also sets the flip-flop $FSR_1$ to generate the signal $GCR_5$, by which signal the following operations are carried out.

$GCR_5$ . . . opens the gate $603_2{}'$ of the read-out circuit in FIG. 9B, and transmits to the flip-flop $603_4{}'$ a clock pulse for read-out operation to be output from the card reader. (This clock pulse may be obtained by applying to the or-gate $604_{or}$ an input information signal fed into the card at the time of the write-in operation, and a signal derived from inversion of the information signal by the inverter $603_{16}$ in FIG. 9A.) By this clock pulse transmission into the flip-flop $603_4{}'$, the informations of the shot sequence memory and the shot memory which have been stored in the card in the sequence of the addresses $1_A$ to $15_A$ to $1_{AB}$ to $15_{AB}$ in synchronism with the pulse of $603_4{}'$ are serially output from the card reader. The hexanary counter $603_7{}'$ generates an output at every time the pulse consisting of 24 pulses is output from $603_4{}'$ to trigger the one-shot multivibrator $603_8{}'$. On account of this, the register $603_{15}{}'$ outputs the serial input information at every time a pulse consisting of 24 pulses is output from $603_4{}'$. Also, as a single pulse is input into the counter $603_9{}'$ from the one-shot multivibrator $603_8{}'$ at every time the pulse consisting of 24 pulses is output, the outputs $Q_A$ to $Q_D$ change their output conditions by means of the binary code at every time 24 output pulses are generated from the counter $603_4{}'$, thereby transmitting the signal to the decoders $604_2$ and MSD. Accordingly, at every time the 24 pulses are generated from $603_4{}'$, the address portions $1_A$ to $15_A$ and $1_{AB}$ to $15_{AB}$ of the shot sequence memory and the shot memory are sequentially designated, whereby the respective informations recorded in the card are transferred into the registers in the designated address portions through the lines $321_1$ to $321_4$ and $607_2$ and $607_1$. Thus, the informations to the memory from the card are read out. In this manner, when the informations are transferred from the card into the total address portions, the outputs $Q_A$ to $Q_D$ of the counter $603_9{}'$ change from all "1" to all "0", thereby triggering the one-shot multivibrator $DFF_2$ and generating the signal $GCR_6$. This signal $GCR_6$ is transmitted to the reset terminal of the flip-flop $FSR_1$ in FIG. 4 to extinguish the signal $GCR_5$. Further, the signal is transmitted to the gates $614_1$ to $614_{15}$ in FIG. 9C to open the gate corresponding to the shot sequence No. before the power supply stoppage by a signal from the switches which are closed (i.e., which are closed in correspondence to the shot No. prior to the power supply stoppage) among the switches constituting the magnet counter, whereby the signal is transmitted to the register 407 and 406 in FIG. 8B to bring the contents of the registers 406 and 407 to the respective values corresponding to the shot sequence No. prior to the power supply stoppage. At this time, the signal $GCR_6$ is transmitted to the flip-flop $FCM_1$ in FIG. 9D to reset the $FCM_1$ and to open the power supply switch $SWM_1$ for the motor 601M. In this way, the read-out operations from the card reader is completed. When the read-out operations are thus carried out, the abovementioned $GCR_6$ signal is transmitted to the flip-flop $D_{op1}$ through the gate $SO_2$ to produce the abovementioned signals $GSM_1$ to $GSB_2$ as well as $GSB_{10}$ to $GSB_{13}$ so as to perform automatically the reproduction operations starting from the shot sequence No. which was done before the power supply stoppage.

As stated in the foregoing, since the control device for television camera according to the present invention is so constructed that the desired modes of television photography are stored in the shot memory, and, at the same time, the sequence of the shot reproduction is stored in the shot sequence memory, it is capable of automatically performing the reproduction of each shot by the shot sequence stored in advance in the shot sequence memory, thereby enabling the television camera to be controlled in an extremely simple operation. Moreover, once the contents as stored in the memories are recorded in the card by the card reader, such informations can be automatically read out of the card reader to the memories at the time of the power supply stoppage, and other abnormal situations, whereby the reproduction operations can be automatically restored to a state prior to the power supply stoppage. Thus, the present invention exhibits remarkable effect in the remote control of the television camera.

What is claimed is:

1. A control device for a camera having control elements for taking a plurality of scenes successively, comprising in combination:
    (a) control information setting means for setting control quantities for the control elements of the camera;
    (b) conversion means to convert the control quantities set by said setting means into electrical signals;
    (c) a memory circuit having a plurality of memory portions;
    (d) a designation signal forming circuit for forming a designation signal, a predetermined memory portion being designated on the basis of the value of said signal;
    (e) a manually operated member to determine the value of said designation signal;
    (f) a signal transmission circuit connected to said memory circuit and to said conversion means, said circuit transmitting an electrical signal from said conversion means to the memory portion designated by the designation signal;
    (g) a read-out circuit for selectively reading out the electrical signals stored in the memory portions, said circuit producing an electrical signal output stored in the memory portion of the memory circuit designated by said designation signal, said read-out circuit comprising a sequence designation circuit to designate the sequence of read-out from said memory portions, and said sequence designation circuit including a sequence memory circuit having a plurality of sequence memory portions, each sequence memory portion storing therein a designation signal, and a forwarding circuit which sequentially designates said sequence memory portion and transmits the designation signal stored in the designated sequence memory portion to said read-out circuit; and
    (h) a drive circuit to control the control elements of the camera in response to the electrical signals from said read-out circuit.

2. A control device for a camera having control elements for taking a plurality of scenes successively comprising in combination:
    (a) control information setting means for setting control quantities for the control elements of the camera;
    (b) conversion means to convert the control quantities set by said setting means into electrical signals;
    (c) a memory circuit having a plurality of memory portions;
    (d) a designation signal forming circuit for forming a designation signal, a predetermined memory portion being designated on the basis of the value of said signal;
    (e) a manually operated member to determine the value of said designation signal;
    (f) a signal transmission circuit connected to said memory circuit and to said conversion means, said circuit transmitting an electrical signal from said conversion means to the memory portion designated by the designation signal;
    (g) a read-out circuit for selectively reading out the electrical signals stored in the memory portions, said read-out circuit comprising a sequence designation circuit to designate the sequence of read-out from said memory portions, and producing an electrical signal output stored in the memory portion designated by said sequence designation circuit;
    (h) mechanical memory means connected to said sequence designation circuit to mechanically store a designation state of the read-out sequence by said circuit; and
    (i) a drive circuit to control the control elements of the camera in response to the electrical signals from said read-out circuit 3. A control device for a camera having control elements for taking a plurality of scenes successively comprising in combination:
    (a) a plurality of control quantity setting means to independently set control values of different ones of the control elements of the camera;
    (b) conversion means to convert the respective control values set by said conctrol quantity setting means into electrical signals;
    (c) a first memory circuit to independently store the respective electrical signals converted by said conversion means;
    (d) a second memory circuit to independently store the electrical signals corresponding to present states of control of the respective different control elements of the camera;
    (e) time setting means to set a shifting time from the present control states to control values set by said control quantity setting means;
    (f) means to convert the shifting time set by said time setting means into an electrical timing signal;
    (g) an operational circuit having a first function of independently providing outputs corresponding to the differences in the respective electrical signals stored in said first memory circuit and the respective electrical signals stored in said second memory circuit, and a second function of independently dividing the respective outputs provided by the first function by the value corresponding to the timing signal and providing independently the respective divided outputs for each control element; and
    (h) a drive circuit to independently control the respective control elements of the camera based on the respective divided output.

4. The control device as claimed in claim 3, further comprising an adding circuit to periodically accumulate the respective divided outputs to the respective electrical signal stored in said second memory circuit independently, and said drive circuit independently controls the respective control elements of the camera based on the respective accumulated output.

5. The control device as claimed in claim 3, further comprising a detection circuit to detect said divided output and means to generate an output when a shifting time corresponding to the value of said output is shorter than the shifting time set by said time setting means, and conversion means to convert the shifting time as set by the output from said circuit in a longer time period.

6. A control device for a camera having control elements for taking a plurality of scenes successively, comprises in combination:
(a) control information setting means to set control quantities for the control elements of the camera;
(b) conversion means to convert the control quantities as set by said setting means into electrical signals;
(c) a memory circuit to store the electrical signals, said circuit having a plurality of memory portions to selectively store said electrical signals in one of said memory portions;
(d) memory portion designation means connected to said memory circuit for selectively designating said memory portions and for storing said electrical signals in the designated memory portions;
(e) a drive circuit to control the control elements of the camera in response to the electrical signals stored in the memory portions of said memory circuit, wherein the camera is controlled by the electrical signals stored in said memory circuit; and
(f) a read-out circuit to designate the memory portions in said memory circuit, to read out the electrical signals stored in the memory portions, and to transfer the electrical signals to said drive circuit, said read-out circuit including:
(1) a sequence designation circuit to designate the sequence of signals read out from said memory portions, said sequence designation circuit having a plurality of sequence memory portions each of which stores a different read-out designation signal for designating one of said memory portions of said memory circuit and reading out electrical signals from the designated memory portion;
(2) a forwarding circuit to designate the sequence memory portions by sequential forwarding, and to sequentially transmit to said memory circuit the read-out designation signals stored in the sequence memory portions; and
(3) a mechanical forwarding switch connected to said forwarding circuit to mechanically store a state of the forwarding circuit.

7. The control device as claimed in claim 6, wherein there is further provided a mechano-electric conversion means connected to said mechanical forwarding switch and said forwarding circuit for converting the state of the mechanical forwarding switch into electrical signals and transmitting the signals to said forwarding circuit.

8. The control device as claimed in claim 7, wherein said mechano-electric conversion means is actuated by turning on of a power supply.

9. The control device as claimed in claim 6, further comprising a magnetic memory circuit connected to said memory circuit to magnetically store the contents of the memory portions of said memory circuit, a write-in circuit to sequentially transfer the contents of the memory portions of said memory circuit into said magnetic memory circuit, and a magnetic read-out circuit to sequentially transfer the contents of said magnetic memory circuit into said memory portions of said memory circuit.

10. A control device for a camera having a control elements for taking a plurality of scenes successively, comprising in combination:
(a) control information setting means for setting control quantities of the control elements of the camera;
(b) conversion means to convert the control quantities set by said setting means into electrical signals;
(c) a memory circuit having a plurality of memory portions;
(d) designation signal forming circuit for forming a designation signal, a predetermined memory portion being designated on the basis of the value of said signal;
(e) a manually operated member to determine the value of said designation signal;
(f) a signal transmission circuit connected to said memory circuit and conversion means, said circuit transmitting an electrical signal from said conversion means to the memory portion designated by said designation signal;
(g) a drive circuit to control the control elements of the camera in response to the electrical signals stored in the memory portions of said memory circuit, wherein the camera is controlled by the electrical signals stores in said memory circuit; and
(h) a read-out circuit to designate the memory portions in said memory circuit, to read-out the electrical signals stored in the memory portions, and to transfer the electrical signals to said drive circuit, said read-out circuit including:
(1) a sequence designation circuit to designate the sequence of signals read-out from said memory portions, said sequence designation circuit having a plurality of sequence memory portions each of which stores a different read-out designation signal for designating one of said memory portions of said memory circuit and reading out electrical signals from the designated memory portion; and
(2) a forwarding circuit to designate the sequence memory portions by sequential forwarding, and to sequentially transmit to said memory circuit the read-out designation signals stored in the sequence memory portions.

* * * * *

UNITED STATES PATENT OFFICE
CERTIFICATE OF CORRECTION

Patent No. 4,244,006  Dated January 6, 1981

Inventor(s) SIGEYOSI KITAHARA, ET AL.

It is certified that error appears in the above-identified patent and that said Letters Patent are hereby corrected as shown below:

Column 2, line 24, "pick-up" should read --picked-up--;

Column 4, line 59, delete "board";

Column 5, line 6, "television" should read --relevant--;
line 18, "scence" should read --scene--;

Column 9, line 3, "samplle-and-hold" should read --sample-and-hold--;

Column 10, line 44, "slots" should read --shots--;
line 57, "rerders" should read --renders--;
line 61, "velevision" should read --television--;

Column 17, line 43, "406." should read --$406_{01}$.--;

Column 18, line 59, "crad" should read --card--;

Column 19, line 2, "607" should read --$607_1$--;

Column 21, line 46, "was" should read --are--;

Column 30, line 25, "renewed time which has been extended to a" should be deleted;
line 46, "$D_f$=fm+1-fm+1" should read --$D_f$=fm+1-fm--;

Column 31, line 19, "outputs" should read --output-- (both occurrences);
line 39, "$D_t n$" should read --$D_t/n$--;

Column 32, line 8, "1=" should read --1+--;

Column 36, line 8, "$301b_1$" should read --$201b_1$--;

UNITED STATES PATENT OFFICE
CERTIFICATE OF CORRECTION

Patent No. 4,244,006  Dated January 6, 1981

Inventor(s) SIGEYOSI KITAHARA, ET AL.

It is certified that error appears in the above-identified patent and that said Letters Patent are hereby corrected as shown below:

Column 40, line 21, Claim 2, insert a period after "circuit";

Column 40, line 29, Claim 3, "conctrol" should read --control--;

Column 42, line 11, Claim 10, delete "a" (second occurrence)
          line 36, Claim 10, "stores" should read --stored--.

Signed and Sealed this

Twenty-first Day of July 1981

[SEAL]

Attest:

GERALD J. MOSSINGHOFF

Attesting Officer   Commissioner of Patents and Trademarks